United States Patent
Khajepour et al.

(10) Patent No.: US 8,762,004 B2
(45) Date of Patent: Jun. 24, 2014

(54) VEHICLE DYNAMIC CONTROL USING PULSED ACTIVE STEERING STRATEGY

(76) Inventors: Amir Khajepour, Waterloo (CA); Che-Jen Christoph Kuo, Taipei (TW); John Joseph McPhee, Waterloo (CA)

(*) Notice: Subject to any disclaimer, the term of this patent is extended or adjusted under 35 U.S.C. 154(b) by 447 days.

(21) Appl. No.: 11/833,815

(22) Filed: Aug. 3, 2007

(65) Prior Publication Data
US 2008/0033615 A1 Feb. 7, 2008

Related U.S. Application Data

(60) Provisional application No. 60/835,082, filed on Aug. 3, 2006.

(51) Int. Cl.
*A01B 69/00* (2006.01)

(52) U.S. Cl.
USPC .............. 701/42; 701/41; 701/45; 701/70; 701/71; 701/91; 701/38; 701/74; 701/79; 701/124; 180/443; 180/446; 180/444; 180/405; 180/402; 280/5.51

(58) Field of Classification Search
USPC ........ 701/41, 42, 70, 71, 74, 79, 91; 180/443, 180/446, 444, 402; 280/5.51
See application file for complete search history.

(56) References Cited

U.S. PATENT DOCUMENTS

| | | | | |
|---|---|---|---|---|
| 4,828,061 A * | 5/1989 | Kimbrough et al. | .......... | 180/413 |
| 5,552,789 A * | 9/1996 | Schuermann | .......... | 340/5.21 |
| 5,610,575 A * | 3/1997 | Gioutsos | .......... | 340/429 |
| 5,778,327 A * | 7/1998 | Simmons et al. | .......... | 701/23 |
| 6,138,787 A * | 10/2000 | Miotto | .......... | 180/405 |
| 6,691,565 B2 * | 2/2004 | Font | .......... | 73/117.02 |
| 6,782,968 B2 * | 8/2004 | Sakugawa | .......... | 180/446 |
| 7,165,008 B2 * | 1/2007 | Choi | .......... | 702/141 |
| 2003/0024759 A1 * | 2/2003 | Williams et al. | .......... | 180/443 |
| 2003/0033486 A1 * | 2/2003 | Mizrachi et al. | .......... | 711/133 |
| 2004/0128060 A1 * | 7/2004 | Park | .......... | 701/124 |

* cited by examiner

*Primary Examiner* — Redhwan K Mawari
(74) *Attorney, Agent, or Firm* — Daryl W. Schnurr

(57) ABSTRACT

A pulse active steering control system and method for use in a motor vehicle for improving vehicle stability by reducing a likelihood for rollover and/or skidding sends pulses to the steerable wheels whenever a rollover coefficient and/or the difference between the estimated and actual yaw rate is outside a predetermined range. The pulses are asymmetrical in the form of a smooth curve with a gradually increasing rapid rising edge and a slower falling edge and provide steering input that, along with the driver steering input, returns the rollover coefficient and/or yaw rate to the predetermined range to reduce the likelihood of rollover and/or skidding.

15 Claims, 58 Drawing Sheets

VEHICLE DYNAMIC CONTROL USING PULSED ACTIVE STEERING STRATEGY

Application claims the benefit of U.S. Provisional Application Ser. No. 60/853,082 filed on Aug. 3, 2006.

BACKGROUND OF THE INVENTION

1. Field of the Invention

This invention relates to a system and method of enhancing vehicle stability including reducing a likelihood of rollover for motor vehicles and particularly for SUV's, and yaw control to reduce/prevent vehicle skidding and spin-outs by providing a pulse active steering control system and further relates to a steering control system and motor vehicle in combination.

2. Description of the Prior Art

With the increase in popularity of Sport Utility Vehicles (SUV's), the total number of deaths and injuries caused by rollover crashes has increased significantly since the 1990's. Some statistics have shown that nineteen (19) percent of rollover accidents involve SUV's, yet SUV's remain popular.

Various control systems are known to reduce the likelihood of rollover in motor vehicles including active front steering control, differential braking control and integrated active steering and differential braking control. In previous steering control systems, simulations have been carried out when driver's steering input is fed to a tire model to calculate the tire forces. The tire forces are then input to the vehicle yaw/roll model to calculate the yaw rate, roll rate, longitudinal and lateral velocities and, finally, all resulting parameters are input into the rollover estimator to calculate the rollover coefficient and its error signal when it goes beyond its designated threshold. A controller such as proportional-derivative (PD) controller then receives the error signal and generates the necessary additional steering angle to compensate for the original driver steering input in order to reduce a likelihood of rollover. A similar control structure where the error signal presents the difference between the estimated and actual measured vehicle yaw rate have been used to reduce or prevent vehicle skidding and spin-outs.

Unfortunately, with previous active front steering control systems, while the rollover coefficient is reduced, the rollover coefficient may not be reduced sufficiently to prevent the vehicle from rolling over. In the above control strategy when the gain of the controller is increased, the system becomes unstable. Vehicle stability issues are of particular concern with road vehicles and rollover is particularly a concern to SUV's. In order to be within the rollover safety range, the rollover coefficient must be between −1 and 1.

Another prior art system that is used for vehicle stability is a differential braking control system. The system operates in a manner similar to the active front steering control system where a PD controller controls the magnitude of the torque required to prevent rollover or skidding by applying different braking forces to the vehicle wheels. The tires on the two outside wheels in a turn are braked by the controller when the rollover coefficient or yaw error reaches the designated threshold. As can be seen from FIG. 5, the differential braking control system is sufficient to reduce the rollover coefficient to a level within the safety range. It has been shown that the efficiency of a differential braking control method can be greatly reduced when the vehicle mass distribution changes significantly due to the number of passengers, luggage or any other item with significant weight.

However, when the differential braking control system is used with simulation model #2, which is a non-linear tire model with the same non-linear yaw/roll model as in model #1, the differential braking system does not reduce the rollover coefficient to a level within the safety range. Model #1 uses a simple linear tire model incorporating the non-linear yaw/roll model. At high vehicle operating speeds, if driver steering inputs are at extreme values, the rollover coefficient exceeds the safety range by an amount that may not be able to be compensated by the differential braking control system. This can result in significant shift in vertical tire load to one of the front tires causing abnormal tire lateral forces. In addition, a vehicle that is loaded with cargo, passengers, or both or even has small amount of cargo or one passenger will pose a greater problem for the differential braking control system which may not be able to reduce the rollover coefficient to a level within the safety range.

It is also known to integrate an active steering system with a differential braking system. In FIG. 8, the rollover coefficient is successfully reduced to a level within the safety range by differential braking control system in combination with an active steering control system using a linear tire model. However, when the identical simulation is applied on a fully non-linear model with a non-linear tire model, the integrated active steering differential braking controller still has difficulty reducing the rollover coefficient entirely within the safety range as is illustrated in FIG. 9.

While the integrated controller has a better potential to reduce rollover risk to a level within the safety zone, when applying the controller to a fully non-linear vehicle model in simulation, the controller still fails to prevent rollover.

In Chen et al US Patent publication 2005/0043874 published Feb. 24, 2005, an active steering control system for a motor vehicle is described.

SUMMARY OF THE INVENTION

It is an object of the present invention to provide a pulse active steering control system that can be used alone or in conjunction with a vehicle stability management system to reduce the likelihood of rollover and skidding in motor vehicles and, in particular, in SUV'S. It is a further object of the present invention to provide an improved vehicle stability system that is more efficient and at the same time more cost effective in bringing the vehicle into the safety range than previous systems. It is still a further object of the present invention to provide a method of reducing the likelihood of rollover for a vehicle and further to provide a pulse active steering control system in combination with a motor vehicle in which the system effectively reduces the rollover coefficient to a level within the safety range.

A pulse active steering control system is used in a motor vehicle to improve vehicle stability by reducing a likelihood for rollover and/or skidding, the motor vehicle having at least four wheels, at least two of which are steerable wheels and a driver. The system comprises a rollover estimator that calculates a rollover coefficient of the vehicle. A controller is programmed to determine whether the rollover coefficient is greater than a predetermined range of rollover threshold for the vehicle. If the rollover coefficient is within said range of the rollover threshold, the controller is programmed not to interfere with the operation of the vehicle. If the rollover coefficient is greater than the rollover threshold, the controller immediately activates steering pulses, modifying an amplitude of the pulse with respect to the current steering input from the driver and an error signal of the rollover coefficient. The controller sends pulse signals to provide extra steering to steering provided by the driver input in order to reduce the likelihood of rollover by varying the rollover coefficient to move the rollover coefficient closer to the rollover threshold and ultimately to a value less than the rollover threshold.

Preferably, the pulses have a shape selected from the group of rectangular, sinusoidal and asymmetrical in the form of a smooth curve with a gradually increasing rapid rising edge and a slower falling edge.

A pulse active steering control system is used in a motor vehicle for reducing a likelihood of rollover. A motor vehicle has at least four wheels, at least two of which are steerable wheels and a driver who provides steering input. The system comprises a rollover estimator and a controller in the vehicle. The rollover estimator calculates a rollover coefficient. The controller compares the rollover coefficient to a predetermined rollover threshold. If the rollover coefficient is greater than the rollover threshold, the controller provides pulse signals to the steerable wheels to reduce the rollover coefficient relative to the rollover threshold.

A pulse active steering control system is used in combination with a motor vehicle to reduce a likelihood of rollover. The motor vehicle has at least four wheels, at least two of which are steerable wheels and a driver. The system comprises a rollover estimator and a controller in the vehicle, the rollover estimator calculating a rollover coefficient. The controller compares the rollover coefficient to a predetermined rollover threshold. If the rollover coefficient is greater than the rollover threshold, the controller provides pulse signals to the steerable wheels to reduce the rollover coefficient relative to the rollover threshold.

A method of reducing the likelihood of rollover of a motor vehicle uses a pulse active steering control system. The motor vehicle has at least four wheels, at least two of which are steerable wheels. The motor vehicle has a rollover estimator and a controller. The method comprises activating the rollover estimator to calculate a rollover coefficient, having the controller compare the rollover coefficient to a predeterminded rollover threshold and if the rollover coefficient is greater than the rollover threshold, having the controller provide pulse signals to the steerable wheels, providing the pulse signals with a shape selected from the group of rectangular, sinusoidal and asymmetrical in the form of a smooth curve with a gradually increasing rapid rising edge and a slower falling edge to reduce the rollover coefficient relative to the rollover threshold.

A pulse active steering control system is used in a motor vehicle for improving vehicle stability by reducing the likelihood for rollover and/or skidding. The motor vehicle has at lest four wheels, at least two of which are steerable wheels and a driver. The system comprises an estimator to estimate an acceptable yaw rate for said vehicle on a continuous basis based upon sensors that provide information to the estimator of an angle of each of the steerable wheels and a speed of the vehicle. A controller measures the actual yaw rate of the vehicle on a continuous basis and calculates the difference between the acceptable yaw rate and the actual yaw rate. The difference is a yaw rate error. When the yaw rate error exceeds a predetermined threshold, the controller provides pulses to the steerable wheels to reduce or eliminate the error.

A method of improving vehicle stability for a motor vehicle by reducing a likelihood of skidding is used with a motor vehicle having at least four wheels, at least two of which are steerable wheels and a driver. The method uses a system with an estimator to estimate an acceptable yaw rate for the vehicle on a continuous basis and a controller. The method comprises activating the estimator to estimate an acceptable yaw rate for the vehicle based on information received from sensors as to an angle of each of the wheels and a speed of the vehicle, having the controller compare the acceptable yaw rate with the actual yaw rate of the vehicle, the controller determining a difference between the estimated yaw rate and the actual yaw rate, the difference being an error, and having the controller send pulses to the steerable wheels to reduce the error whenever the error exceeds a predetermined threshold.

DETAILED DESCRIPTION OF A PREFERRED EMBODIMENT

Figure 1:
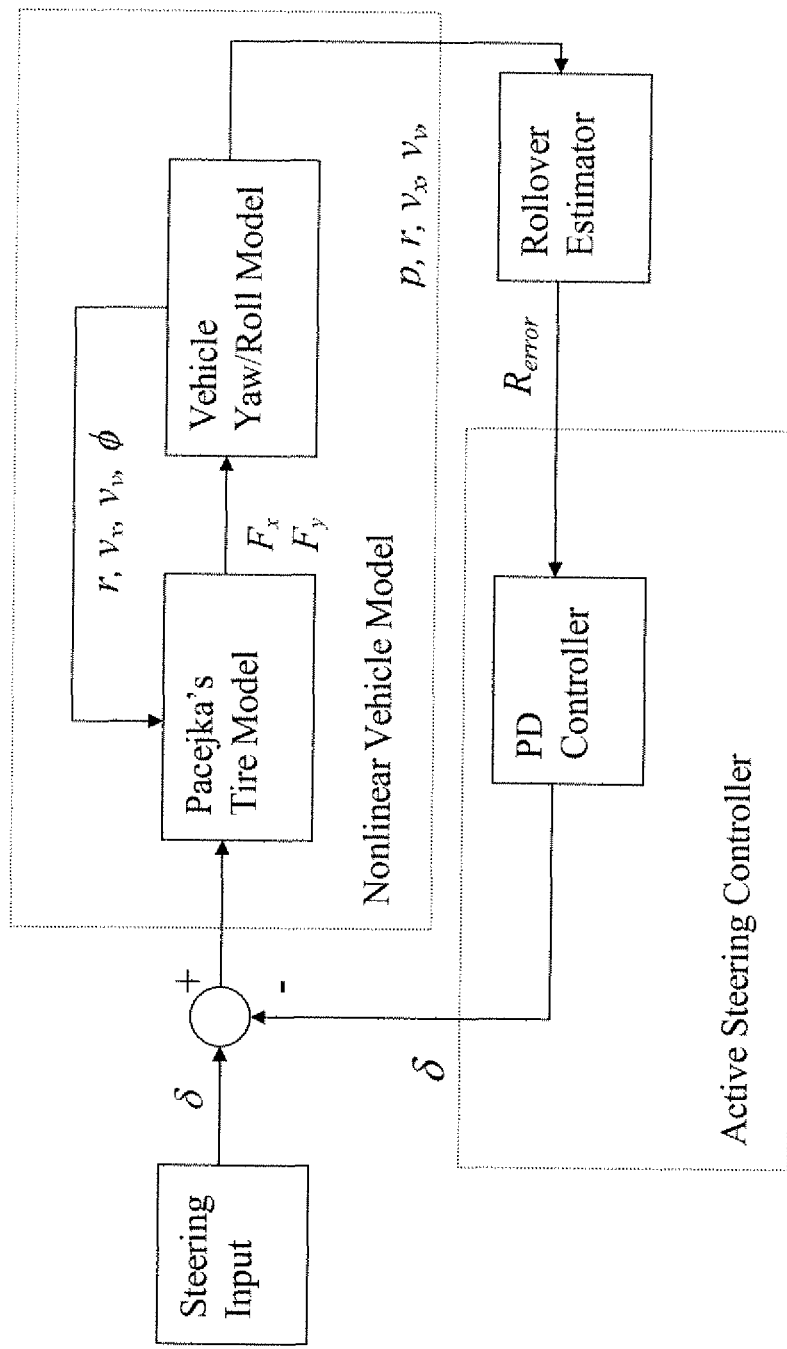
FIG. 1 is a prior art active front steering control structure.
Figure 2:
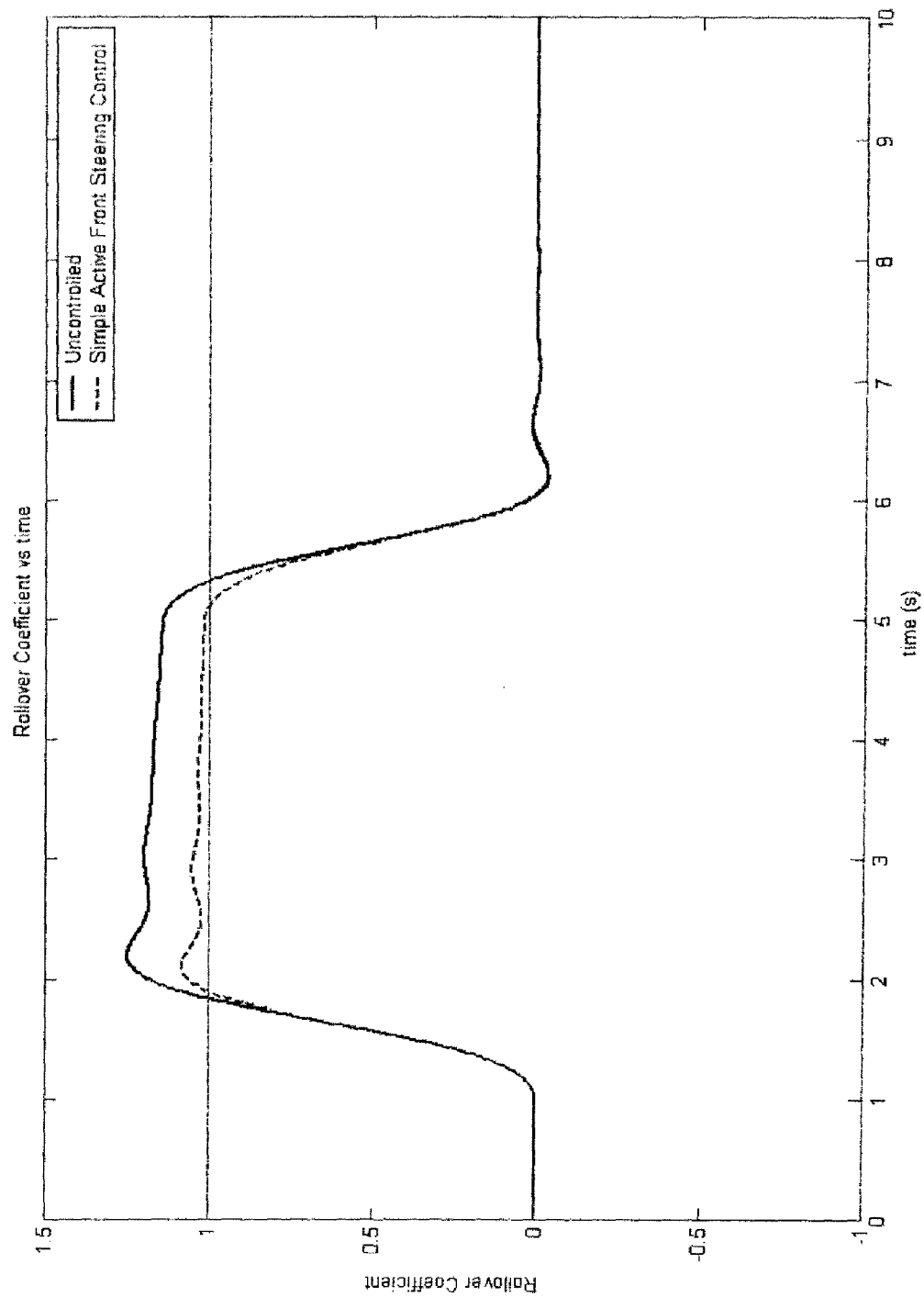
FIG. 2 is a prior art graph of rollover coefficient versus time for an ASF control system (model #1)
Figure 3:
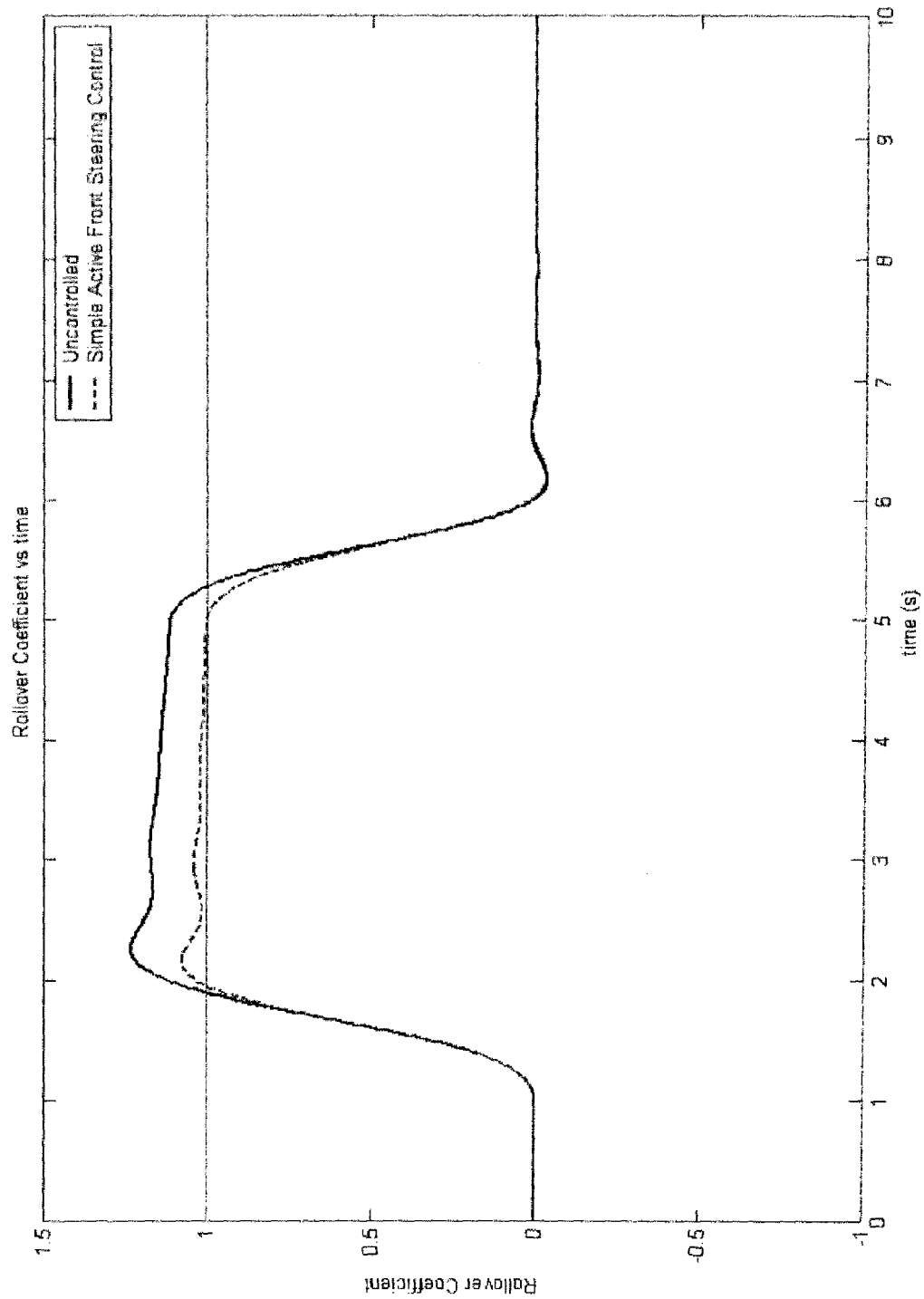
FIG. 3 is a prior art graph of a rollover coefficient versus time for an ASF control system (model #2)
Figure 4:
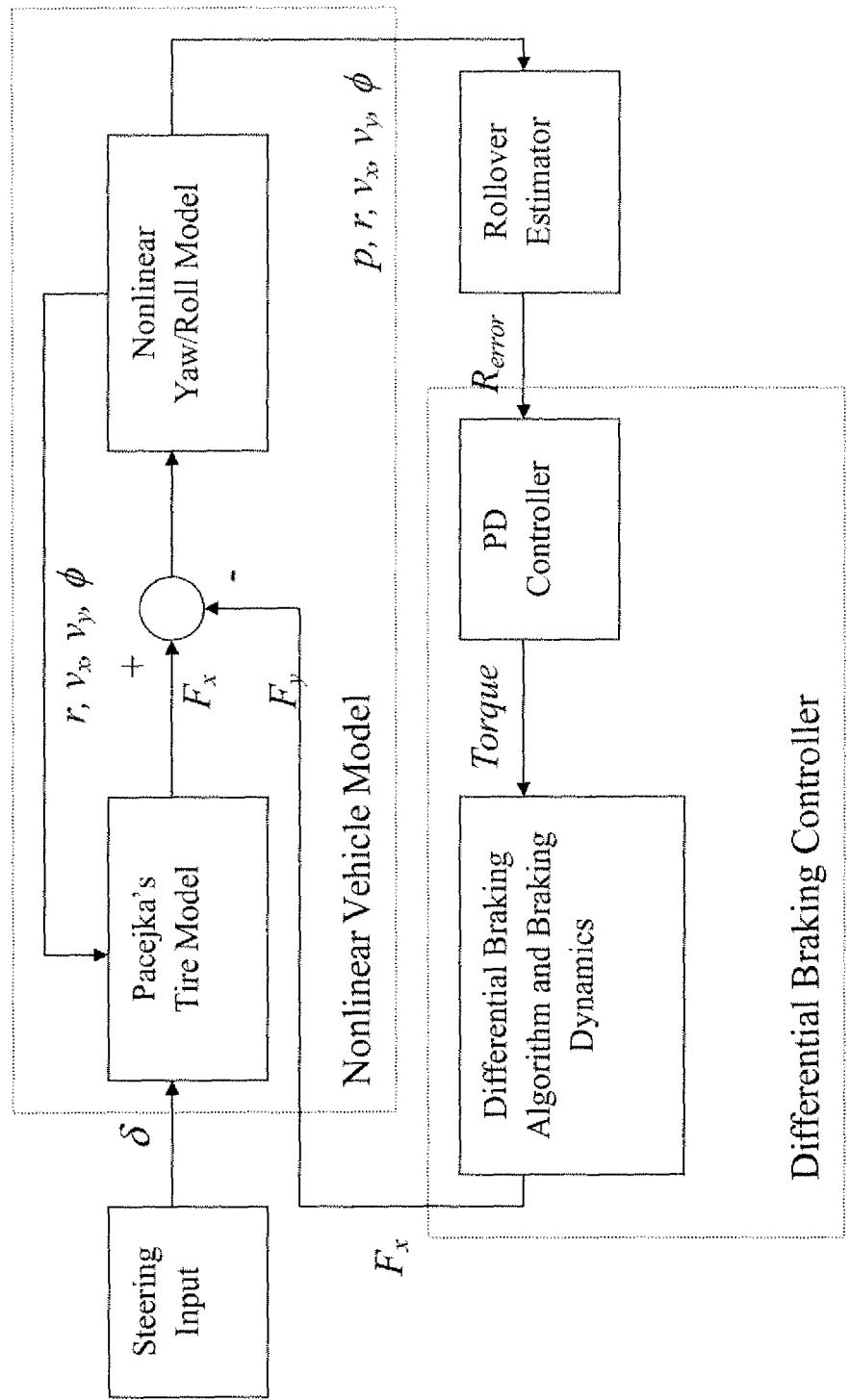
FIG. 4 is a prior art block diagram of an overall structure of a differential braking control system.
Figure 5:
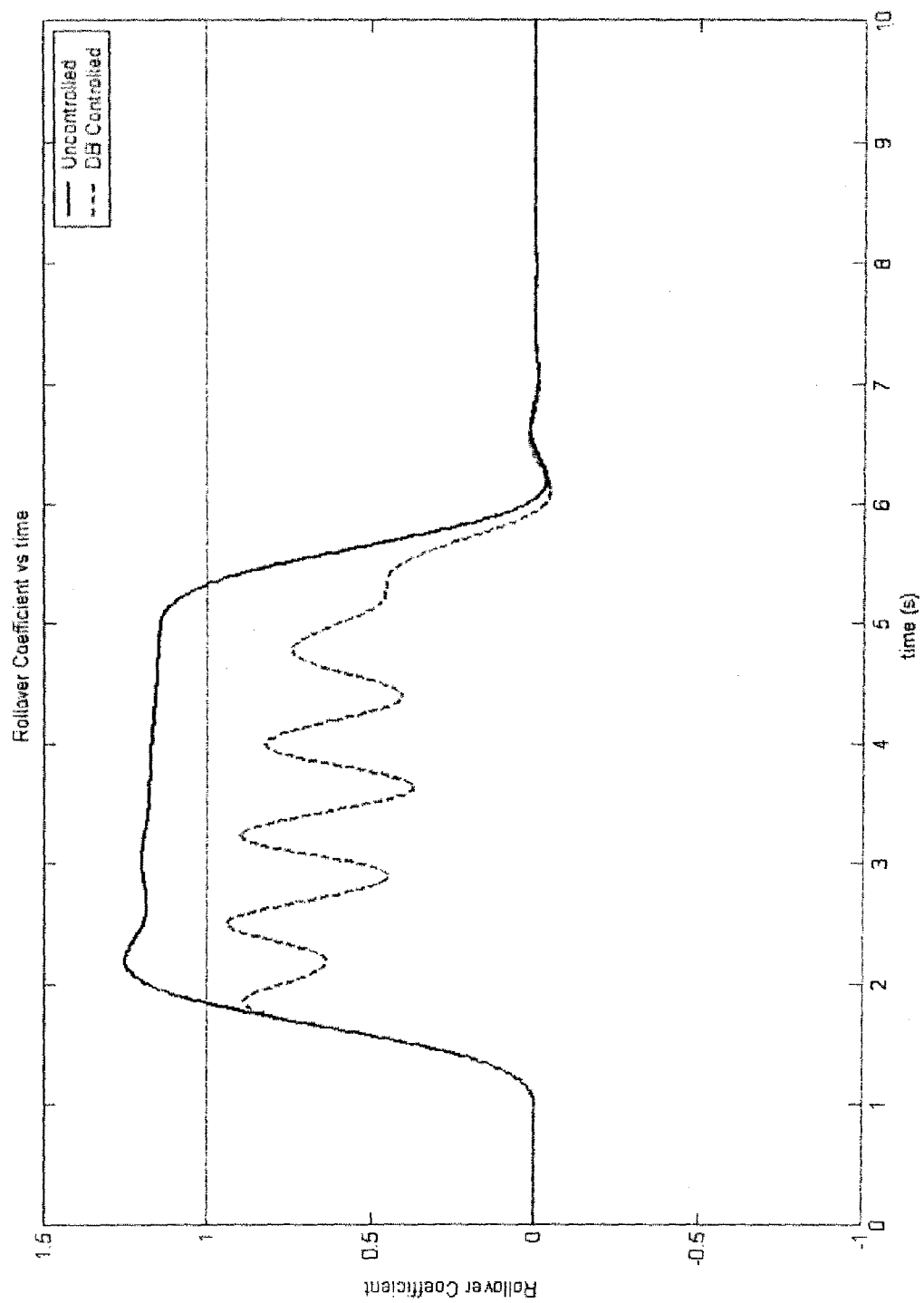
FIG. 5 is a prior art graph of rollover coefficient versus time for a differential braking control system (model #1)
Figure 6:
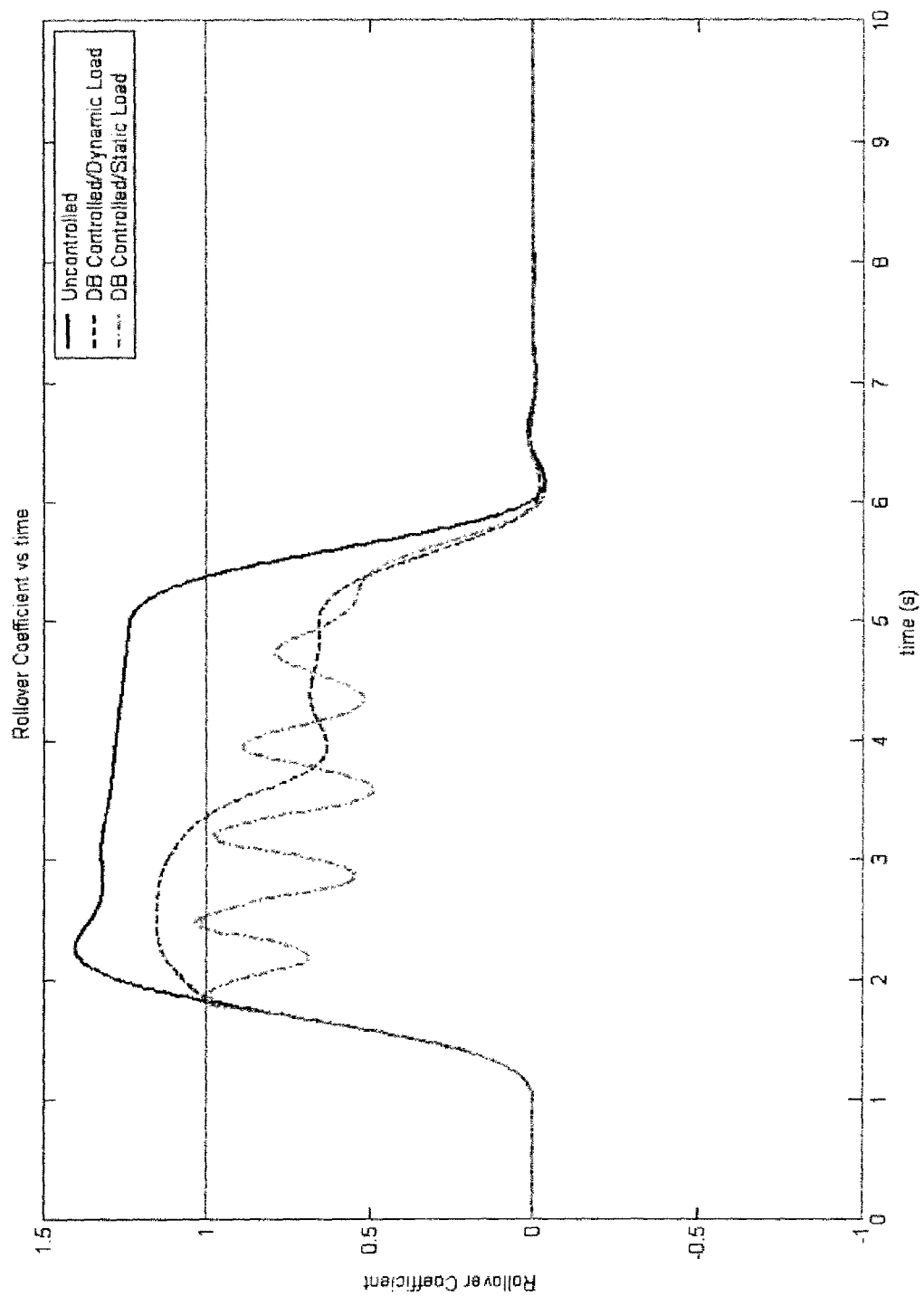
FIG. 6 is a prior art graph of rollover coefficient versus time for a differential braking control system (model #2)
Figure 7:
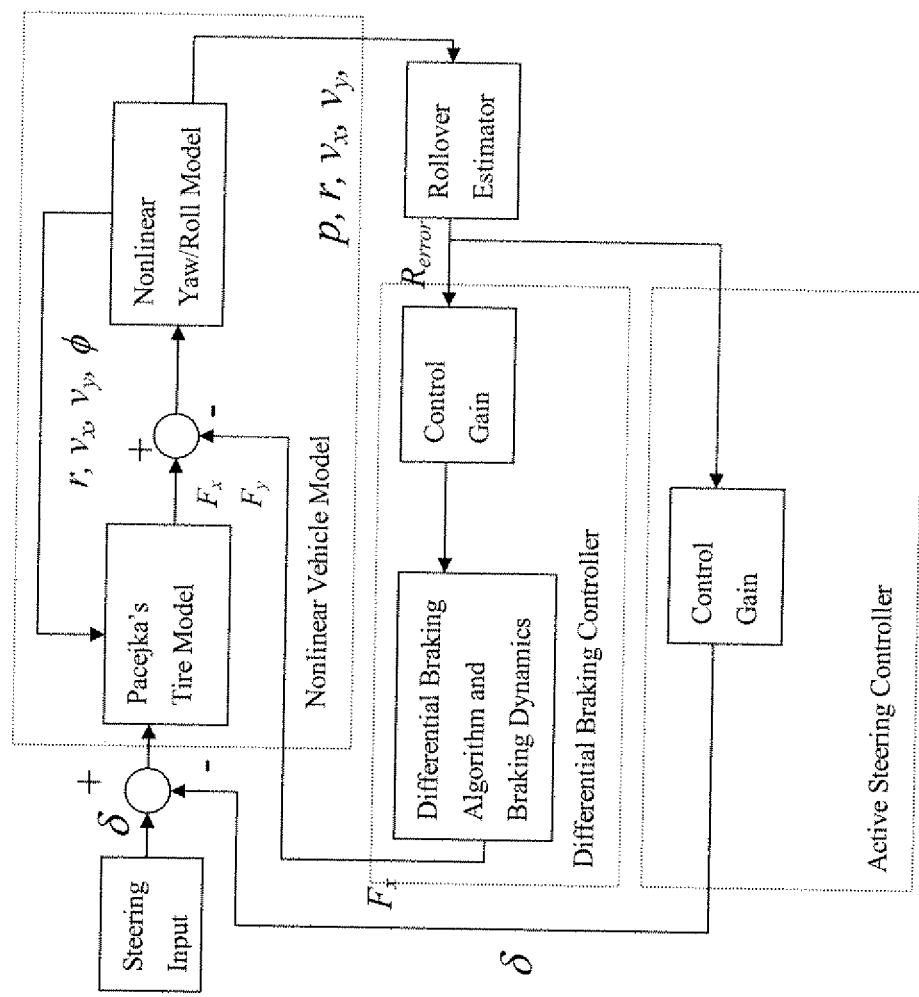
FIG. 7 is a prior art block diagram of an integrated active steering/differential braking control system.
Figure 8:
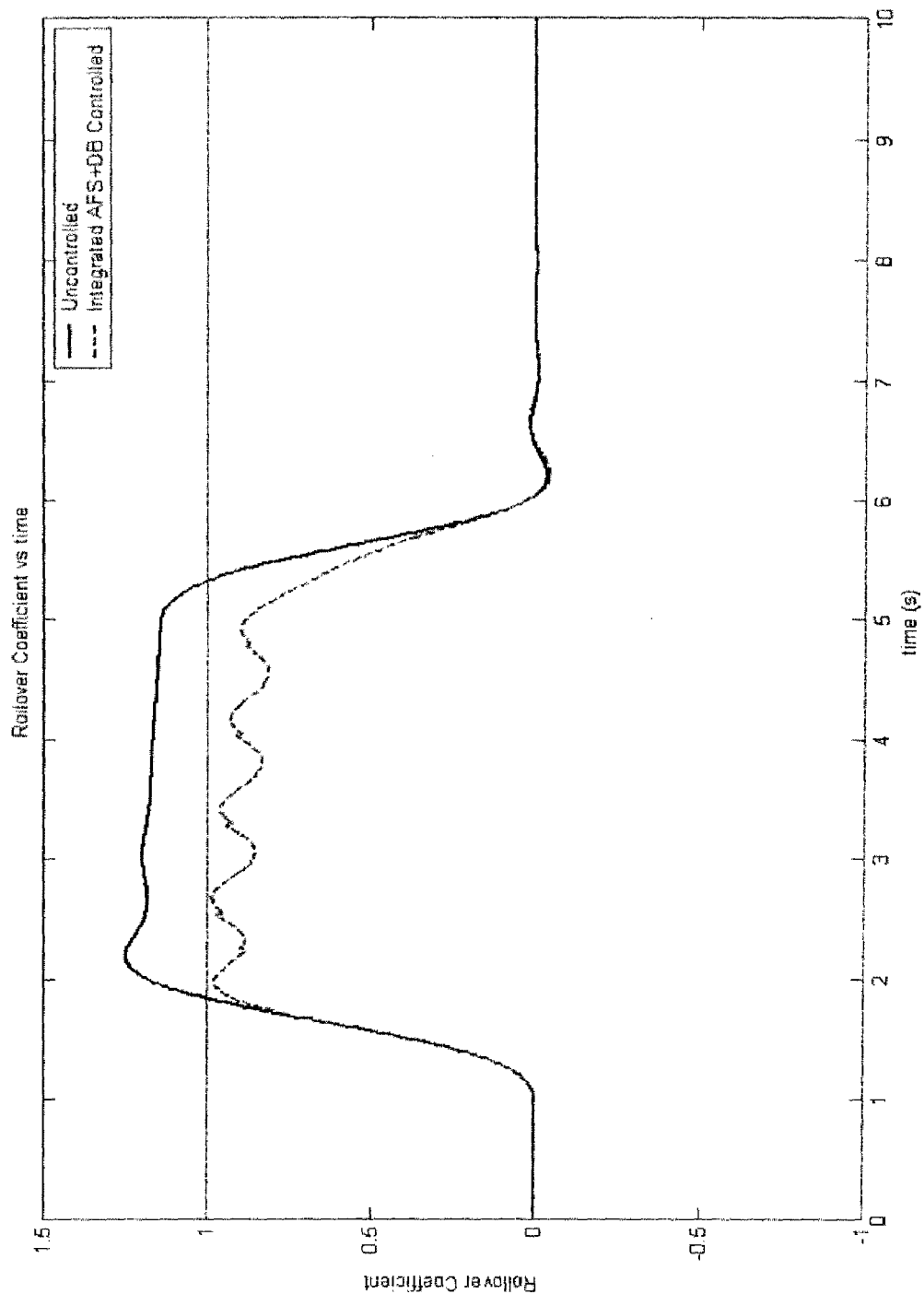
FIG. 8 is a prior art graph of rollover coefficient versus time for an active steering differential braking control system (model #1)
Figure 9:
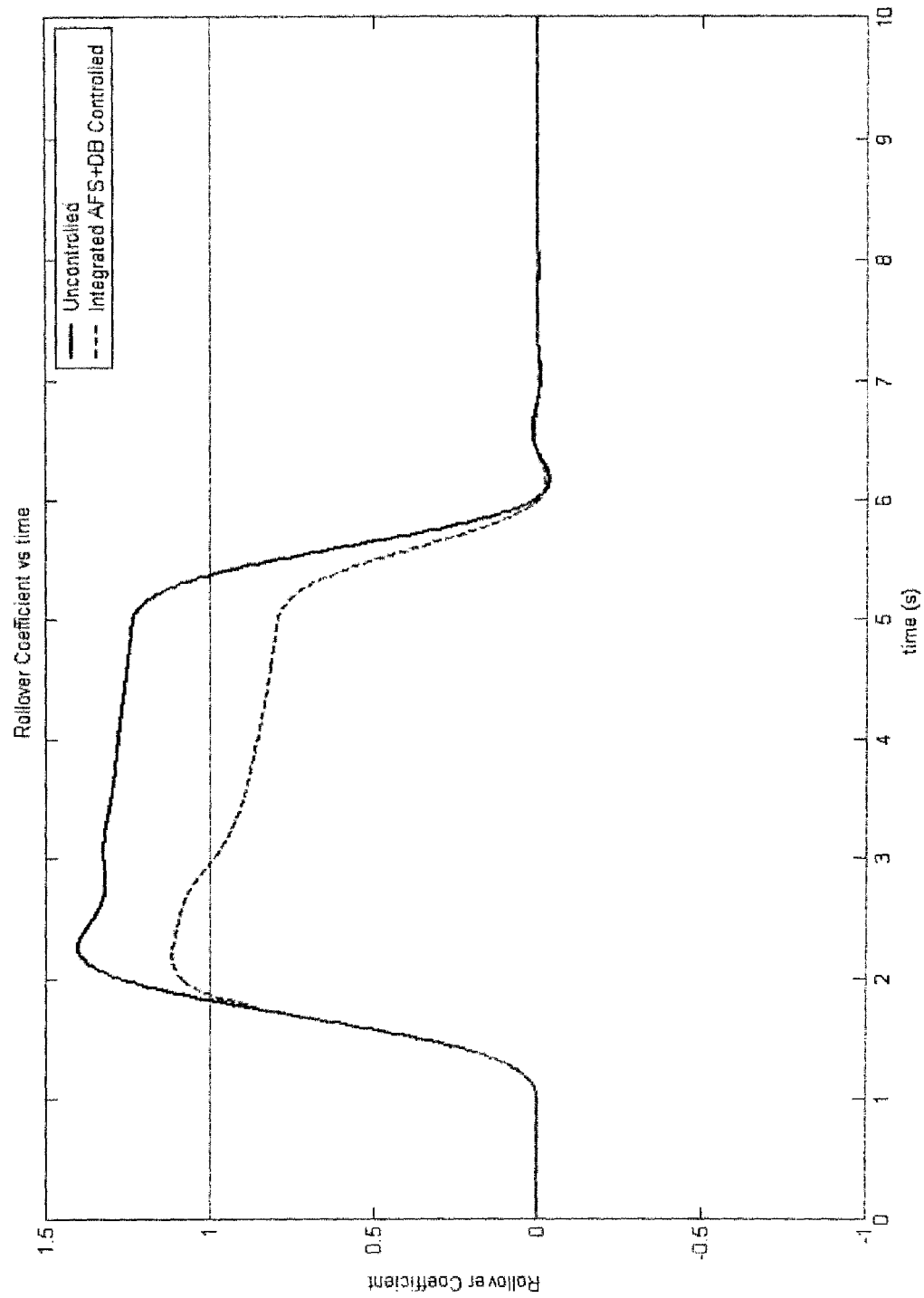
FIG. 9 is a prior art graph of a rollover coefficient for an active steering differential braking control system (model #2)
Figure 10:
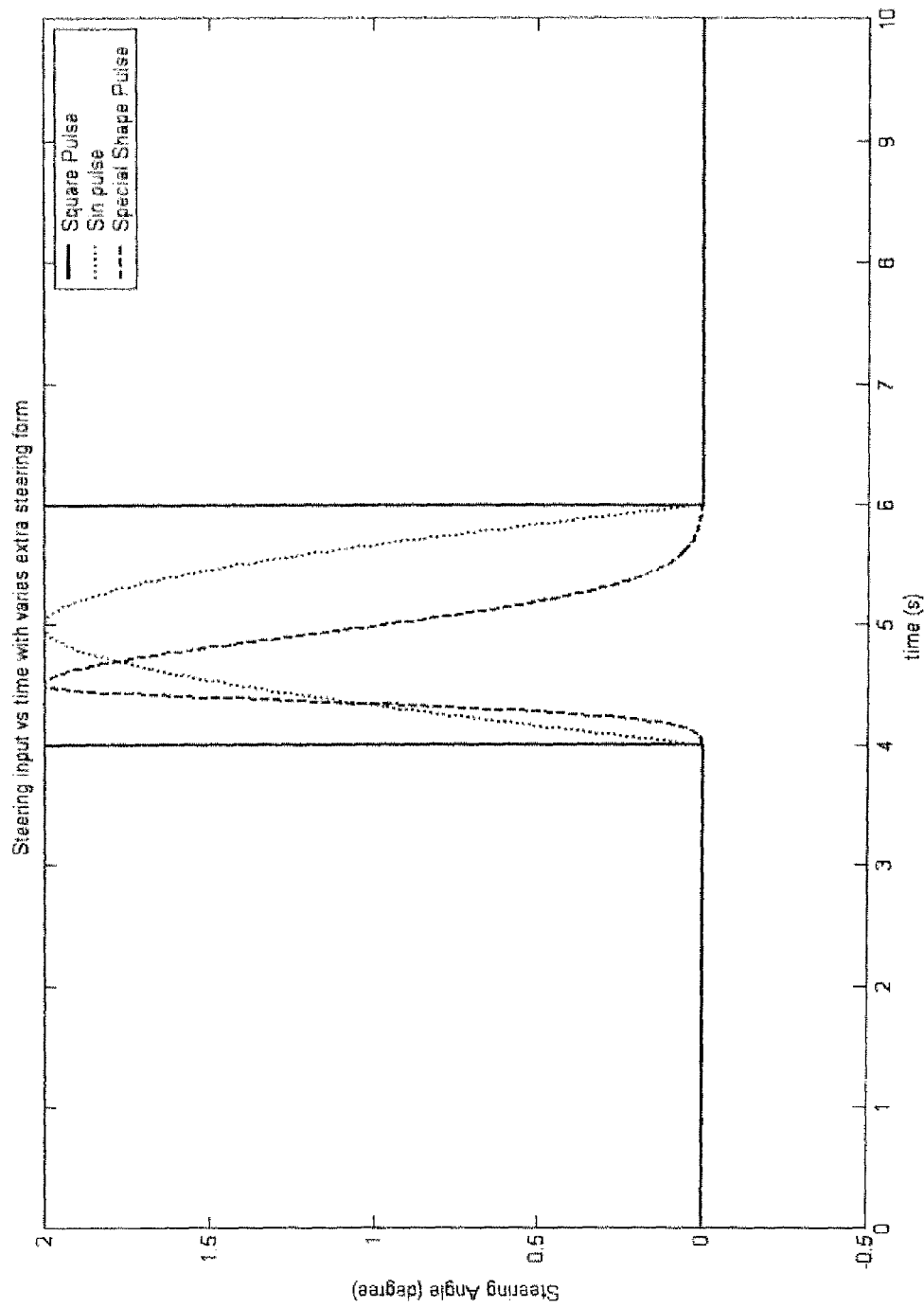
FIG. 10 is a rectangular pulse is used as well as a sin pulse and a special shape pulse.
Figure 11:
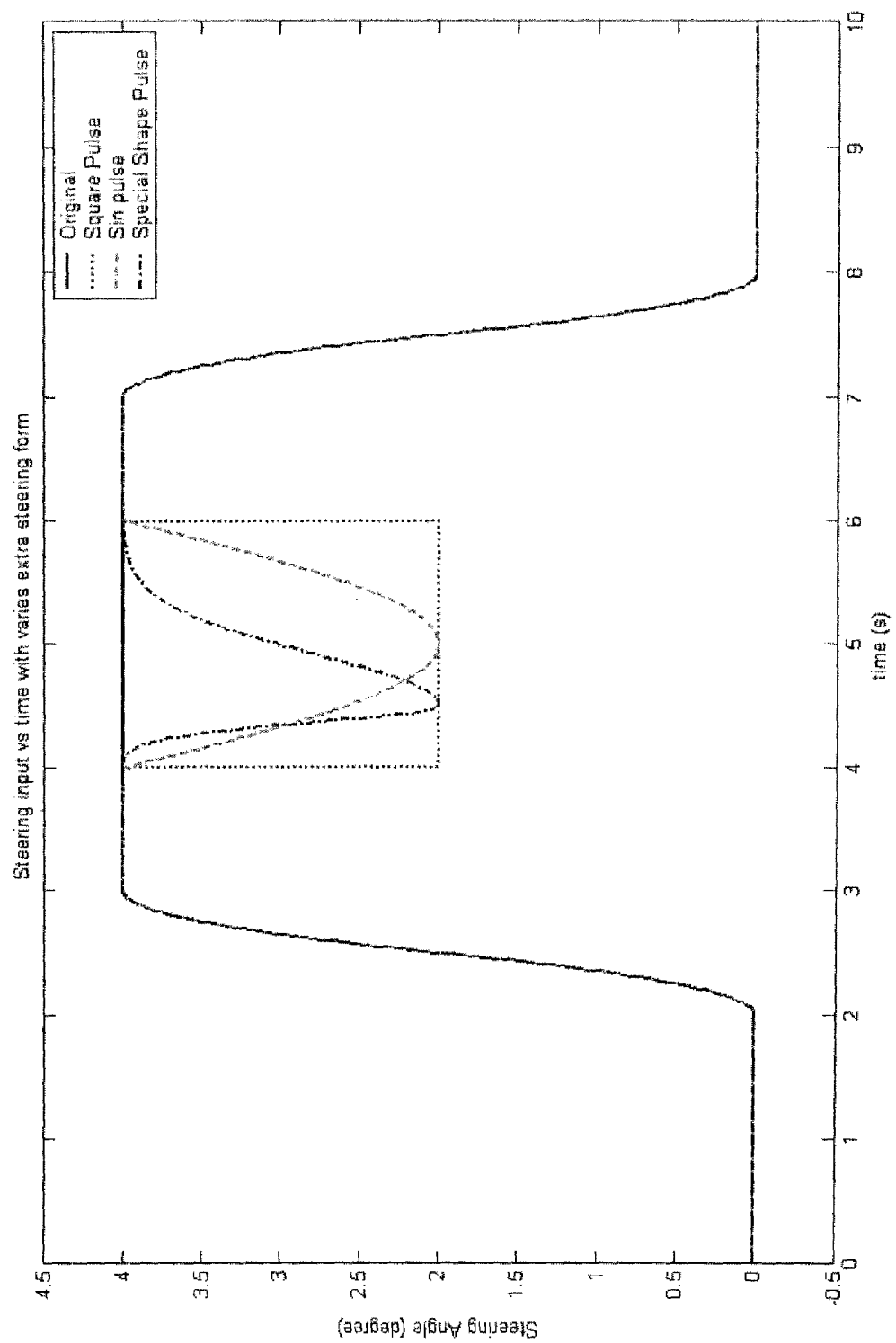
FIG. 11 is the resulting steering inputs of a vehicle between zero and ten seconds.
Figure 12:
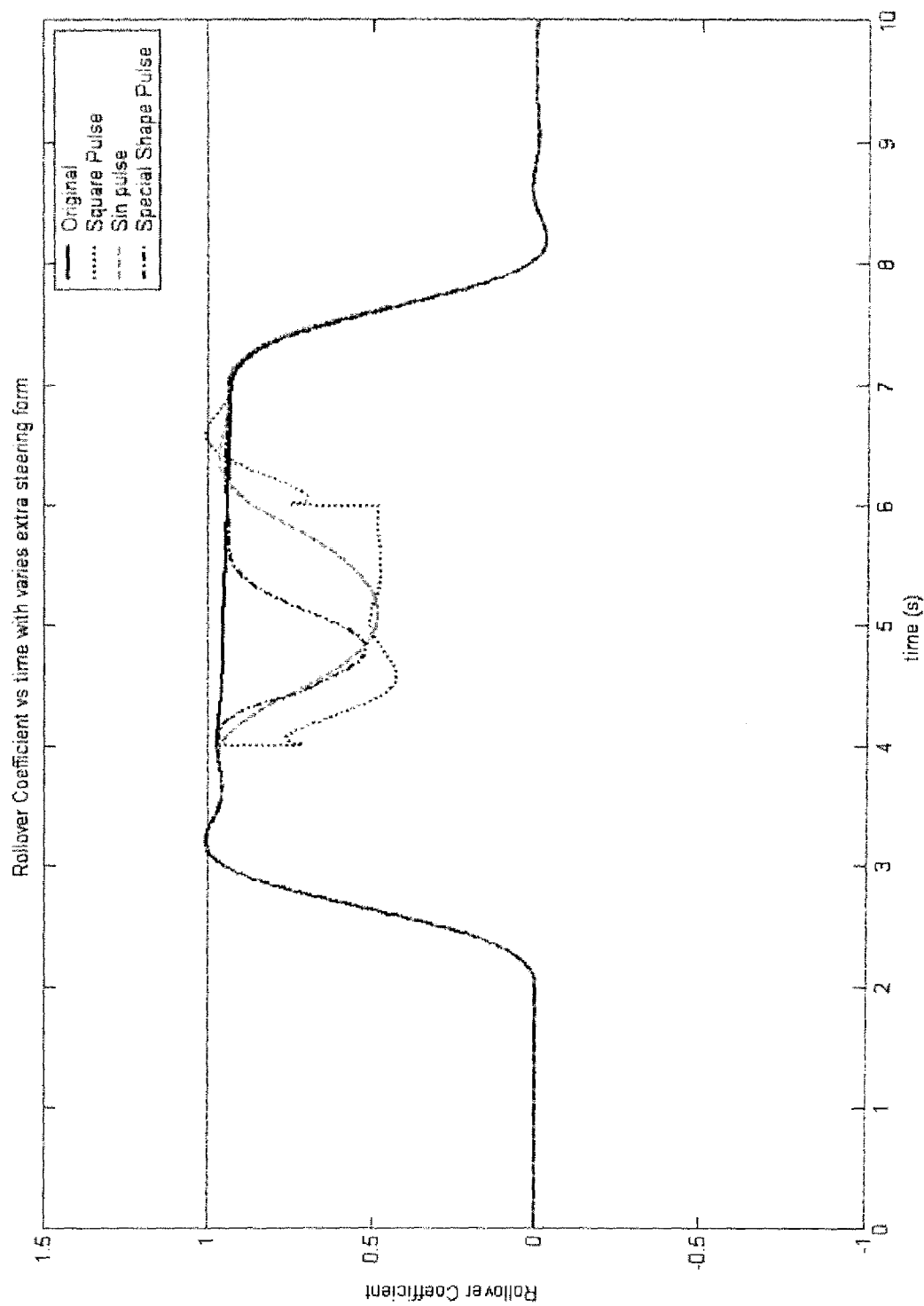
FIG. 12 illustrates the corresponding rollover coefficient of each test.

From FIG. 12, it can be seen that a rectangular pulse generally decreases the rollover coefficient, but there is a sudden increase in rollover coefficient near the end of the pulse. In a second test, a sinusoidal pulse is used. The total amount of rollover coefficient reduction is lower than with the rectangular pulse and the increase in the pulse near the end is also reduced compared to the rectangular pulse. In a third test, a special form of pulse is introduced with a sharp, gradually increasing edge and a smooth, damped, gradually decreasing pulse edge. As shown in equation 1.0, where a represents the time where the pulse reaches its peak and b and c represent the shape factor when the rising and falling edges respectively, the special shaped pulse can be easily reproduced.

$$f(t) = e^{\frac{-(t-a)^2}{b}} \quad 0 \le t \le a$$
$$f(t) = e^{\frac{-(t-a)^2}{c}} \quad \text{for} \quad a \le t \qquad \text{Eq. 1.0}$$

Figure 13:
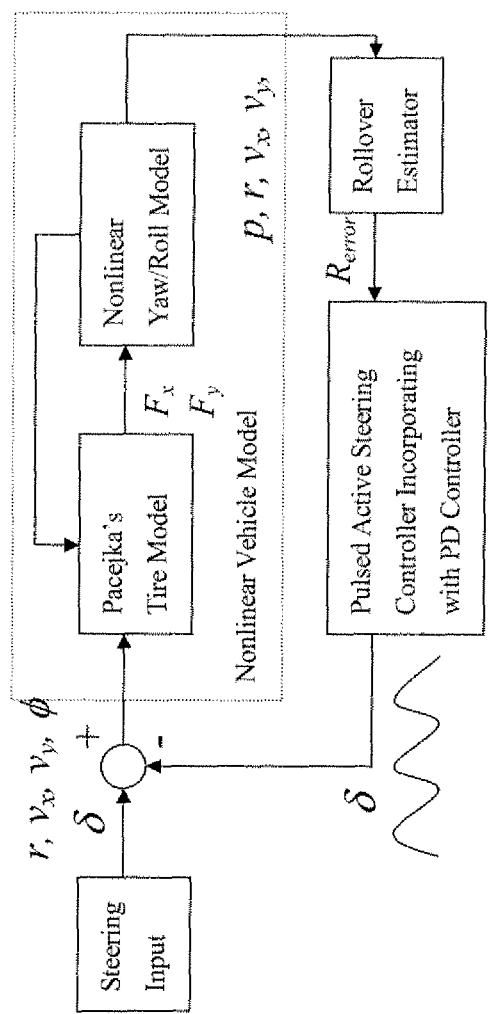
FIG. 13 is a block diagram of an overall structure of the pulsed active steering controller.

FIG. 13 illustrates the overall structure of the proposed closed loop active steering controller for a rollover controller. The nonlinear vehicle model consists of a tire model and a yaw/roll model. The active steering controller for a rollover controller consists of a steering pulse generator, a pulse control algorithm and a controller such as a PD controller. The driver steering input (δ) feeds into the tire model which calculates the tire forces ($F_x$, $F_y$) and then feeds the resulting tire forces to the yaw/roll model. The yaw/roll model then calculates the longitudinal and lateral velocity ($v_x$, $v_y$) as well as the yaw rate (r), roll angle (φ), and roll rate (p) of the vehicle and feeds the data to the rollover estimator to calculate the rollover coefficient ($R_c$) to recognize the rollover. If the rollover coefficient is above a designated threshold, the error signal of rollover coefficient and the designated threshold will be calculated as:

$$R_{error} = R_c - R_{threshold+}, R_c > R_{threshold+}$$

$$R_{error} = R_{threshold-} - R_c \text{ for } R_c < R_{threshold-}$$

$$R_{error} = 0 R_{threshold-} < R_c < R_{threshold+} \qquad \text{Eq. 2.0}$$

where $R_{error}$ represents the error signal, $R_c$ represents the current rollover coefficient, and $R_{threshold+}$ and $R_{threshold-}$ represent the positive and negative threshold for the rollover coefficient, respectively.

The pulse control algorithm and the steering pulse generator will then output the special pulse form to combine with the error signal and with the PD controller, thereby controlling its amplitude and feeding the resulting extra steering back to the original driver steering input.

Figure 14:
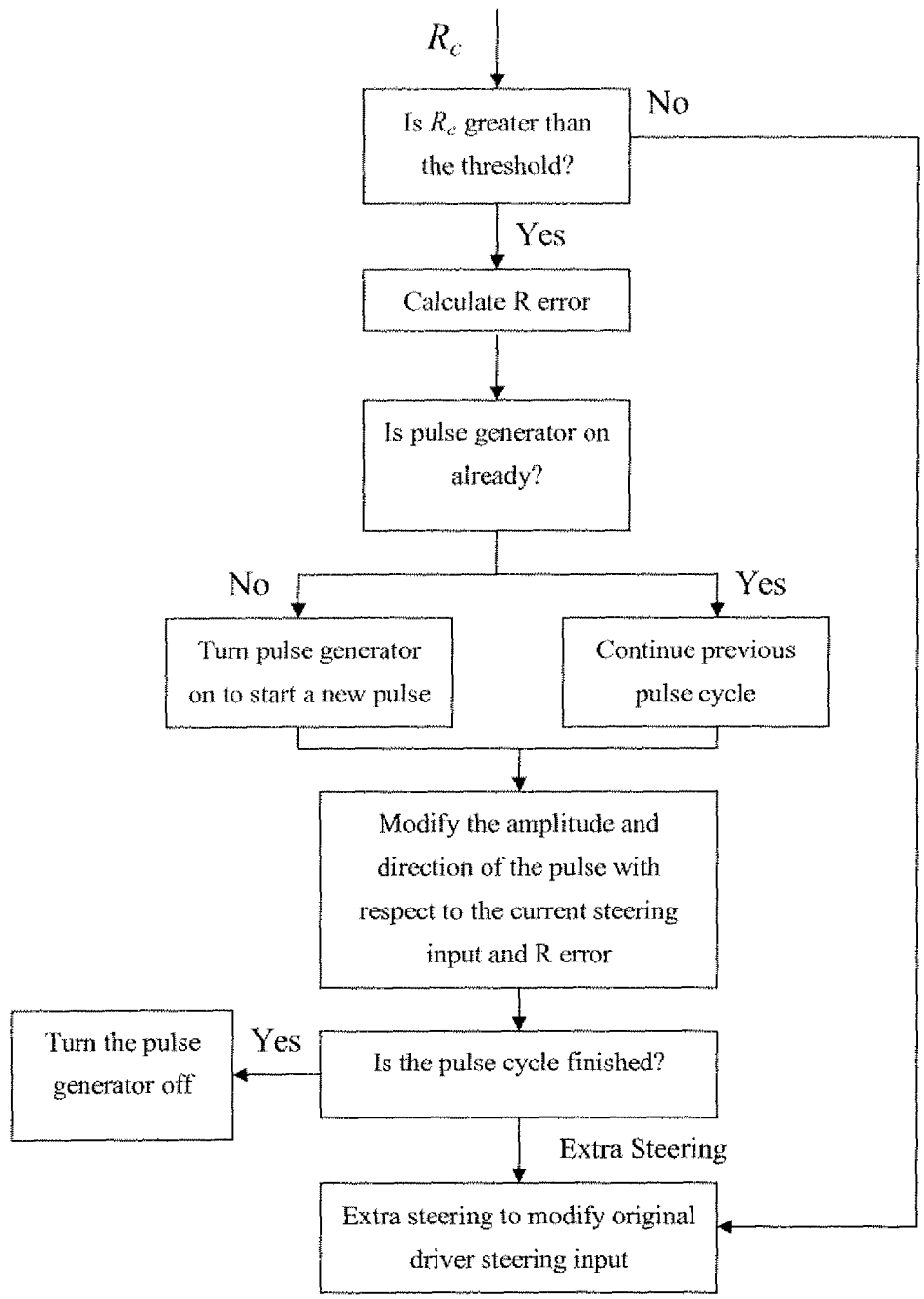
FIG. 14 page 100 illustrates a flow chart of a pulse control algorithm.

FIG. 14 illustrates the flow chart of the pulse control algorithm. After the rollover estimator calculates the rollover coefficient ($R_c$), the pulse control algorithm checks whether $R_c$ is greater than the designated threshold. If $R_c$ is within the safety range, the algorithm will output "zero" extra steering to the PD controller. However if $R_c$ is greater than the threshold, the algorithm will turn the pulse generator on, which will activate the special steering pulse and modify its amplitude with respect to the current steering input and the error signal $R_{error}$. Once the pulse generator is activated, a complete pulse cycle must be performed even if $R_c$ drops within the designated safety range during the control process. After a complete pulse cycle, the algorithm starts over again and if $R_c$ is still greater than the threshold, another pulse will be generated again. In cases where $R_c$ is constantly above the threshold, the controller will basically generate a series of pulses to keep $R_c$ within the stable range ($-1 < R_c < 1$) to prevent rollover. As one might notice, this kind of algorithm and method of applying a series of pulses is similar to today's standard commercial ABS system and this is the main motivation of this new control strategy. Instead of using the extra braking force to maximize the efficiency of the brake system on slippery surface, as in an ABS system, this active steering controller uses steering adjustments to prevent rollover or skidding for the vehicle.

As the pulse form has been decided in the previous section, the frequency and amplitude are the two major design factors for this new type of controller. In order to understand the amplitude of the extra pulsed steering generated by the controller in relation to the original steering inputs, the time period of the generated pulse has been fixed to a value of 0.3 seconds. In other words, if the vehicle is constantly at high rollover risk within 1 second, the controller is capable of generating at least 3 complete pulses to attempt to reduce the rollover risk. This should be fast enough for our simulation setups and it is also a realistic value for today's common ABS system to achieve.

In order to prevent the controller from overly adjusting the original driver steering inputs in the opposite direction, the product of error signal and controller gain serves as the percentage number and is multiplied by the original steering input. This guarantees the amplitude of the extra steering generated by the controller is always smaller than or equal to the original driver steering input. For example, the pulses can have an amplitude of substantially 2° when the motor vehicle is under a constant 4° steering input from the driver.

In order to maintain the pulse form introduced in the previous section, the product of the error signal and the controller gain must remain constant for each pulse during a complete pulse cycle. The problem arises as it is difficult to tell what the best controller gain is for each pulse within the 0.3 second period. For example, as the rollover coefficient first exceeds the threshold, the error signal is a very small number; however, the rollover coefficient can be on a steep rising edge; therefore, the small resulting change in amplitude will not be sufficient to reduce the rollover coefficient. One possible solution to this problem is to create a rollover predictor which predicts the highest possible rollover coefficient for the next 0.3 seconds when it exceeds the threshold and uses this predicted value as a reference to calculate the error signal. However, after testing this solution, the robustness and accuracy of the predictor also presents a complicated problem. After a series of simulations and tests, a different solution was derived that demonstrated good simulation results. This approach uses a fixed value of the percentage decrease of the original driver steering input among all the pulses. The resulting extra steering generated by the controller is in the designated pulse form and is proportional to the original driver steering inputs.

Figure 15:
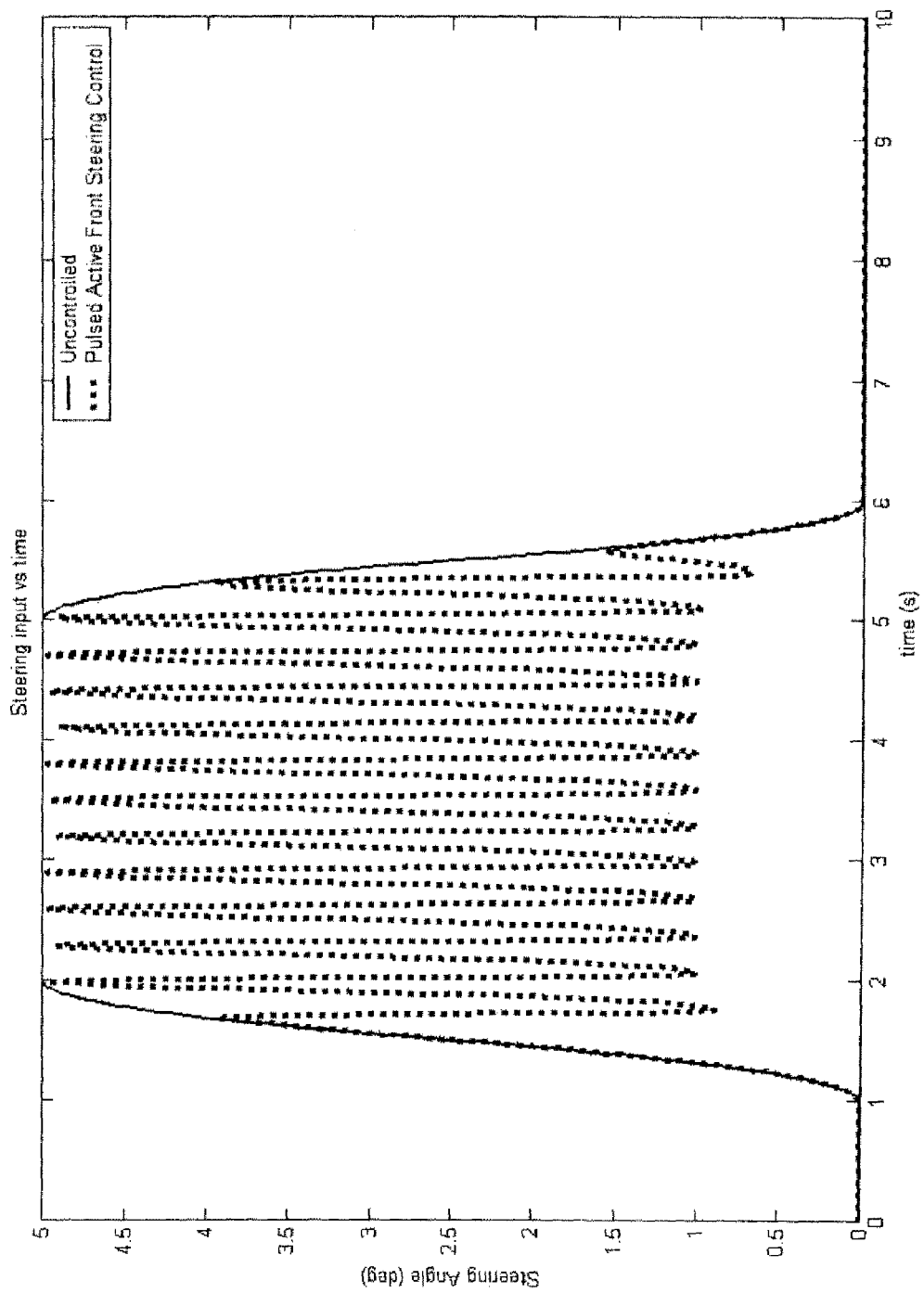
FIG. 15 Driver Steering Input $\delta$ for J-turn Maneuver for PAFS Control.
Figure 16:
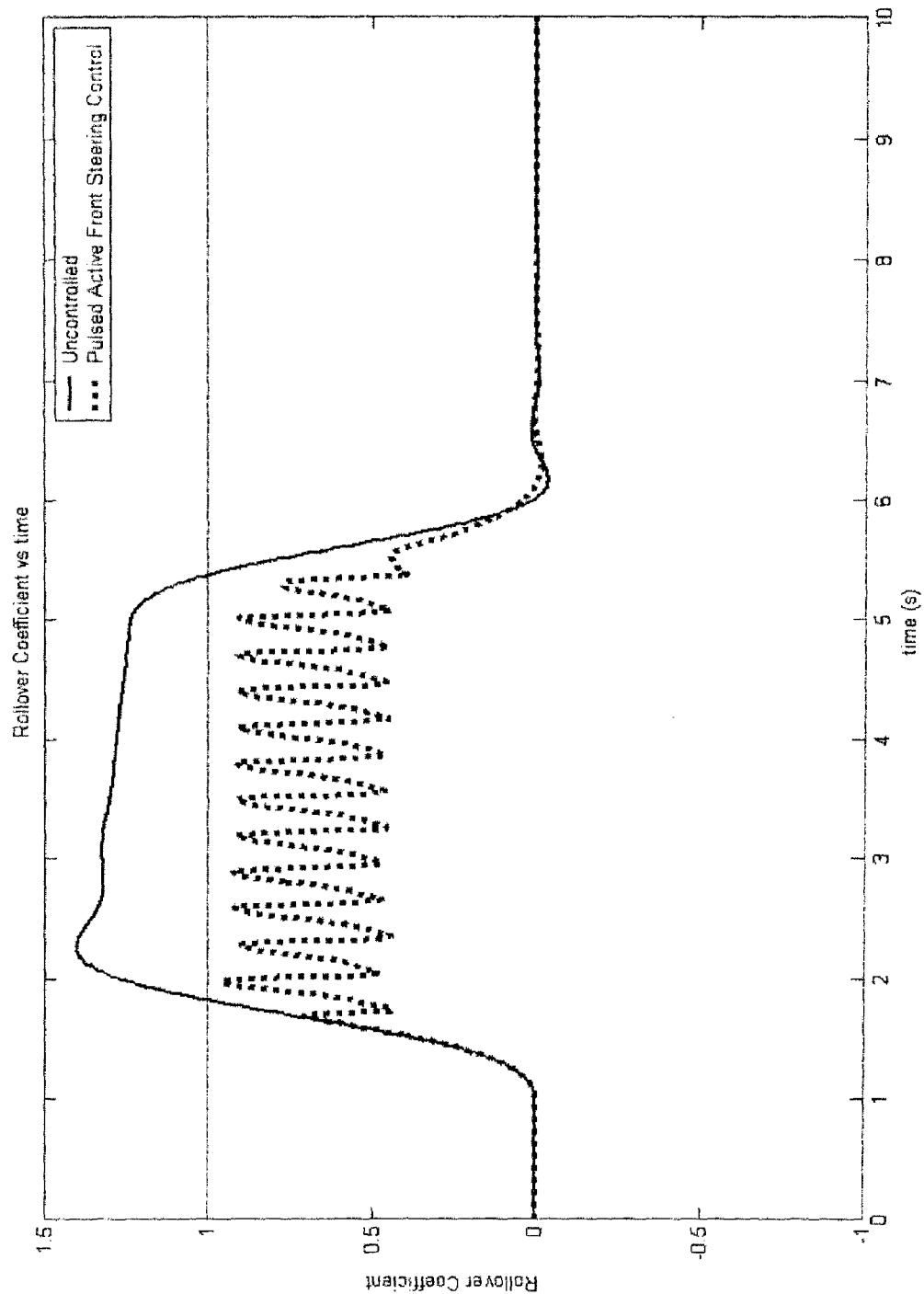
FIG. 16 Rollover Coefficient $R_c$ for J-turn Maneuver for PAFS Control.
Figure 17:
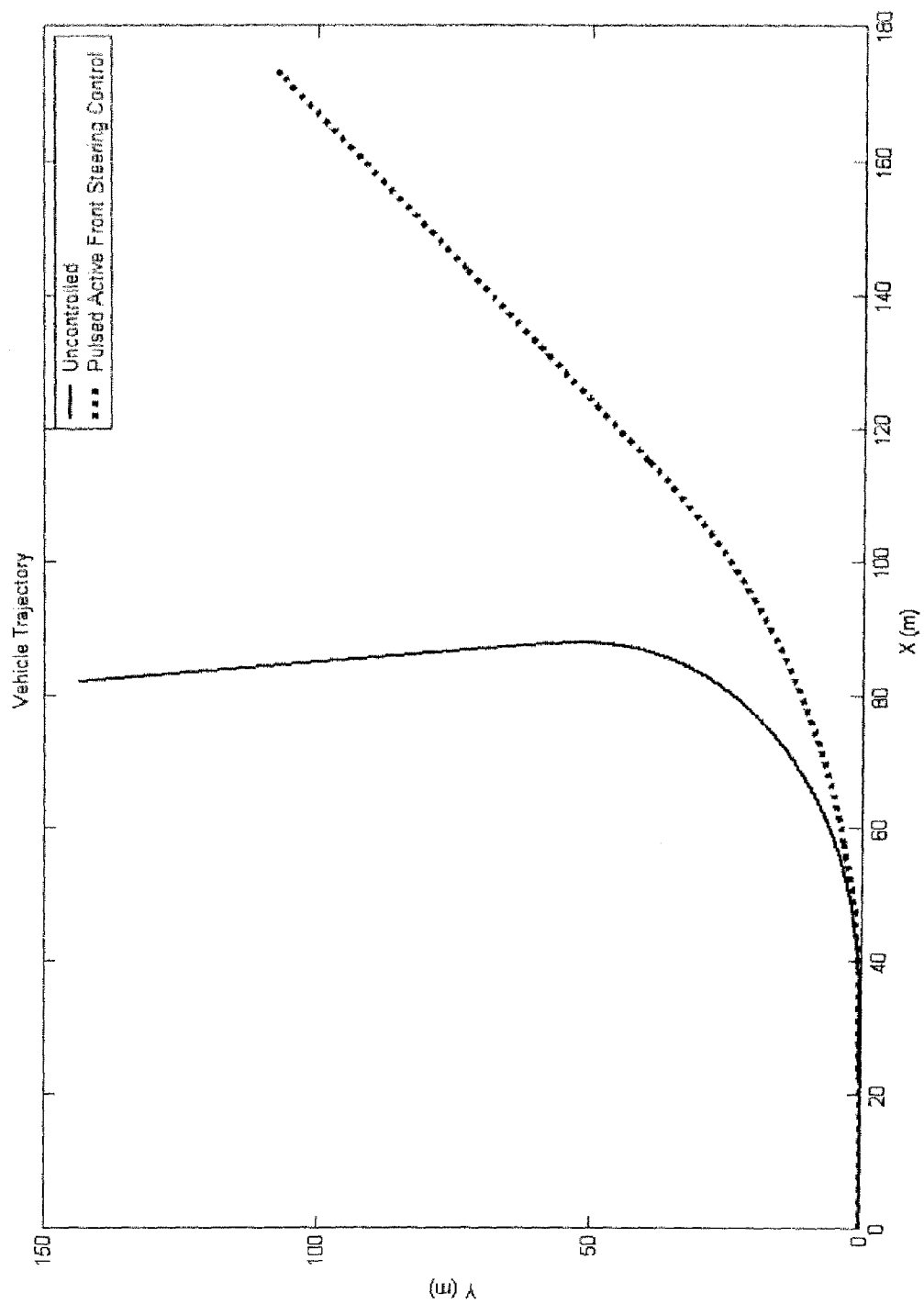
FIG. 17 Vehicle Trajectory for J-turn Maneuver for PAFS Control.
Figure 18:
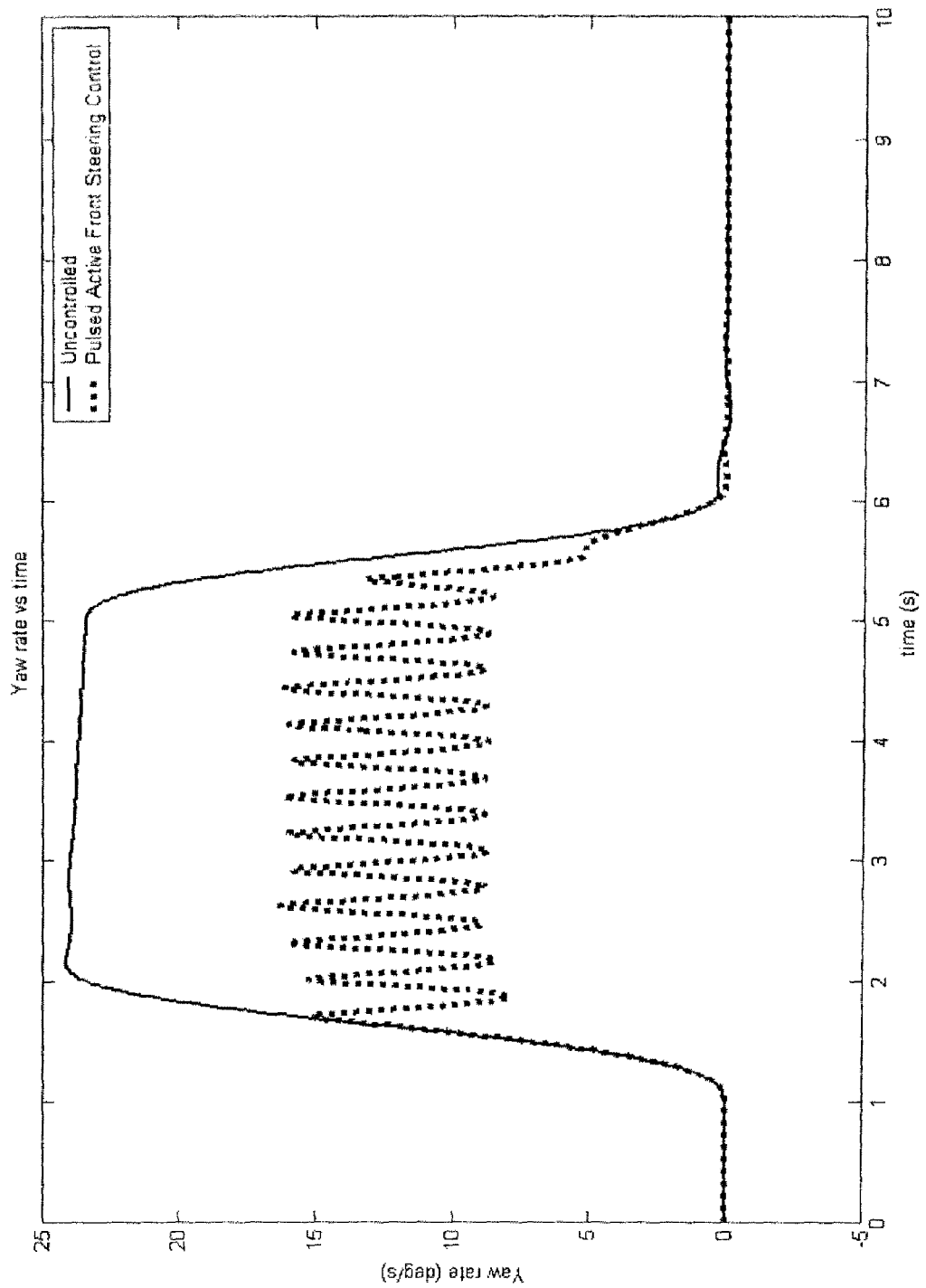
FIG. 18 Vehicle Yaw Rate r for J-turn Maneuver for PAFS Control.
Figure 19:
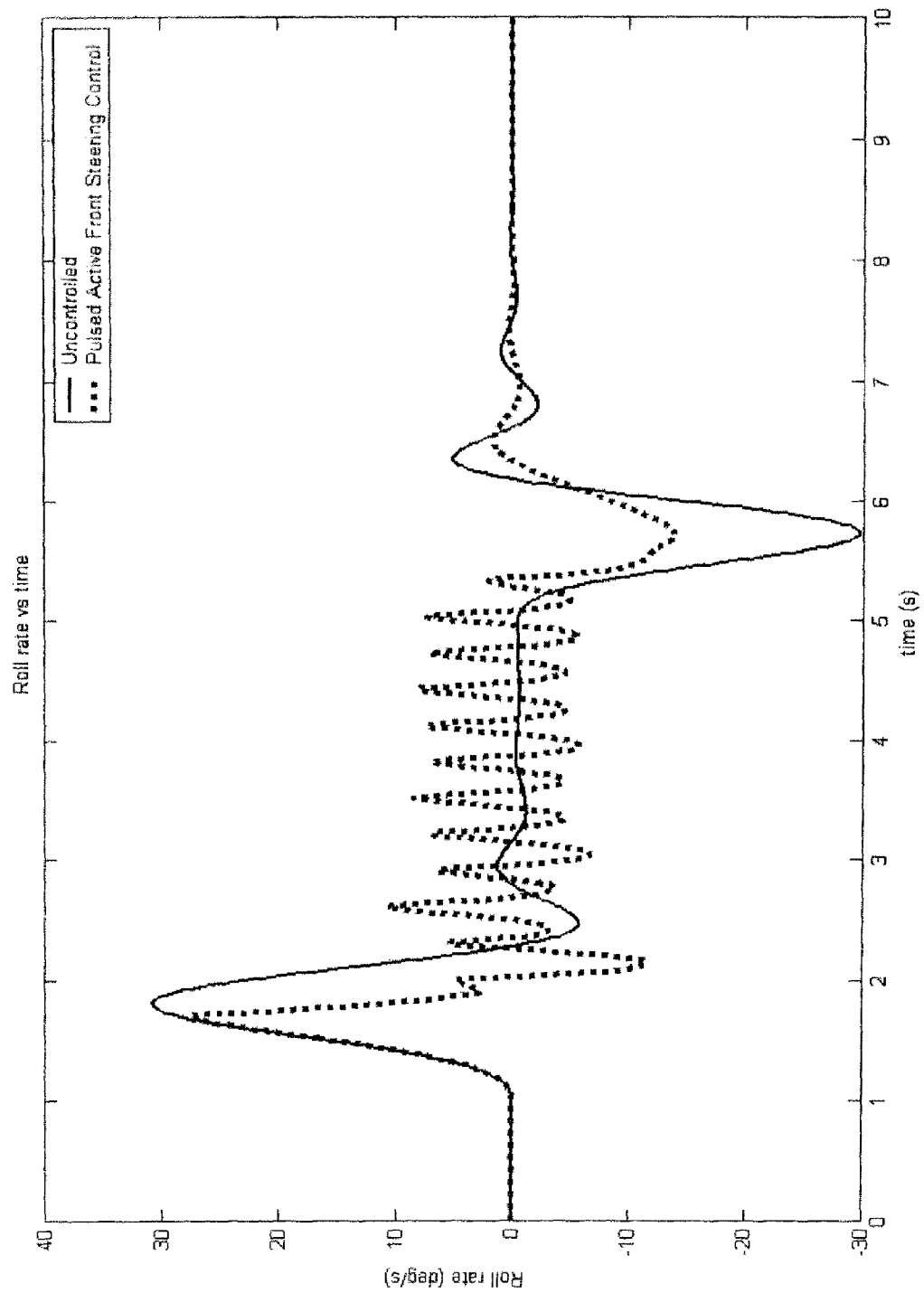
FIG. 19 Roll Rate p for J-turn Maneuver for PAFS Control.
Figure 20:
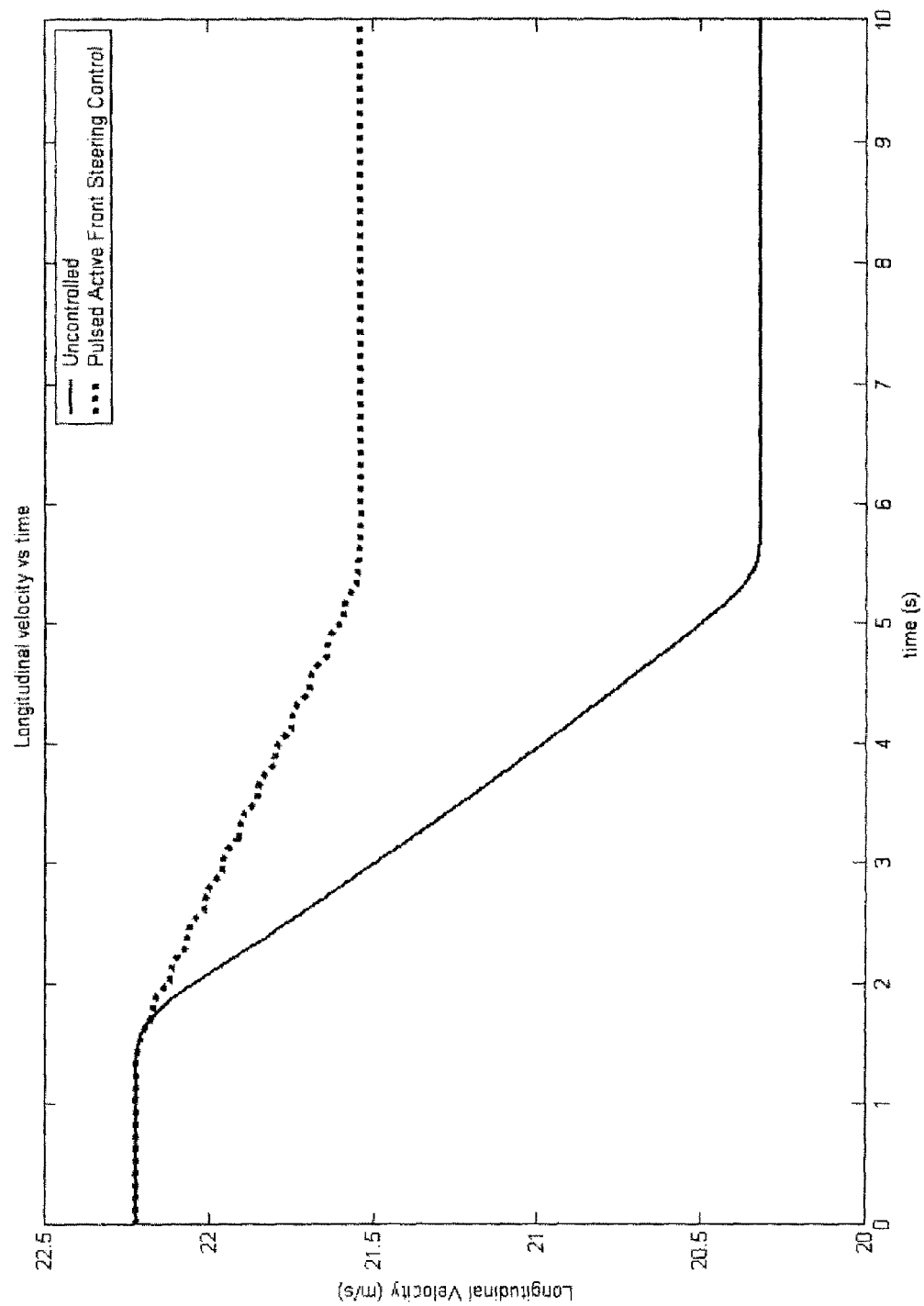
FIG. 20 Vehicle Longitudinal Velocity $v_x$ for J-turn Maneuver for PAFS Control.
Figure 21:
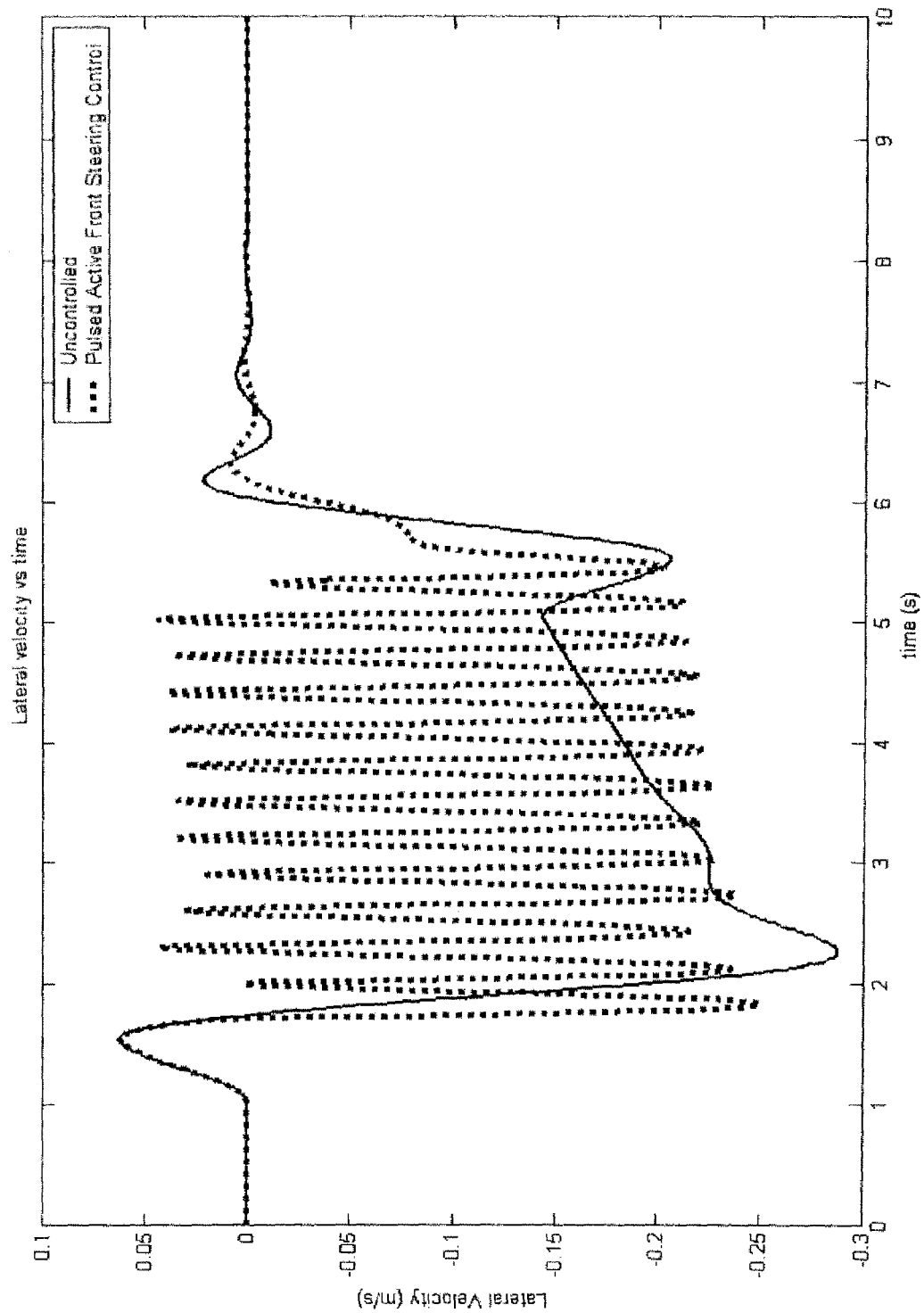
FIG. 21 Vehicle Lateral Velocity $v_y$ for J-turn Maneuver for PAFS Control.

FIG. 15 illustrates the driver steering input as well as the controlled steering input of J-turn manoeuvre. When the rollover coefficient exceeds the threshold of 0.7, the new pulsed active steering controller generates pulsed extra steering to reduce the rollover coefficient within the safety level successfully, as shown in FIG. 16. Simulations were shown that this was not achievable for both conventional active steering and differential braking controller. It is evident that for being able to reduce the rollover coefficient within the safety ranges, the controlled vehicle trajectory shows a greater deviance to the original uncontrolled trajectory, as illustrated in FIG. 17.

The basic concept of this pulsed active steering control is to reduce the vehicle lateral movement as well as vehicle yaw rate and, therefore, the vehicle roll rate and rollover coefficient is also reduced.

FIGS. 18, 19, 20, and 21 illustrate the details of vehicle yaw rate, roll rate, longitudinal velocity and lateral velocity, respectively. One can also notice, as the vehicle steers, part of the original longitudinal velocity transfers to the lateral direction and will finally lose part of its speed entirely to the tire road friction energy lost, since there is no extra driving power generated by the engine during the simulation.

Figure 22:
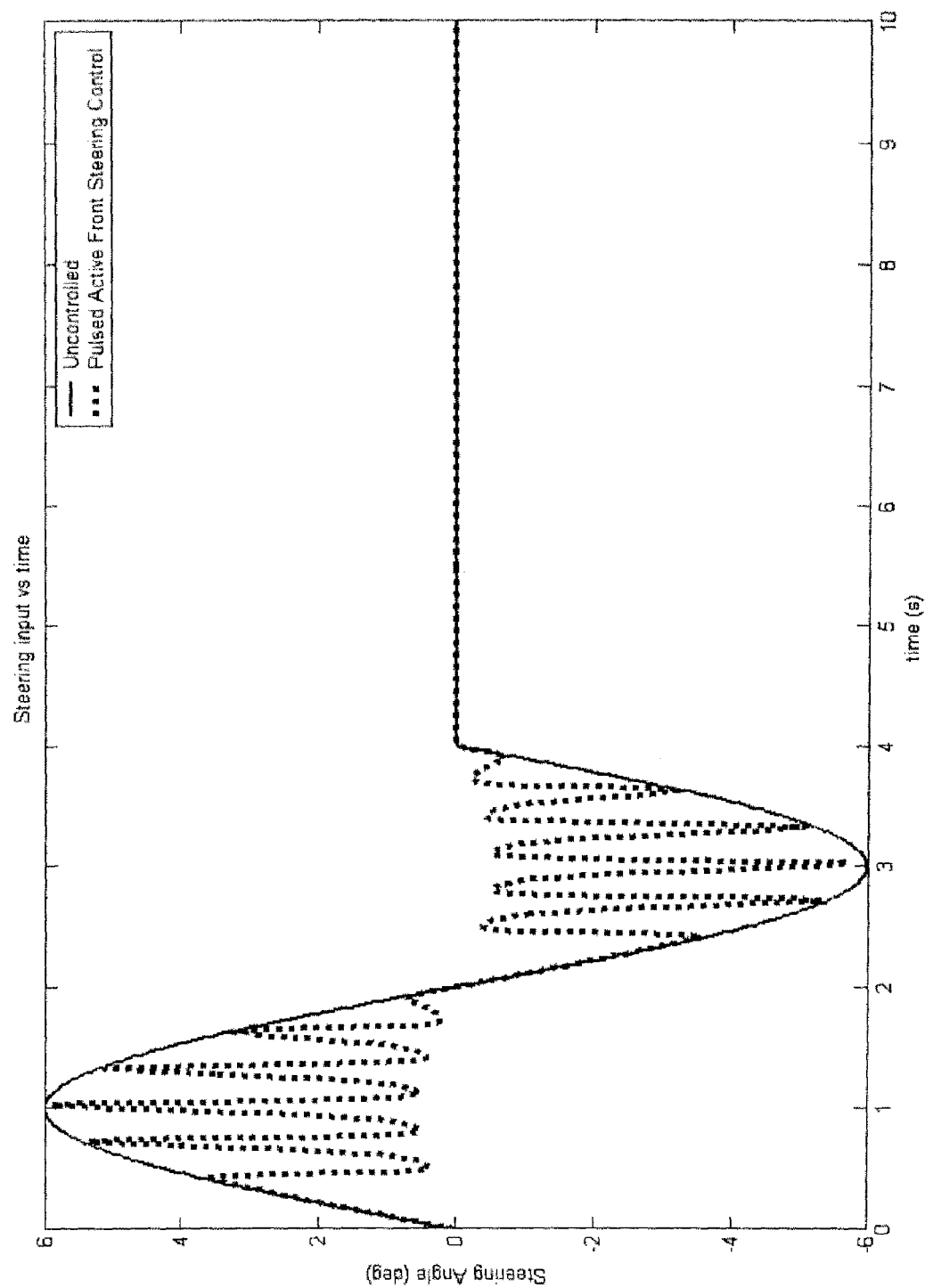
FIG. 22 Driver Steering Input $\delta$ for SLC Maneuver for PAFS Control.
Figure 23:
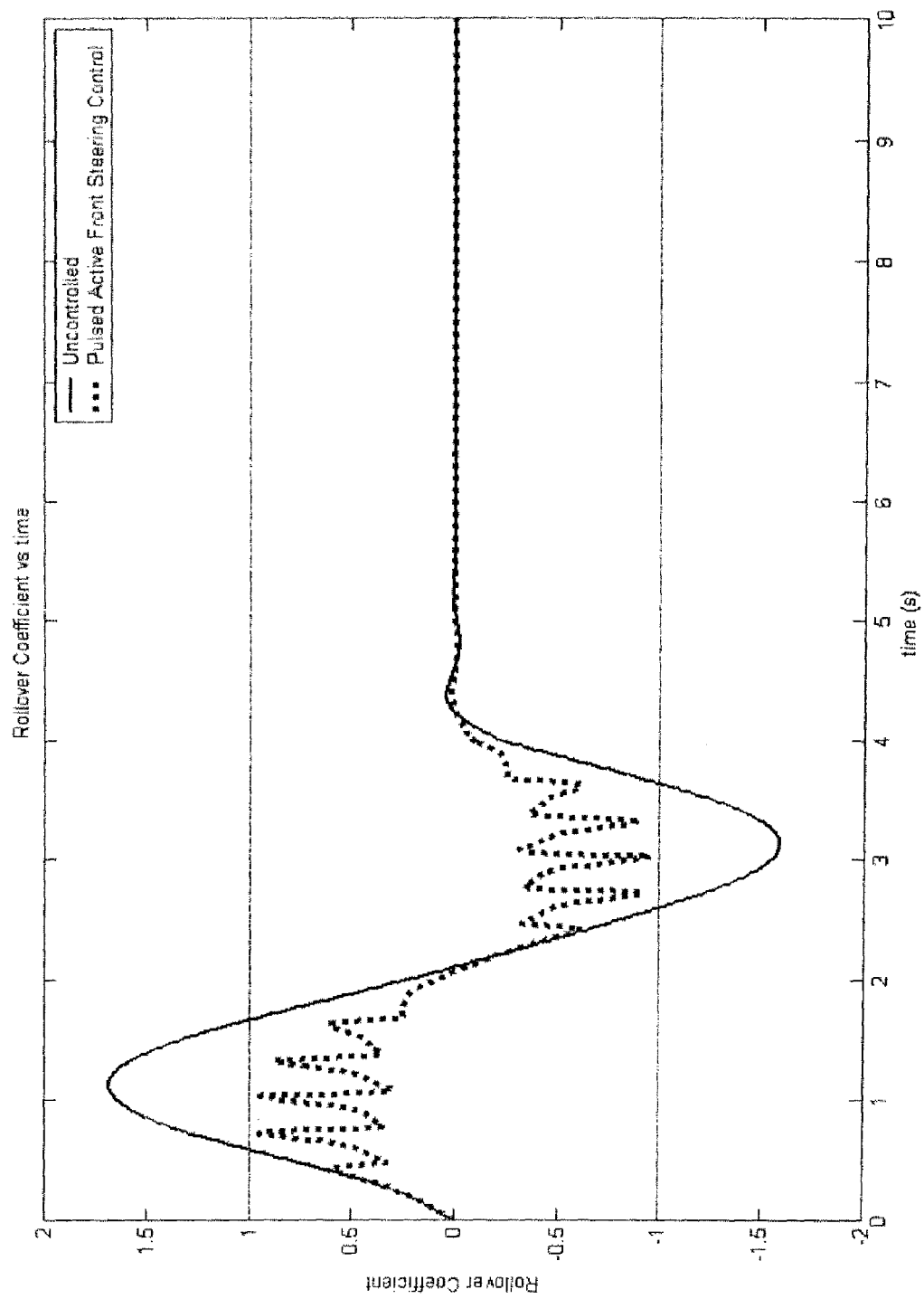
FIG. 23 Rollover Coefficient $R_c$ for SLC Maneuver for PAFS Control.
Figure 24:
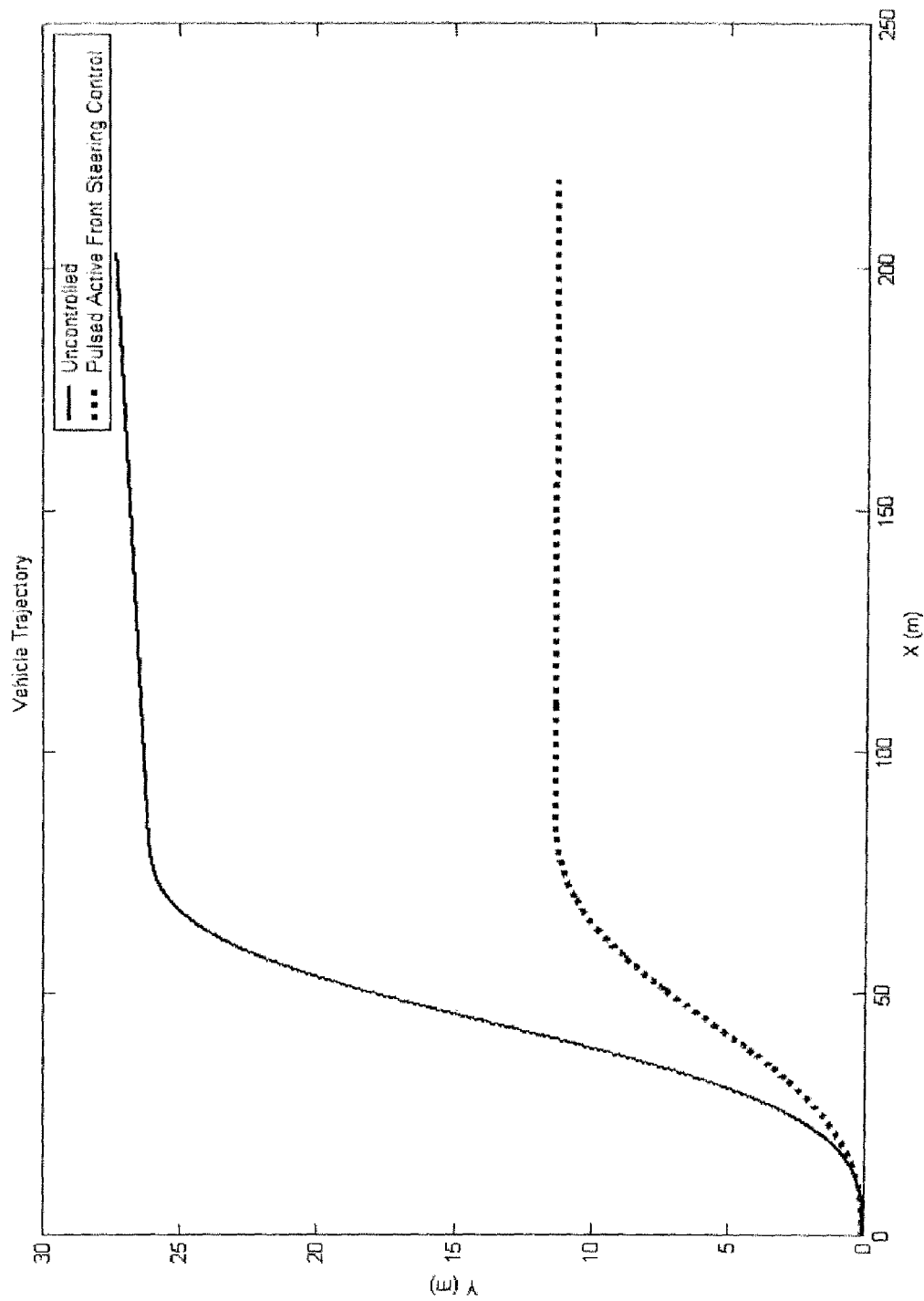
FIG. 24 Vehicle Trajectory for SLC Maneuver for PAFS Control.
Figure 25:
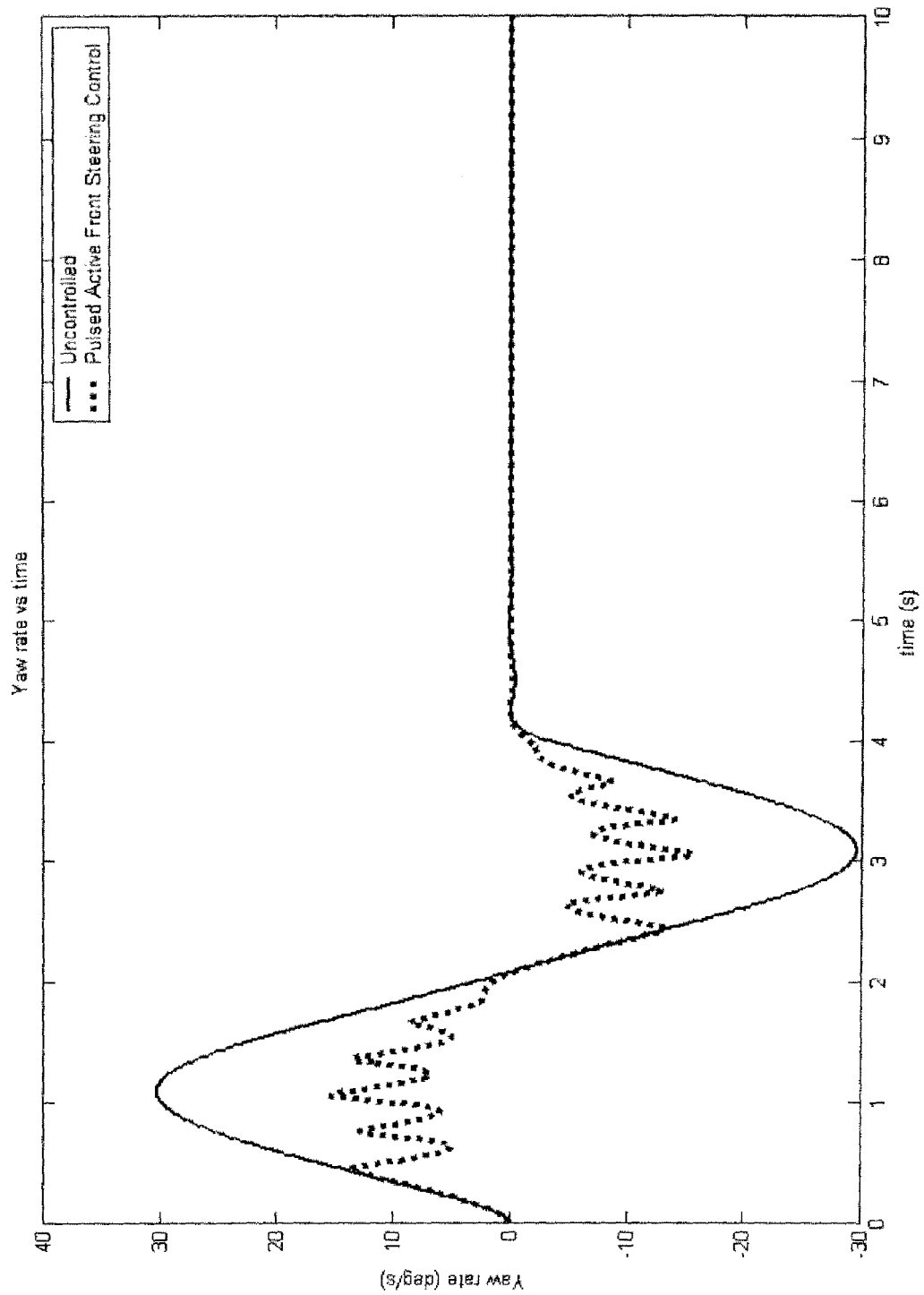
FIG. 25 Vehicle Yaw Rate r for SLC Maneuver for PAFS Control.
Figure 26:
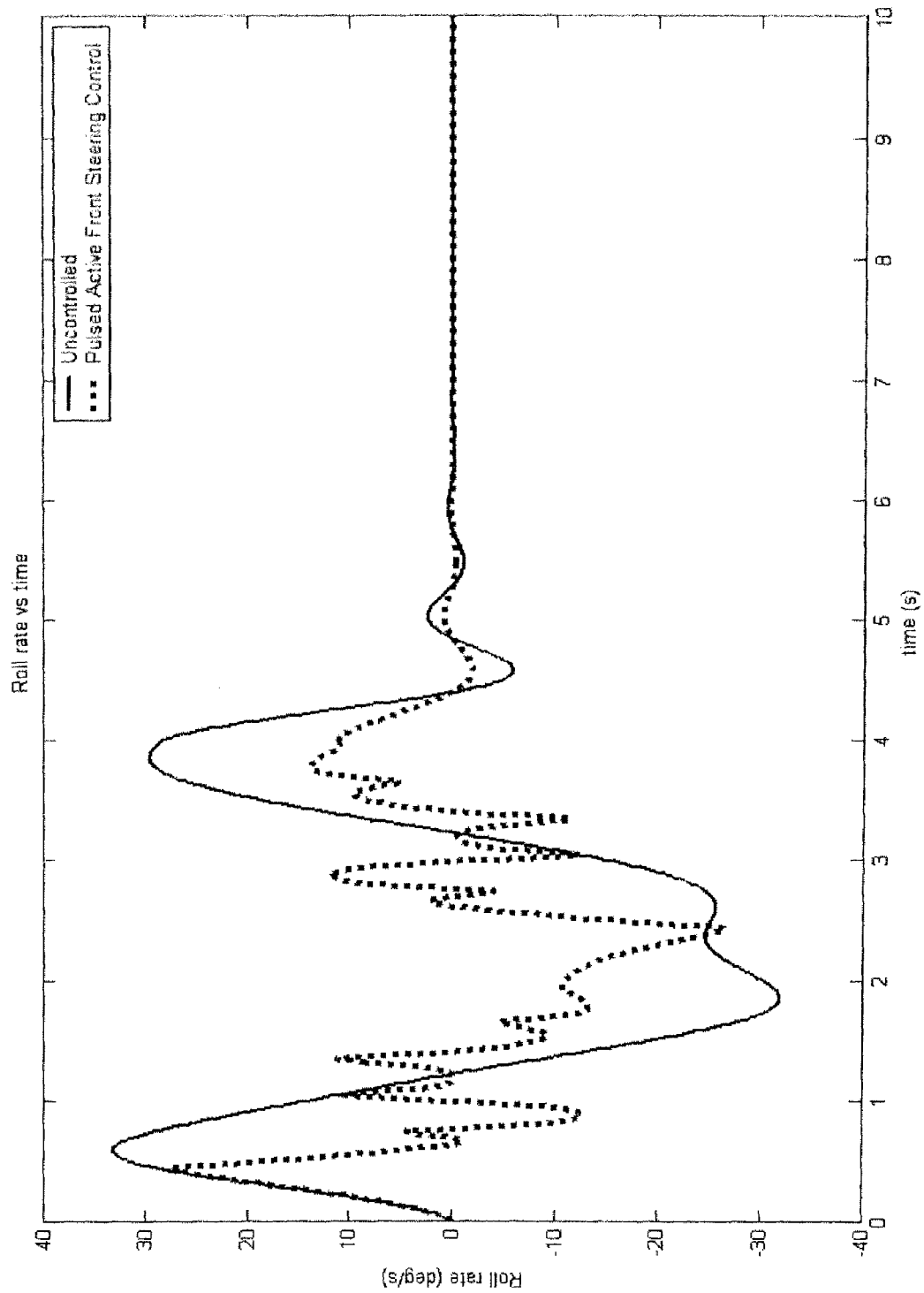
FIG. 26 Roll Rate p for SLC Maneuver for PAFS Control.
Figure 27:
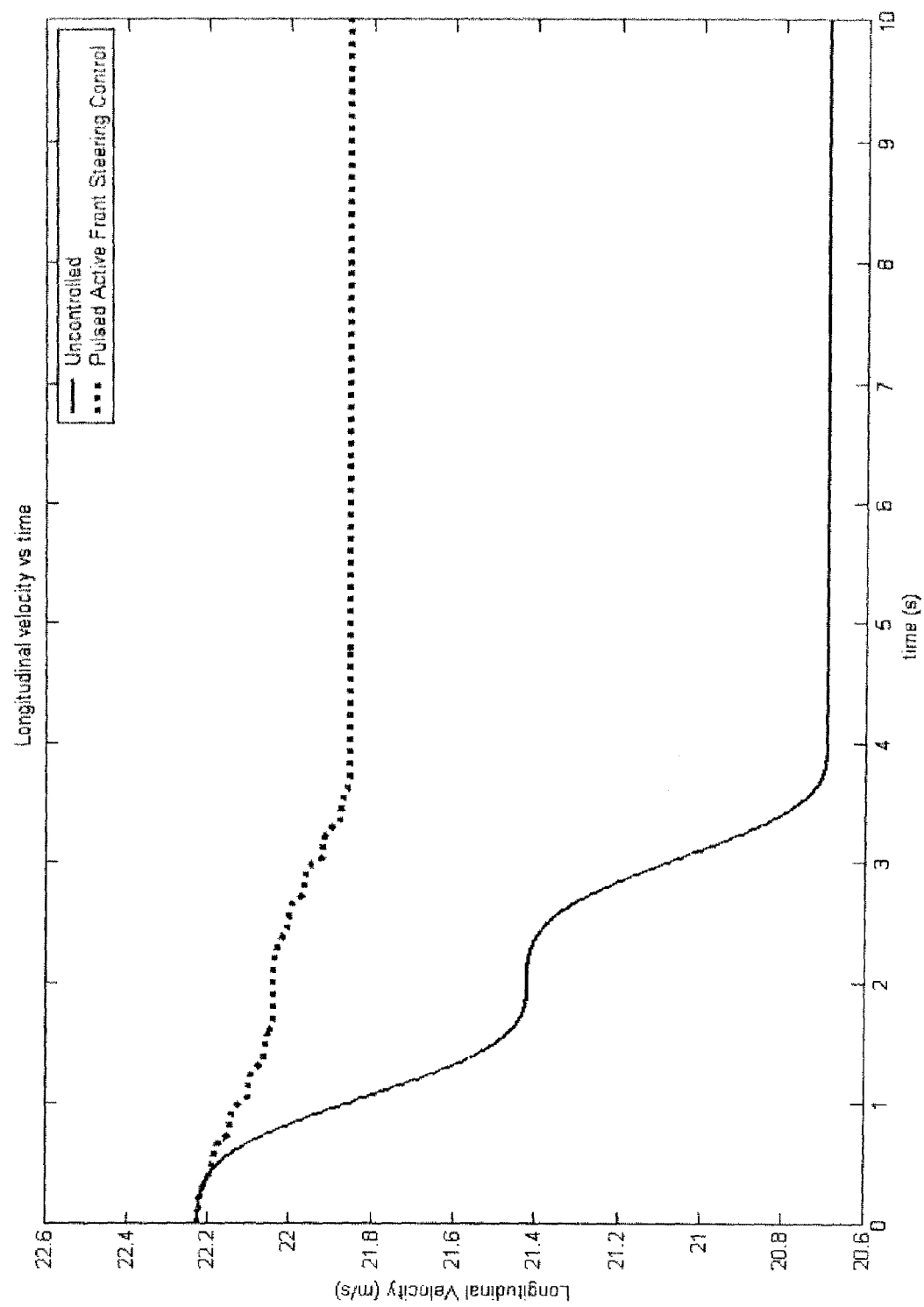
FIG. 27 Vehicle Longitudinal Velocity $v_x$ for SLC Maneuver for PAFS Control.
Figure 28:
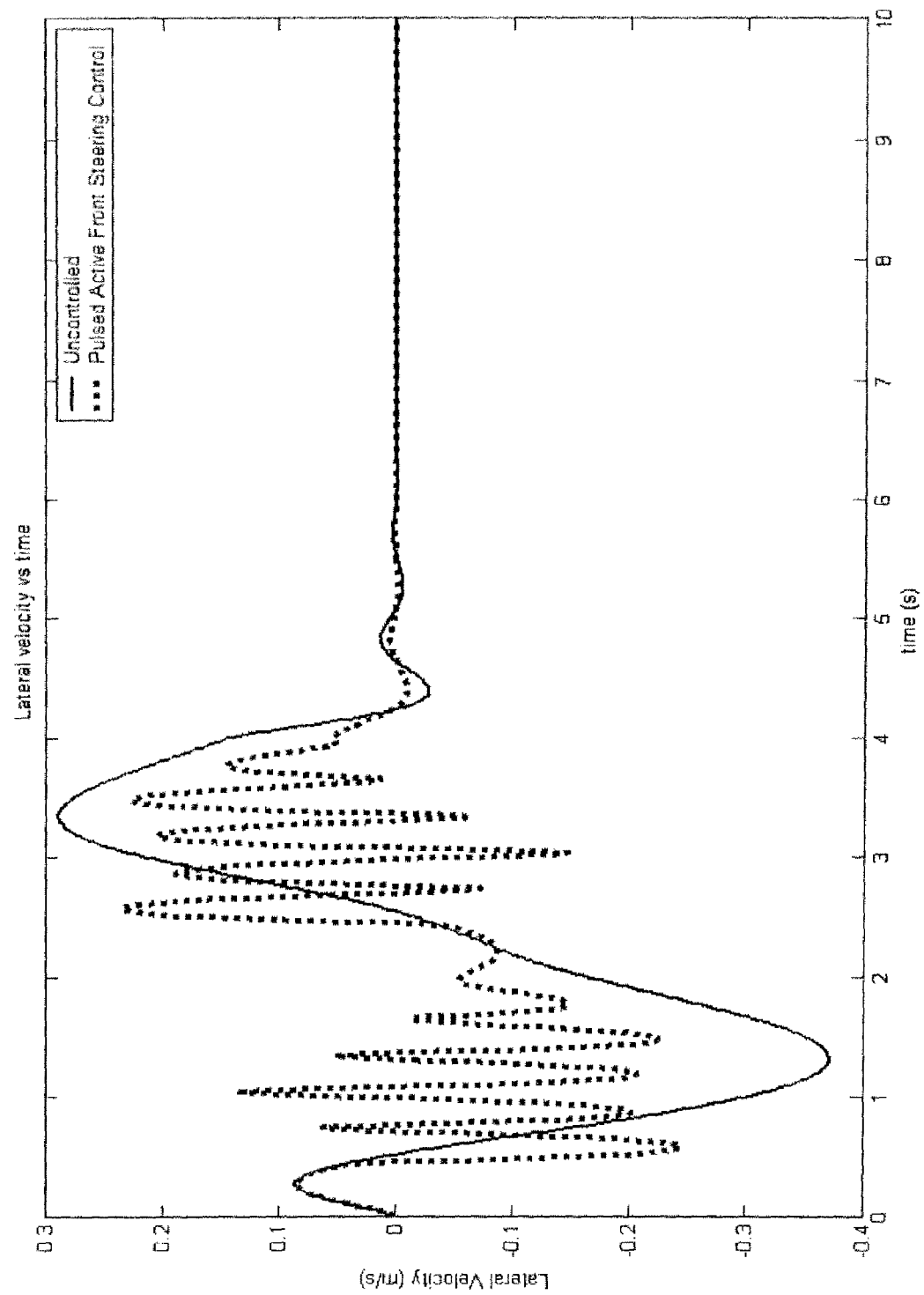
FIG. 28 Vehicle Lateral Velocity $v_y$ for SLC Maneuver for PAFS Control.

FIG. 22 illustrates the driver steering input as well as the controlled steering input of sinusoidal (single lane change) manoeuvre. Again, with identical simulation setups, the new pulsed active steering controller successfully reduces the rollover coefficient within the safety range, as shown in FIG. 23.

FIGS. 24, 25, 26, 27, and 28 illustrate the details of vehicle trajectory, yaw rate, roll rate, longitudinal velocity, and lateral velocity, respectively.

Figure 29:
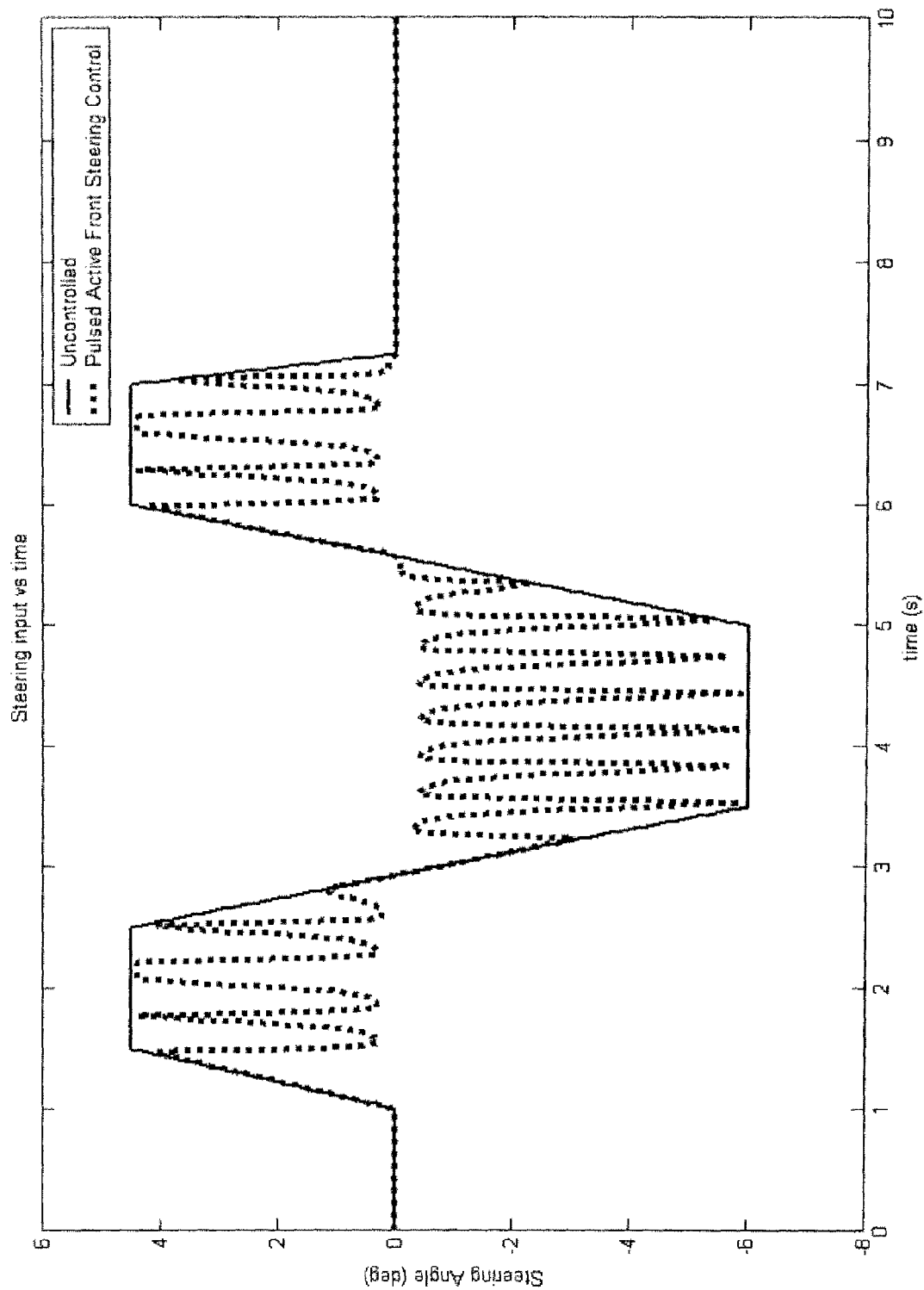
FIG. 29 Driver Steering Input $\delta$ for DLC Maneuver for PAFS Control.
Figure 30:
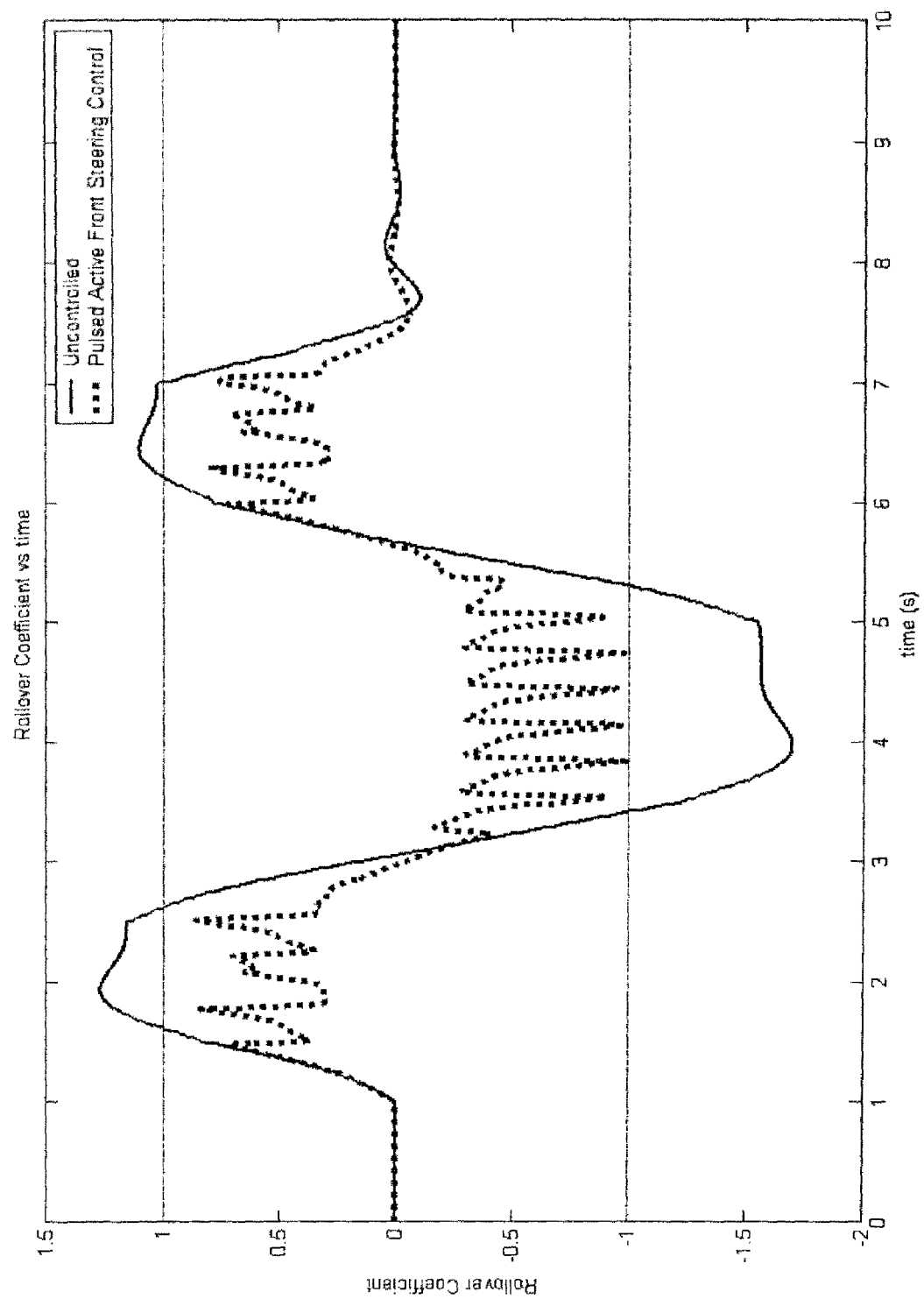
FIG. 30 Rollover Coefficient $R_c$ for DLC Maneuver for PAFS Control.
Figure 31:
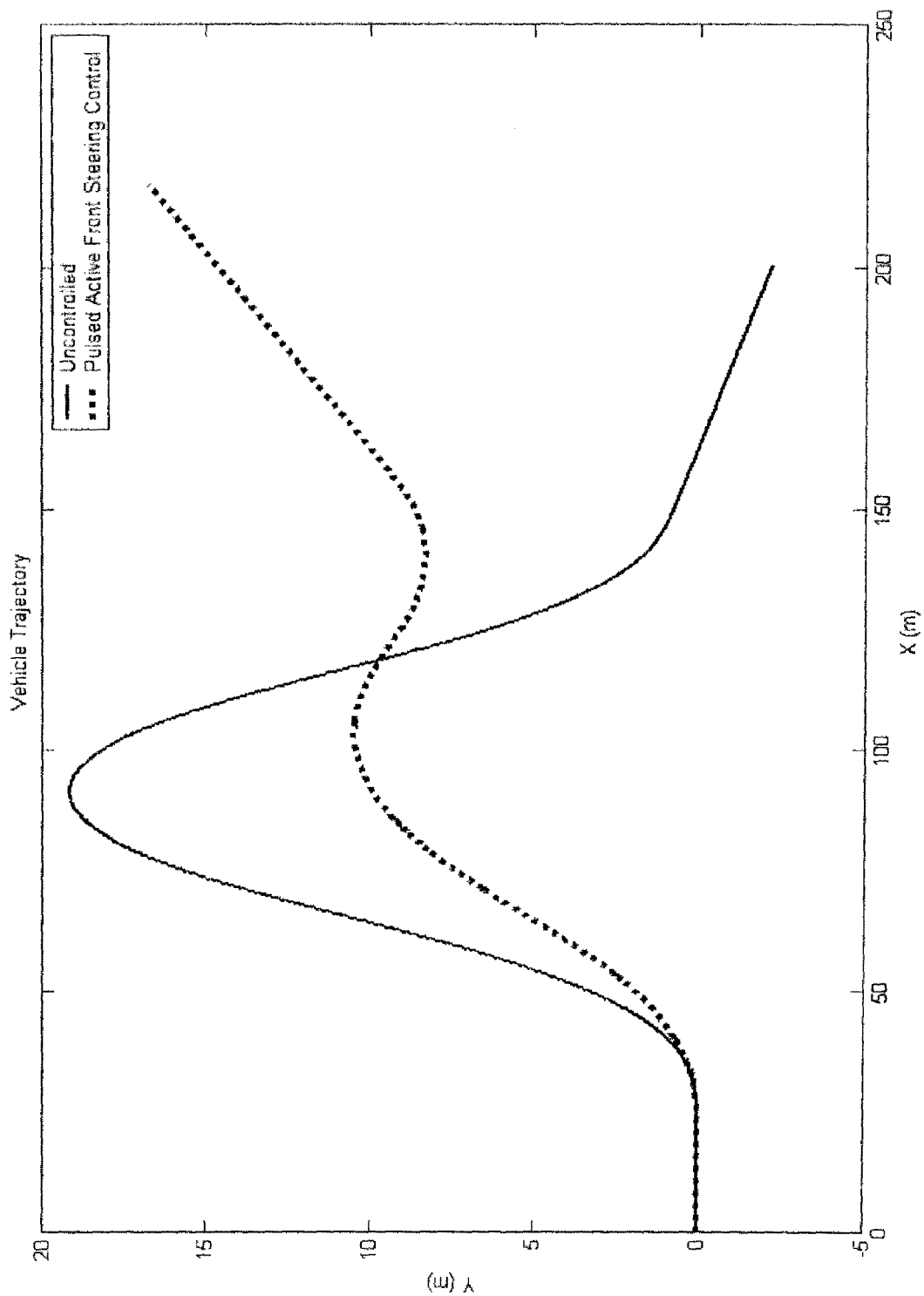
FIG. 31 Vehicle Trajectory for DLC Maneuver for PAFS Control.
Figure 32:
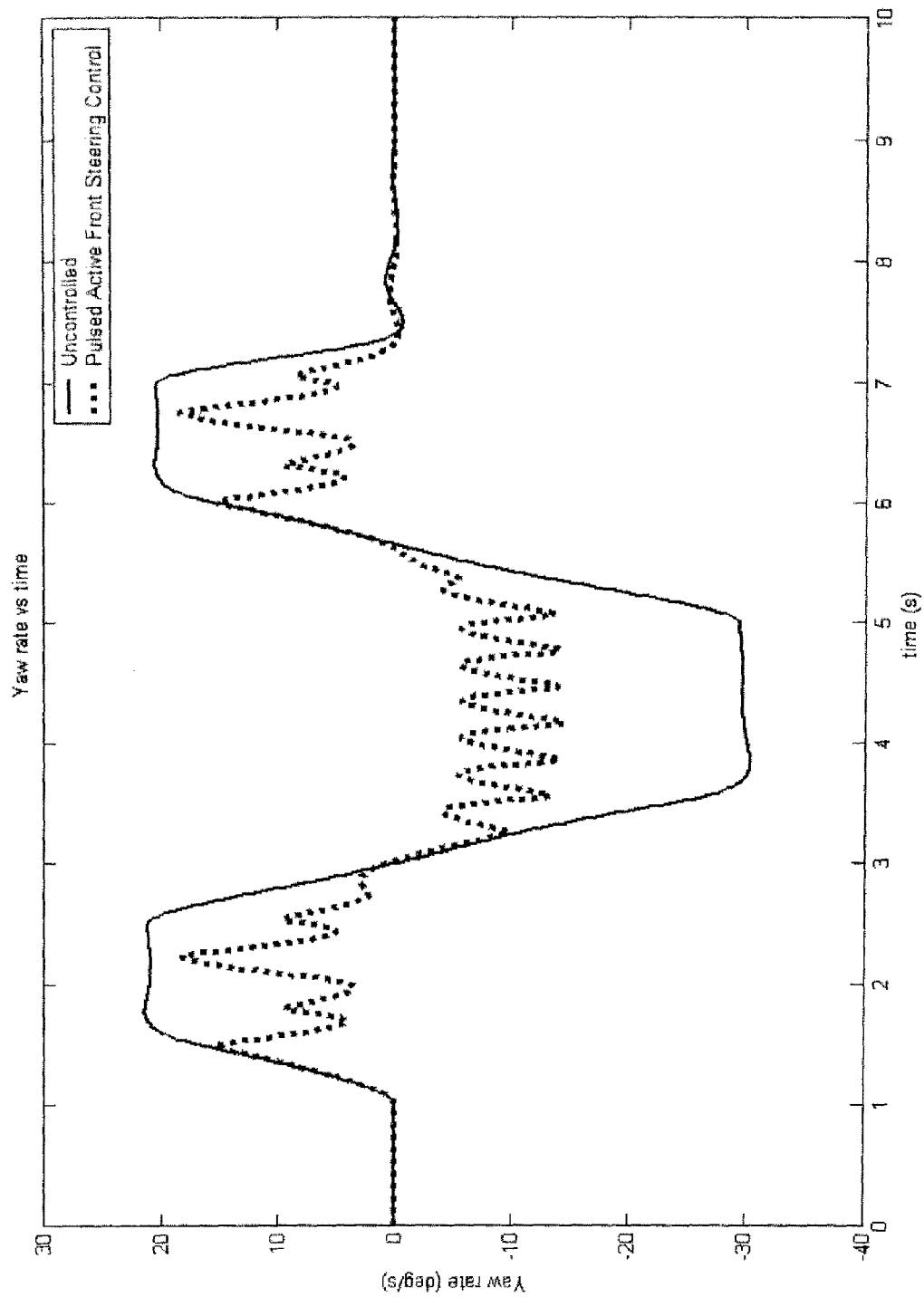
FIG. 32 Vehicle Yaw Rate r for DLC Maneuver for PAFS Control.
Figure 33:
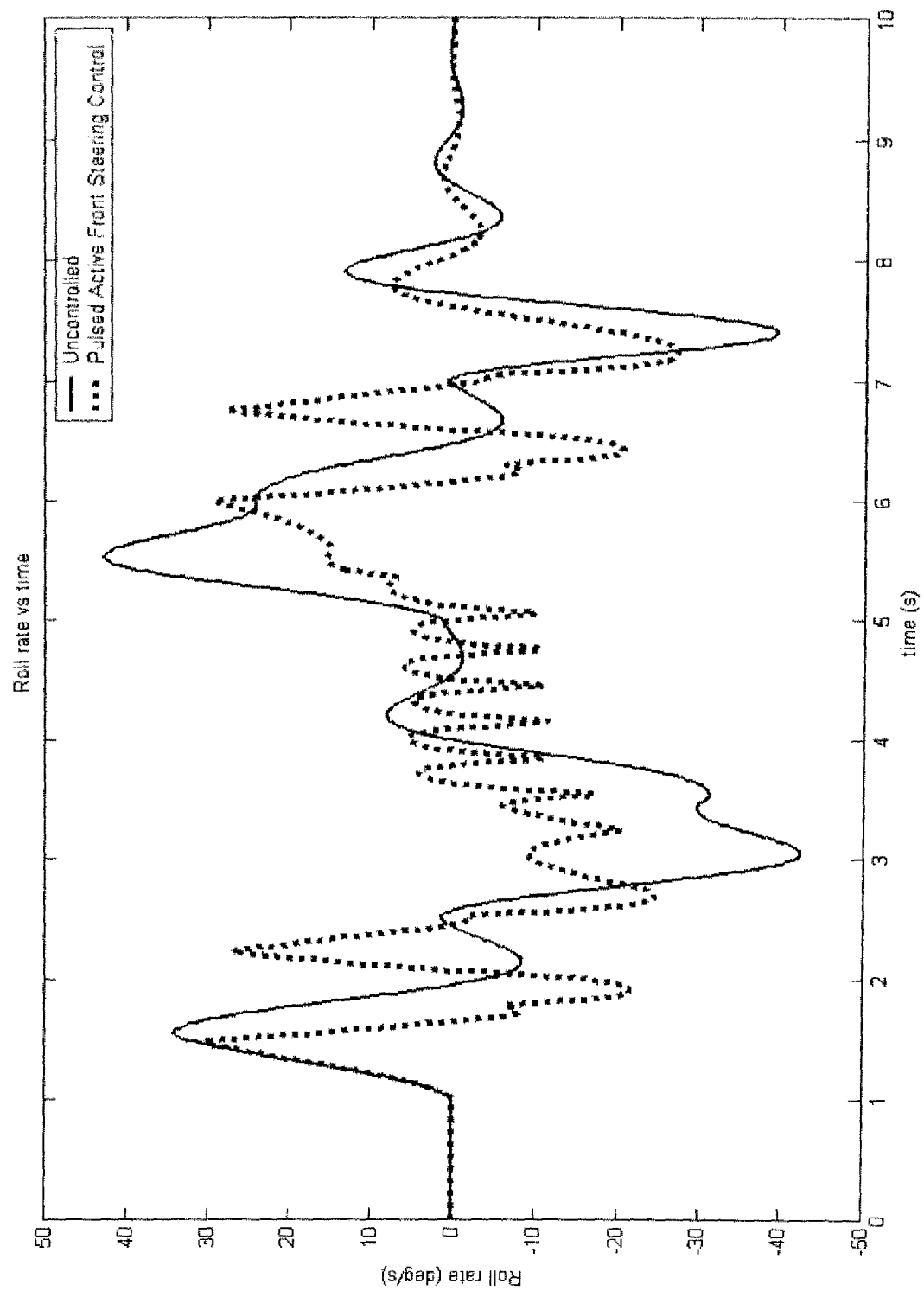
FIG. 33 Roll Rate p for DLC Maneuver for PAFS Control.
Figure 34:
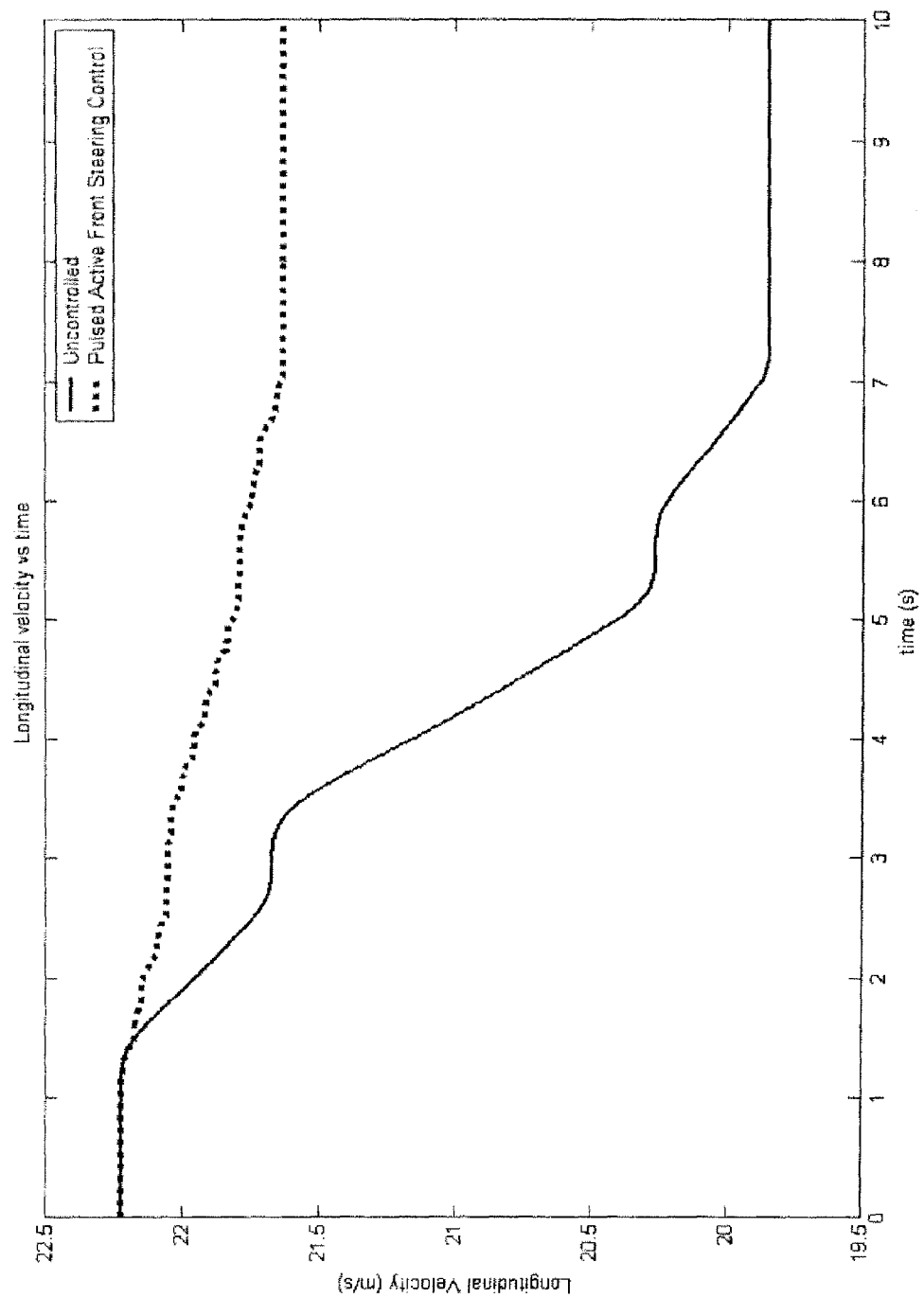
FIG. 34 Vehicle Longitudinal Velocity $v_x$ for DLC Maneuver for PAFS Control.
Figure 35:
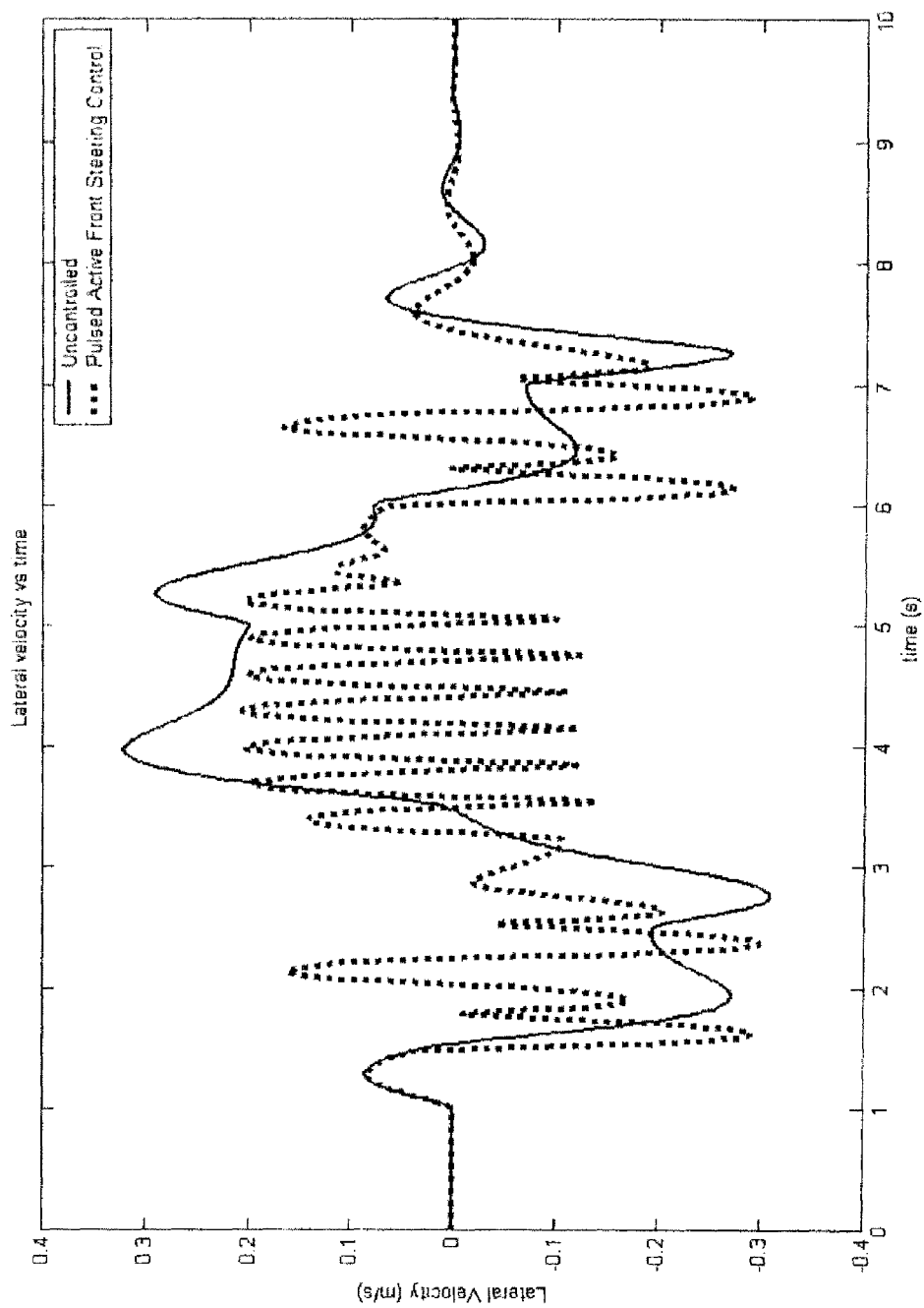
FIG. 35 page 114 Vehicle Lateral Velocity $v_y$ for DLC Maneuver for PAFS Control.

FIG. 29 illustrates the driver steering input as well as the controlled steering input of the double lane change manoeuvre. At first, the controller has some difficulty with the negative part of the rollover coefficient between the $3^{rd}$ and $5^{th}$ seconds. After a slight tweaking of the pulsed control algorithm by changing the negative threshold to −0.4 to force the steering pulse to initiate earlier when the rollover coefficient is in the negative part of the curve, the controller again reduces the rollover coefficient successfully within the safety range, as illustrated in FIG. 30. This simulation result shows that not only are the amplitude and frequency of the pulse important, but the timing when the pulse has been triggered by the controller is also important. This gives another degree of flexibility when tweaking the new pulsed active steering controller to a different emergency manoeuvre. The same strategy when applying on the conventional active steering and differential braking controller, however, does not make any difference to the result when tested.

FIGS. 31, 32, 33, 34, and 35 illustrate the details of vehicle trajectory, yaw rate, roll rate, longitudinal velocity, and lateral velocity, respectively.

Figure 36:
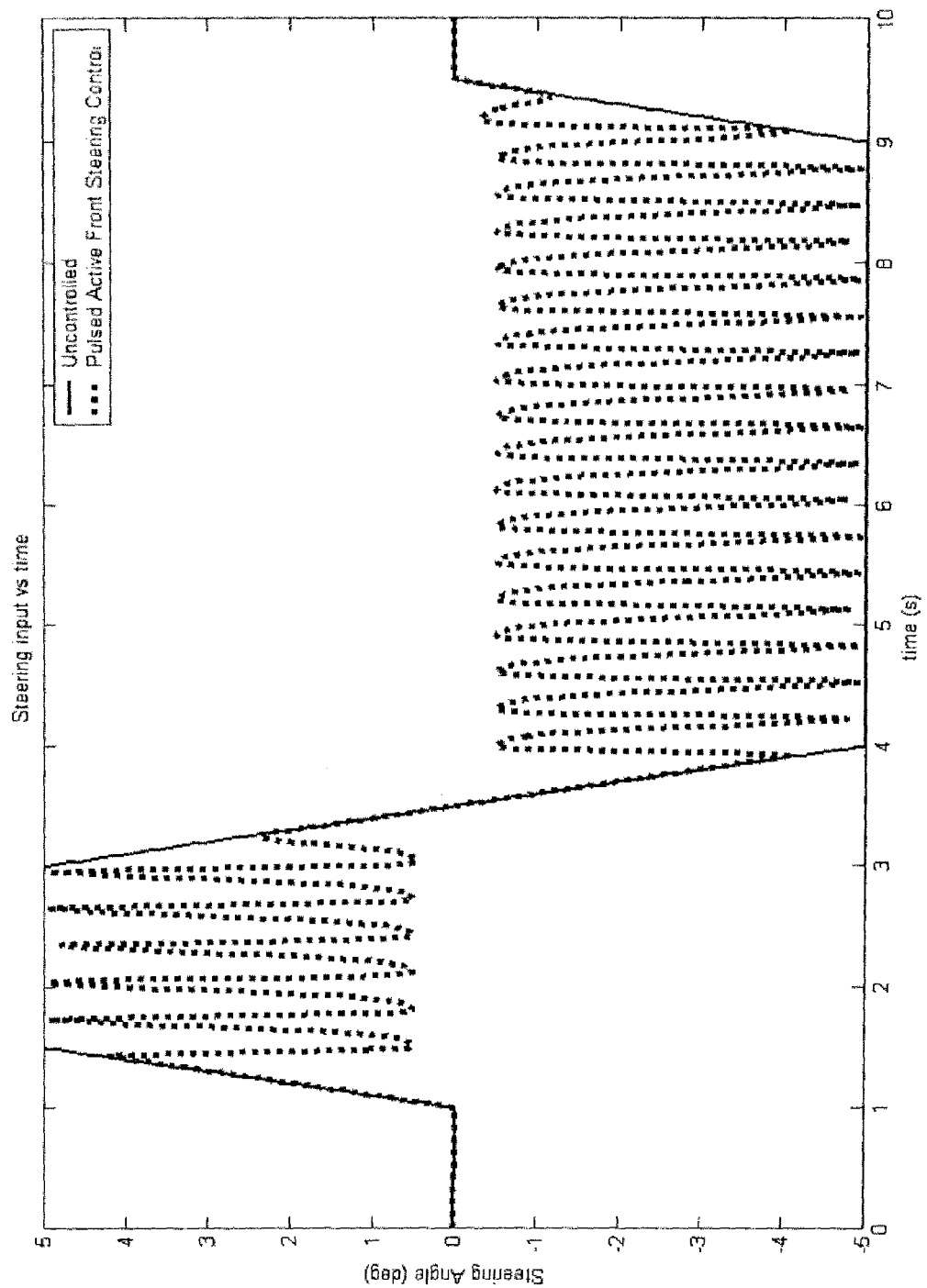
FIG. 36 Driver Steering Input δ for Fishhook Maneuver for PAFS Control.
Figure 37:
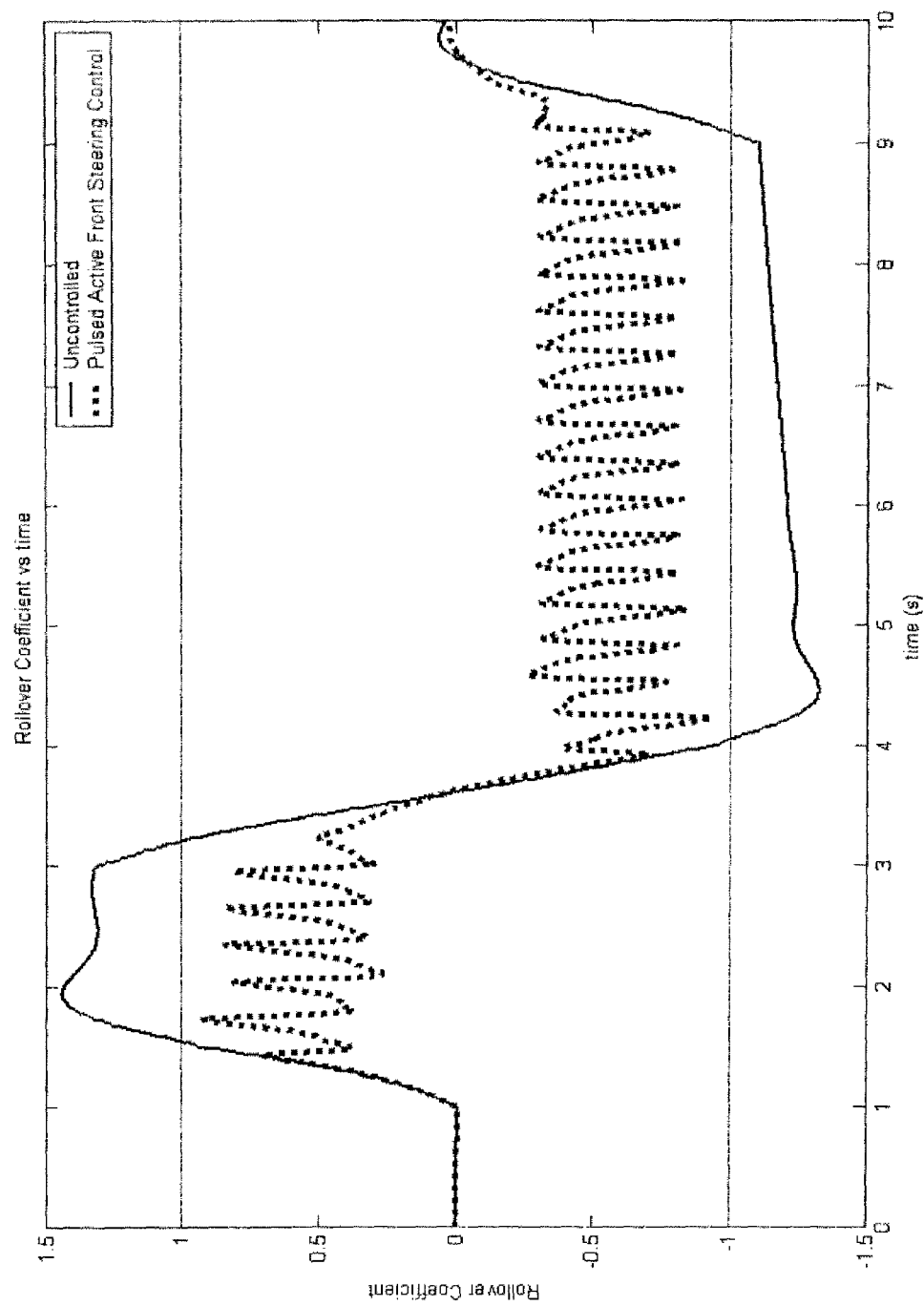
FIG. 37 Rollover Coefficient $R_c$ for Fishhook Maneuver for PAFS Control.
Figure 38:
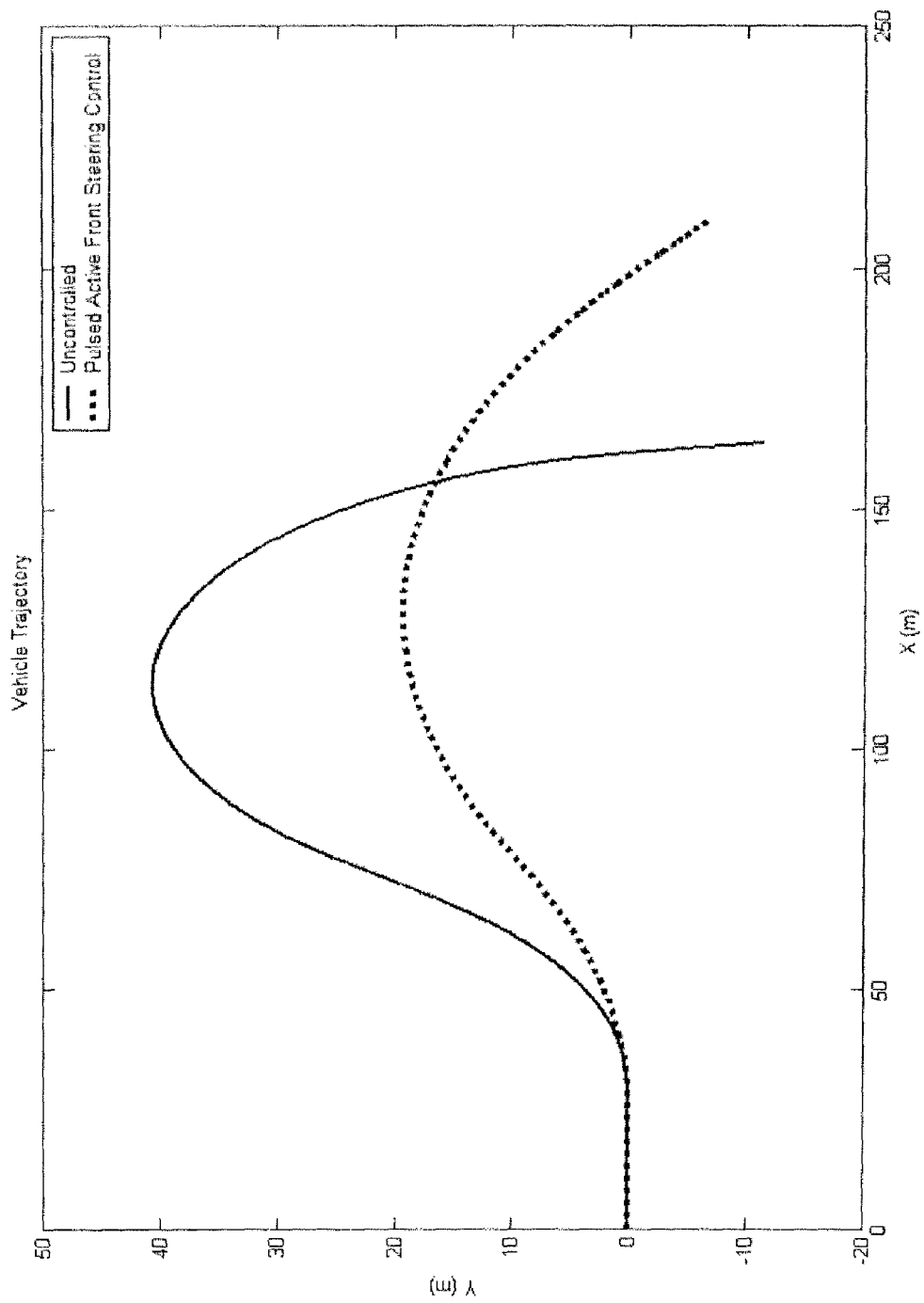
FIG. 38 Vehicle Trajectory for Fishhook Maneuver for PAFS Control.
Figure 39:
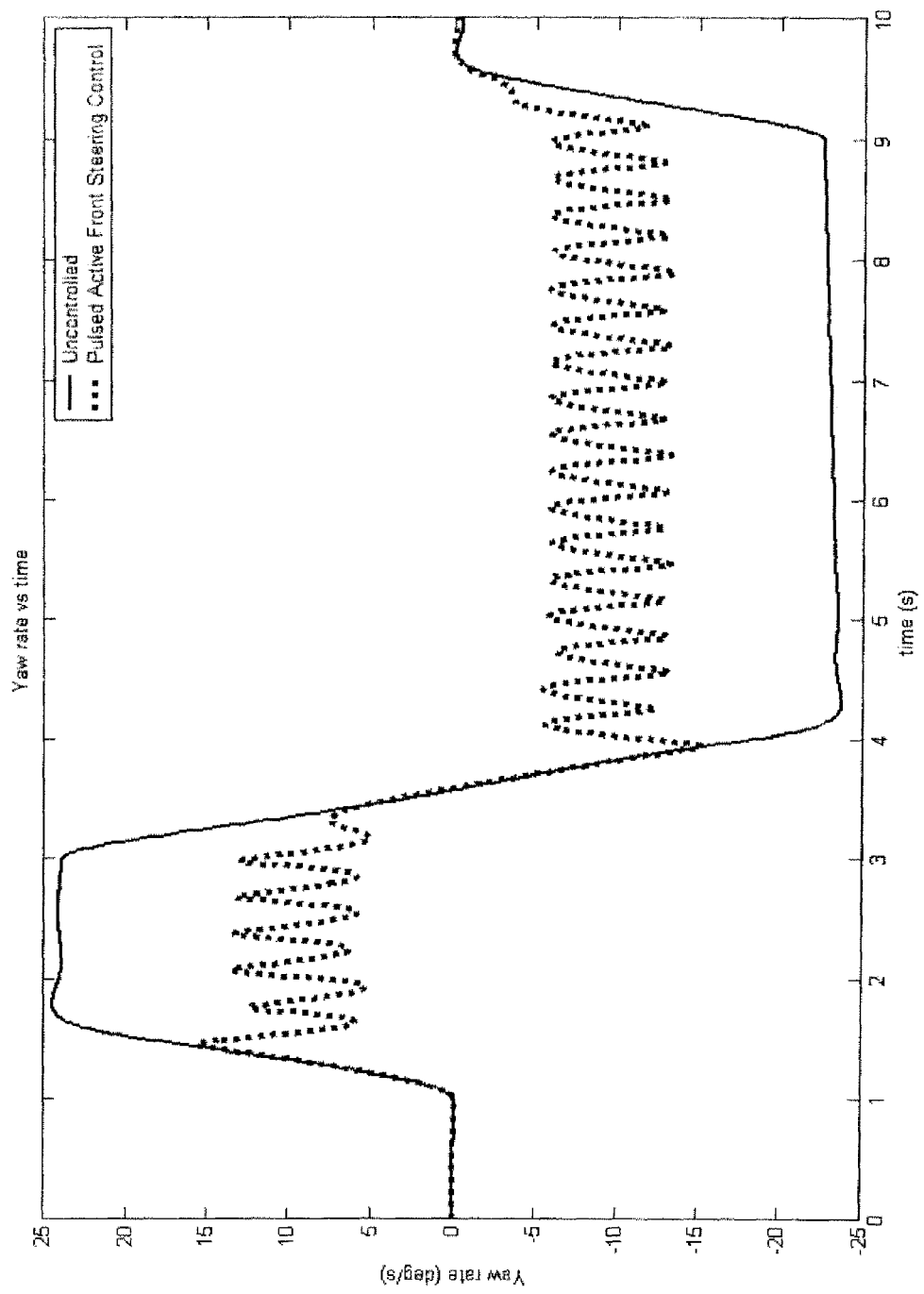
FIG. 39 Vehicle Yaw Rate r for Fishhook Maneuver for PAFS Control.
Figure 40:
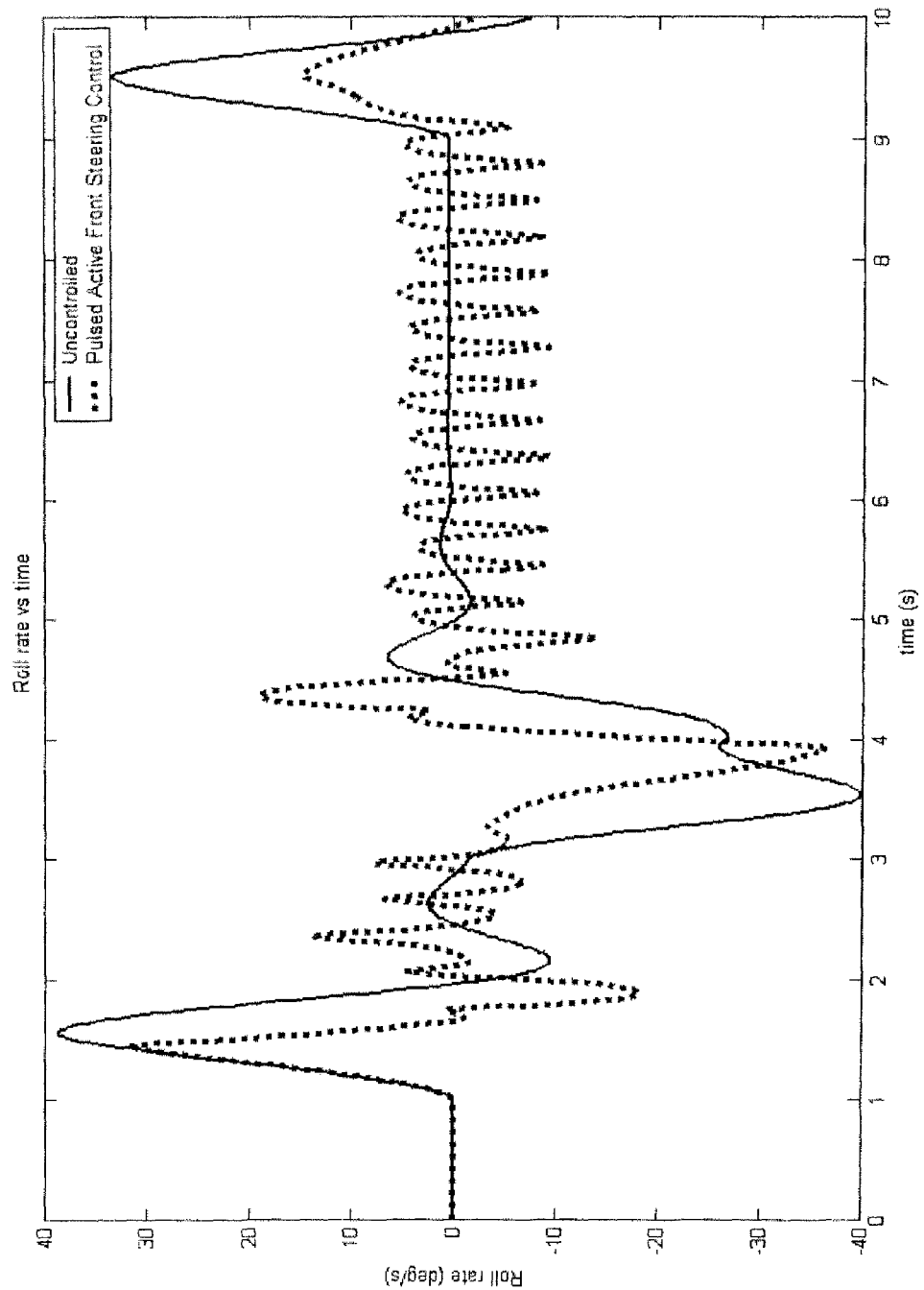
FIG. 40 Roll Rate p for Fishhook Maneuver for PAFS Control.
Figure 41:
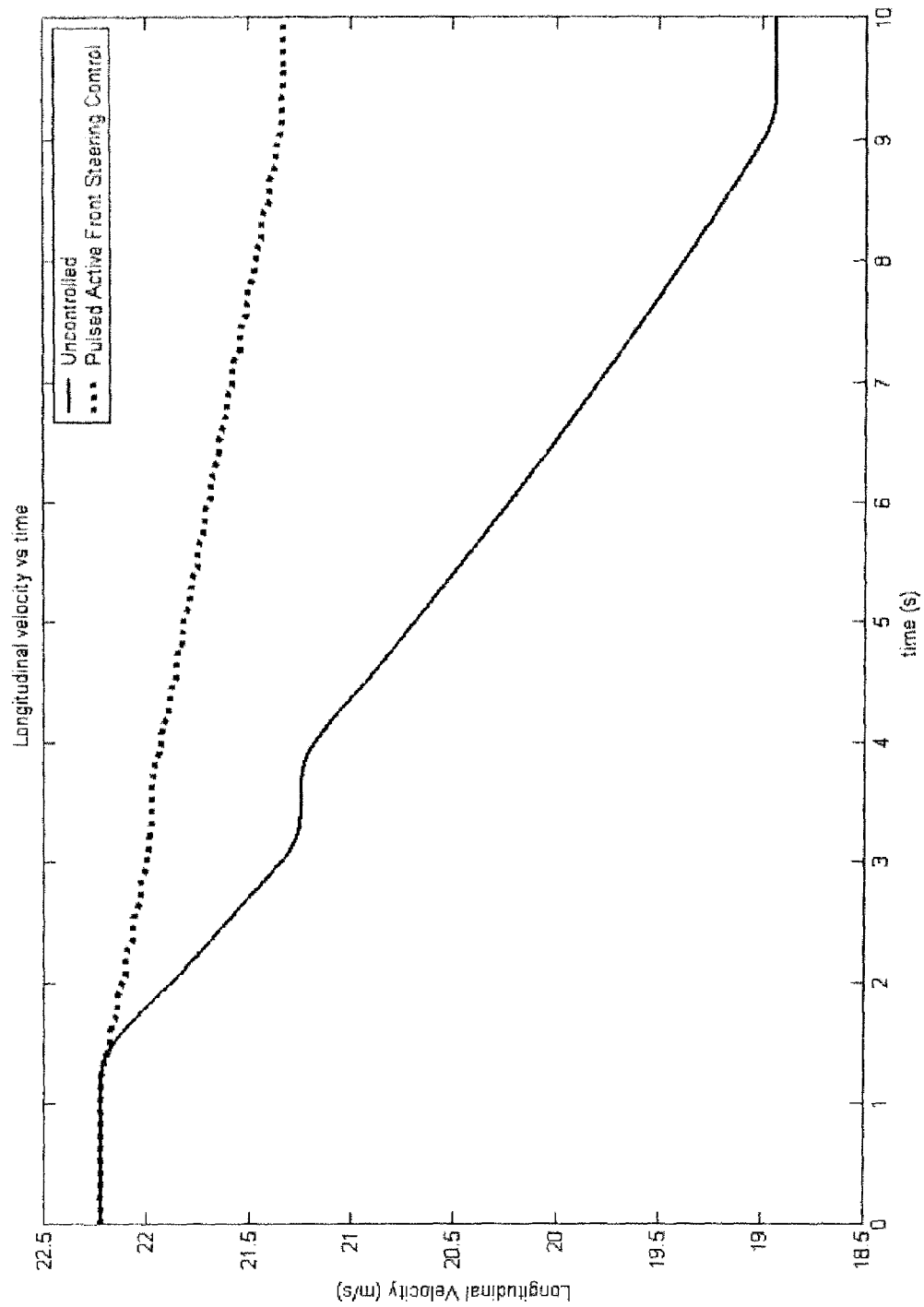
FIG. 41 Vehicle Longitudinal Velocity $v_x$ for Fishhook Maneuver for PAFS Control.
Figure 42:
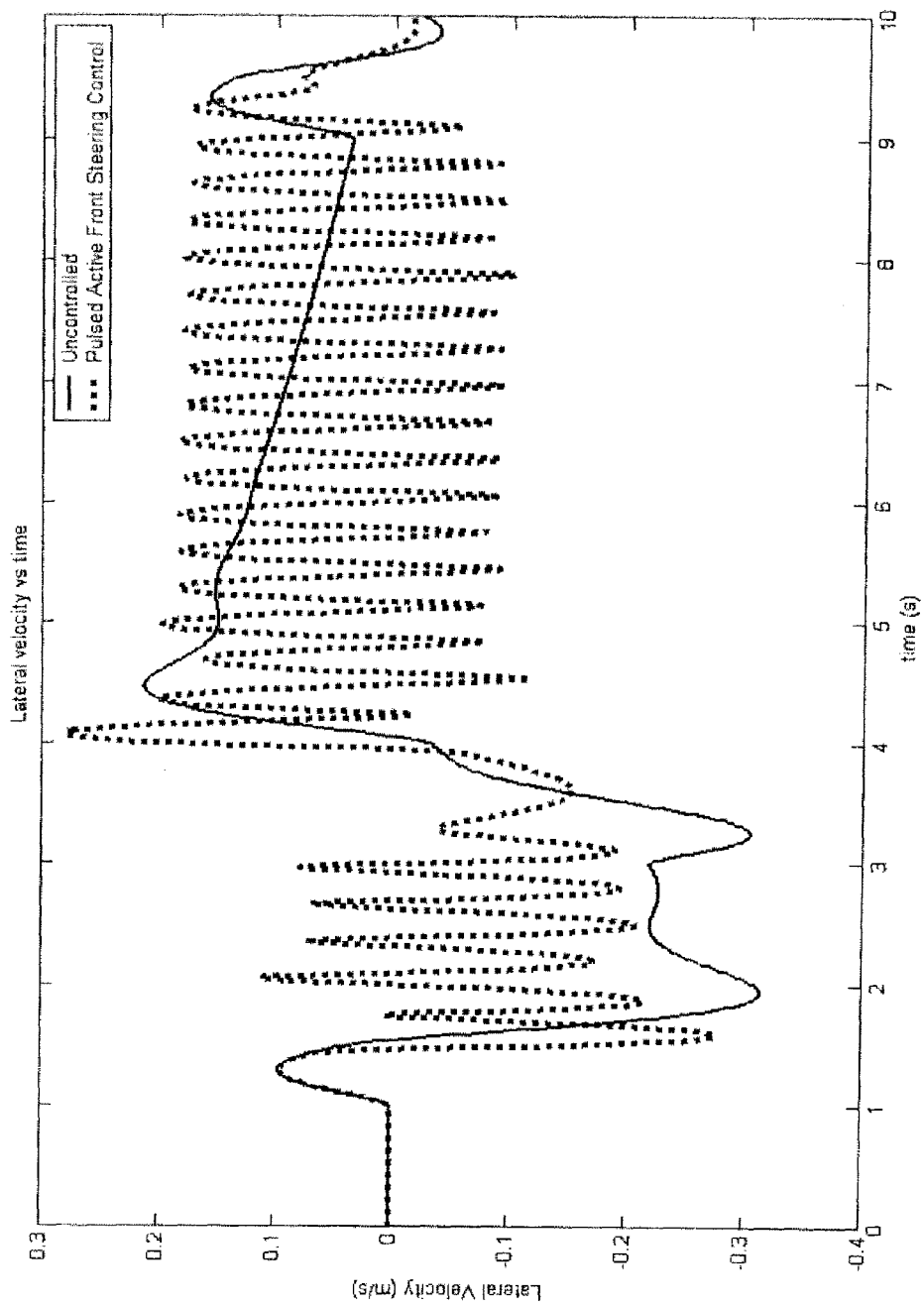
FIG. 42 Vehicle Lateral Velocity $v_y$ for Fishhook Maneuver for PAFS Control.

FIG. 36 illustrates the driver steering input as well as the controlled steering input of fishhook manoeuvre. As illustrated in FIG. 37, the pulsed active steering controller reduces the rollover coefficient within the safety range with ease, as opposed to the conventional active steering and differential braking controller, which both failed to prevent the rollover when simulating with the complete nonlinear vehicle model as shown in previous chapter.

FIGS. 38, 39, 40, 41, and 42 illustrate the details of vehicle trajectory, yaw rate, roll rate, longitudinal velocity, and lateral velocity, respectively.

Other than the amplitude of the extra steering pulse generated by the controller, the frequency of the pulse is another important factor for this controller. To study this factor in-depth, simulations were performed and compared to the results of the simulations described with respect to amplitude modulation. All simulation setups are identical to those relating to amplitude modulation. The controller gain for each simulation is fixed for different pulse frequencies in order to see the effect of a change in pulse frequency. The same testing scenarios are used for the following simulations.

Since the time period for each of the complete pulse cycles in the previous section is 0.3 seconds, it has a frequency of 3.3 Hz. The first selected test frequency is 5 Hz, which means each pulse has a 0.2 seconds time period per duty cycle. This will increase the total pulses generated by the controller. The shape of the pulse remains the same.

Figure 43:
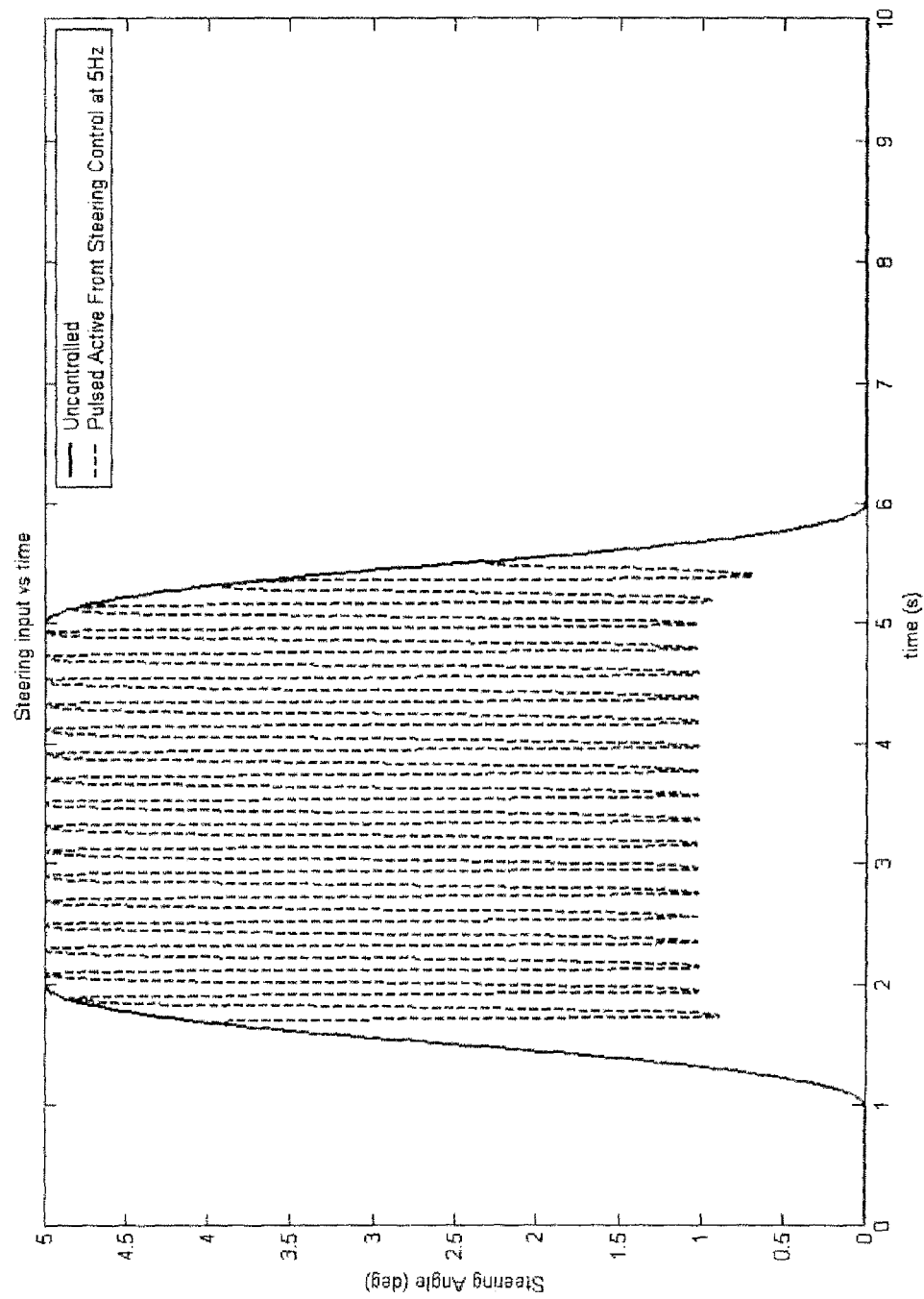
FIG. 43 Driver Steering Input δ for J-turn Maneuver for PAFS Control at 5 Hz.
Figure 44:
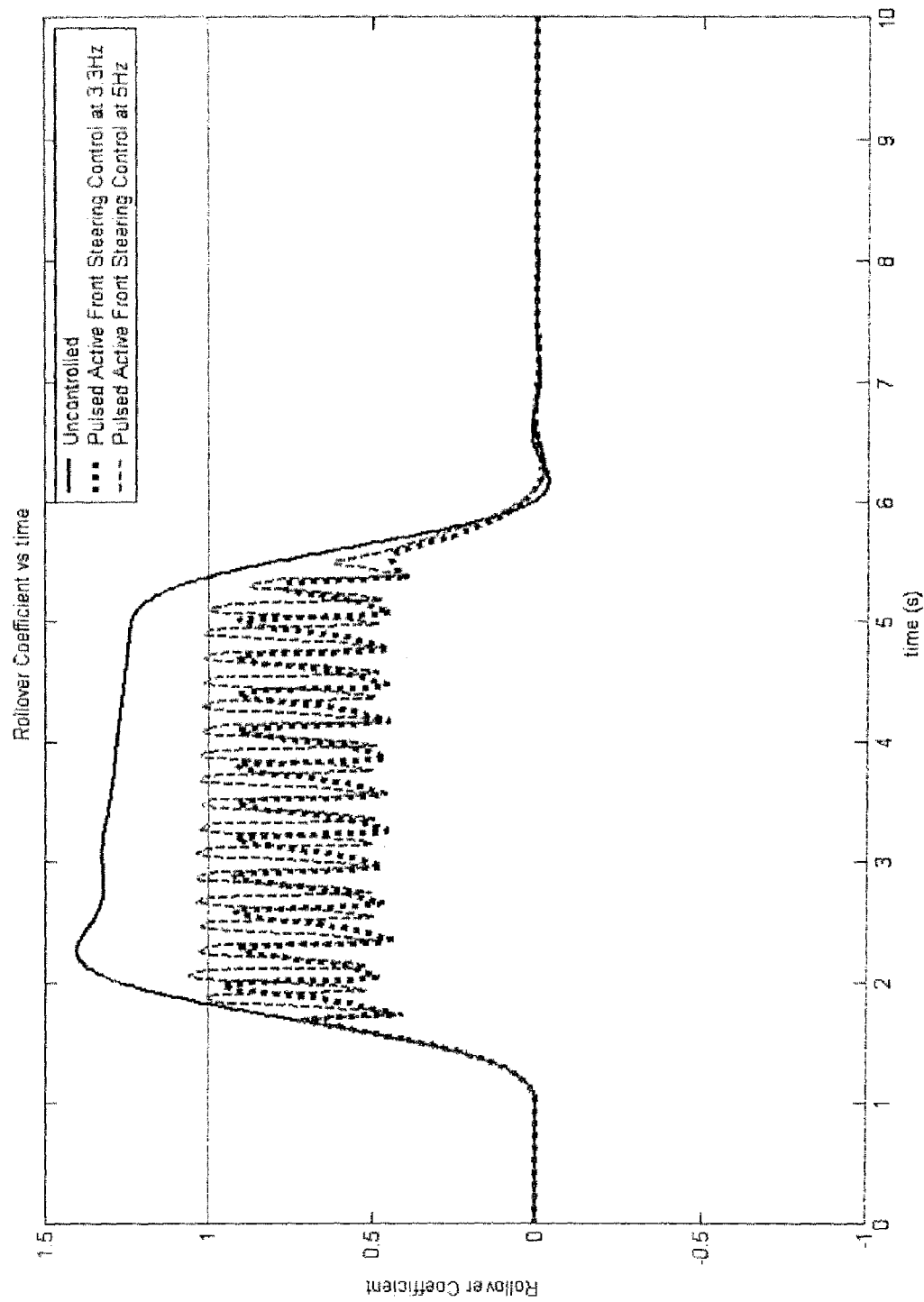
FIG. 44 Rollover Coefficient $R_c$ for J-turn Maneuver for PAFS Control at 5 Hz.

FIG. 43 illustrates the steering input of the J-turn manoeuvre with a 5 Hz pulsed active steering controller. FIG. 44 illustrates the rollover coefficient of the uncontrolled, pulsed active steering controlled at 3.3 Hz (identical controller to Section 5.2), and pulsed active steering controlled at 5 Hz. As shown in FIG. 5-35, the 5 Hz case has difficulty reducing the rollover coefficient within the safety range. With the same controller gain, it also results in a higher average rollover coefficient throughout the simulation compared to the 3.3 Hz case. This is due to the steeper rise and fall edge of the steering pulse when the time period is reduced, while the amplitude stays the same. This simulation result shows that the efficiency of the controller decreases when the frequency of the pulse is too high.

Figure 45:
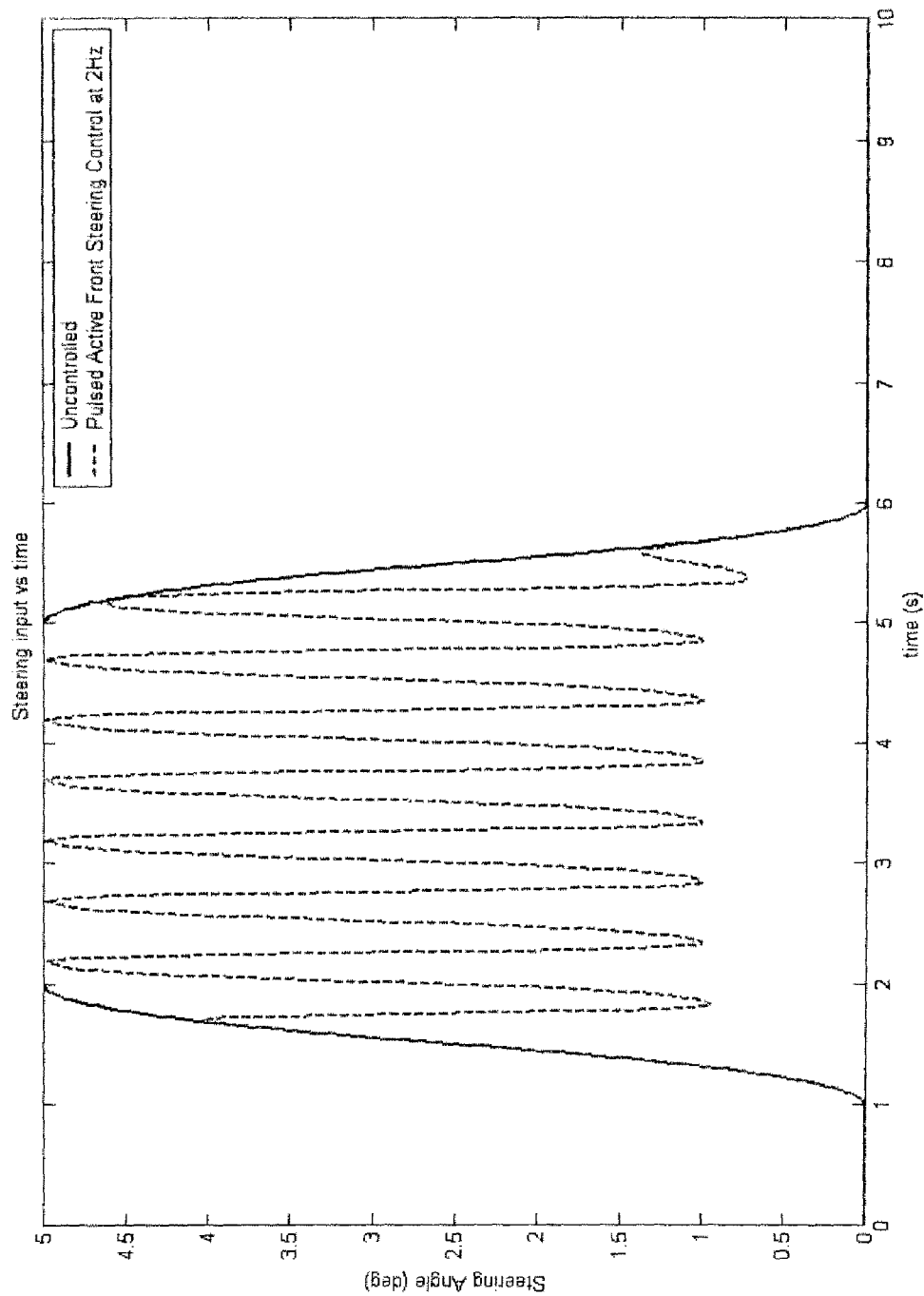
FIG. 45 Driver Steering Input δ for J-turn Maneuver for PAFS Control at 2 Hz.
Figure 46:
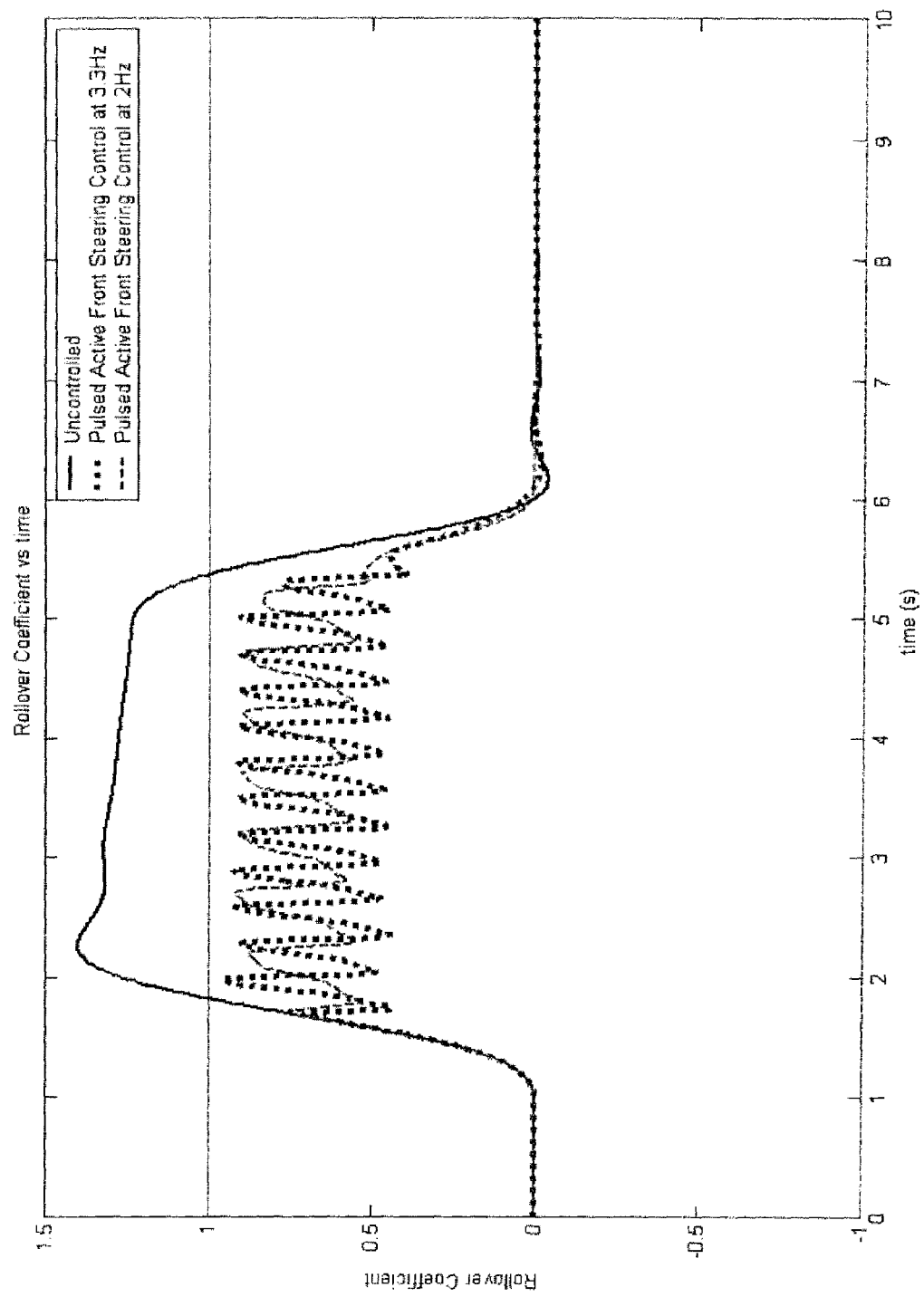
FIG. 46 Rollover Coefficient $R_c$ for J-turn Maneuver for PAFS Control at 2 Hz.
Figure 47:
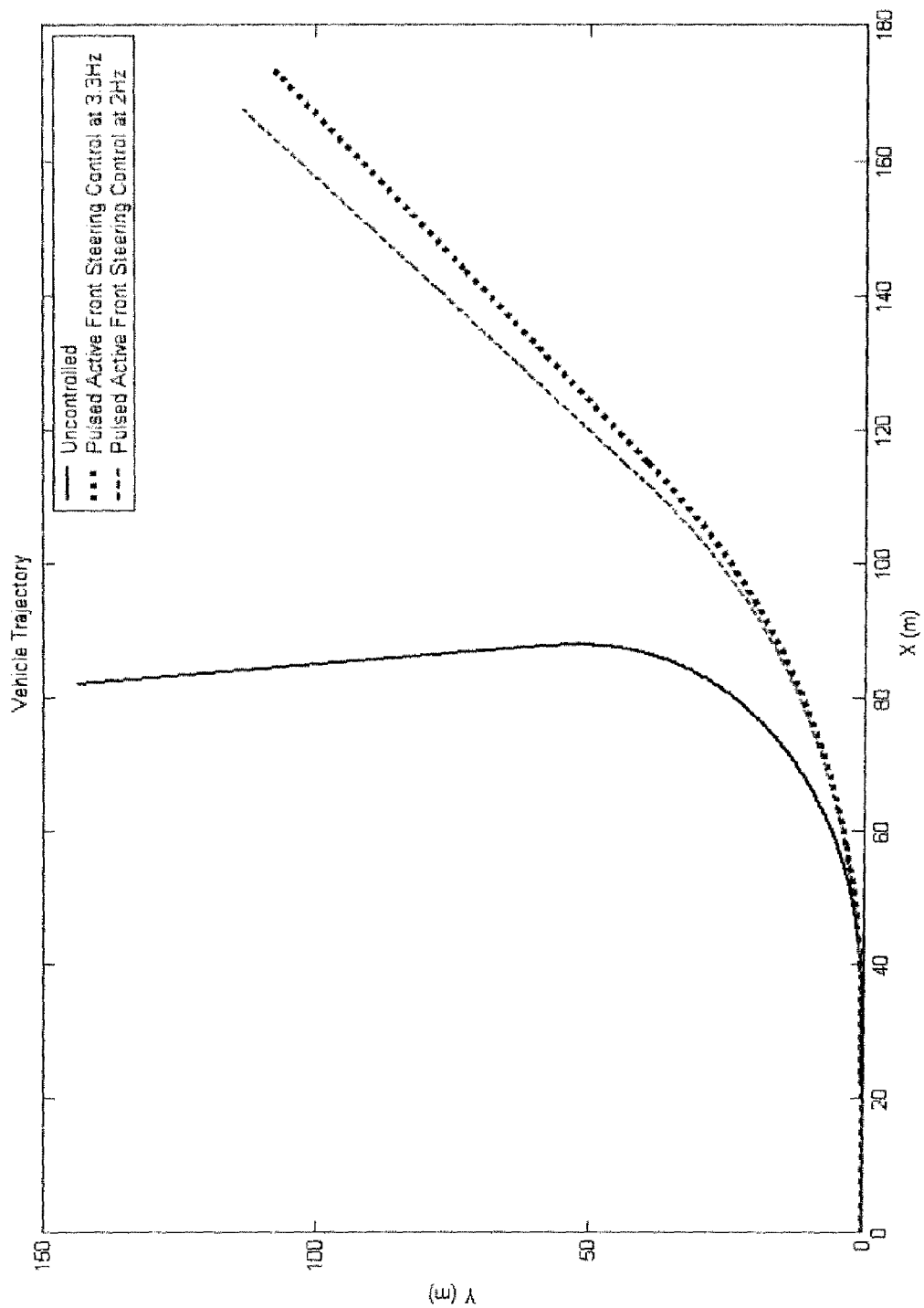
FIG. 47 Vehicle Trajectory for J-turn Maneuver for PAFS Control at 2 Hz.

With the decrease of the efficiency of the controller as the frequency increases in the previous simulation, a smaller frequency at 2 Hz is selected for the next simulation. In this case, each of the duty cycles of the pulses has a time period of 0.5 seconds. FIG. 45 illustrates the steering input of this simulation. As shown in FIG. 46, the rollover coefficient of the 2 Hz controller is successfully reduced within the safety range. It also shows a smaller average rollover coefficient as well as a smaller trajectory variance, compared to the 3.3 Hz case under same controller gain, as shown in FIG. 47. This clearly shows an improvement to the original controller frequency.

Figure 48:
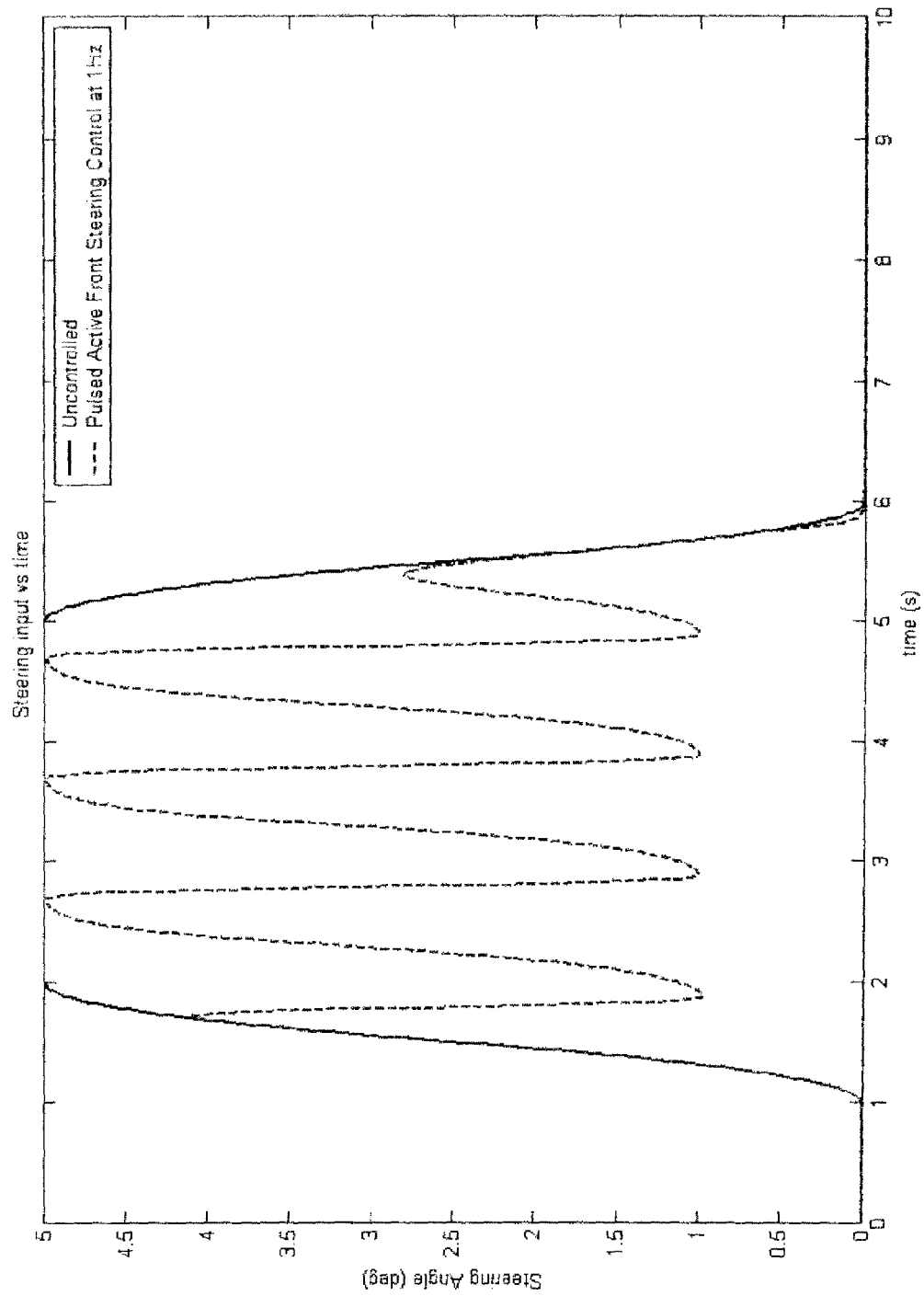
FIG. 48 Driver Steering Input δ for J-turn Maneuver for PAFS Control at 1 Hz.
Figure 49:
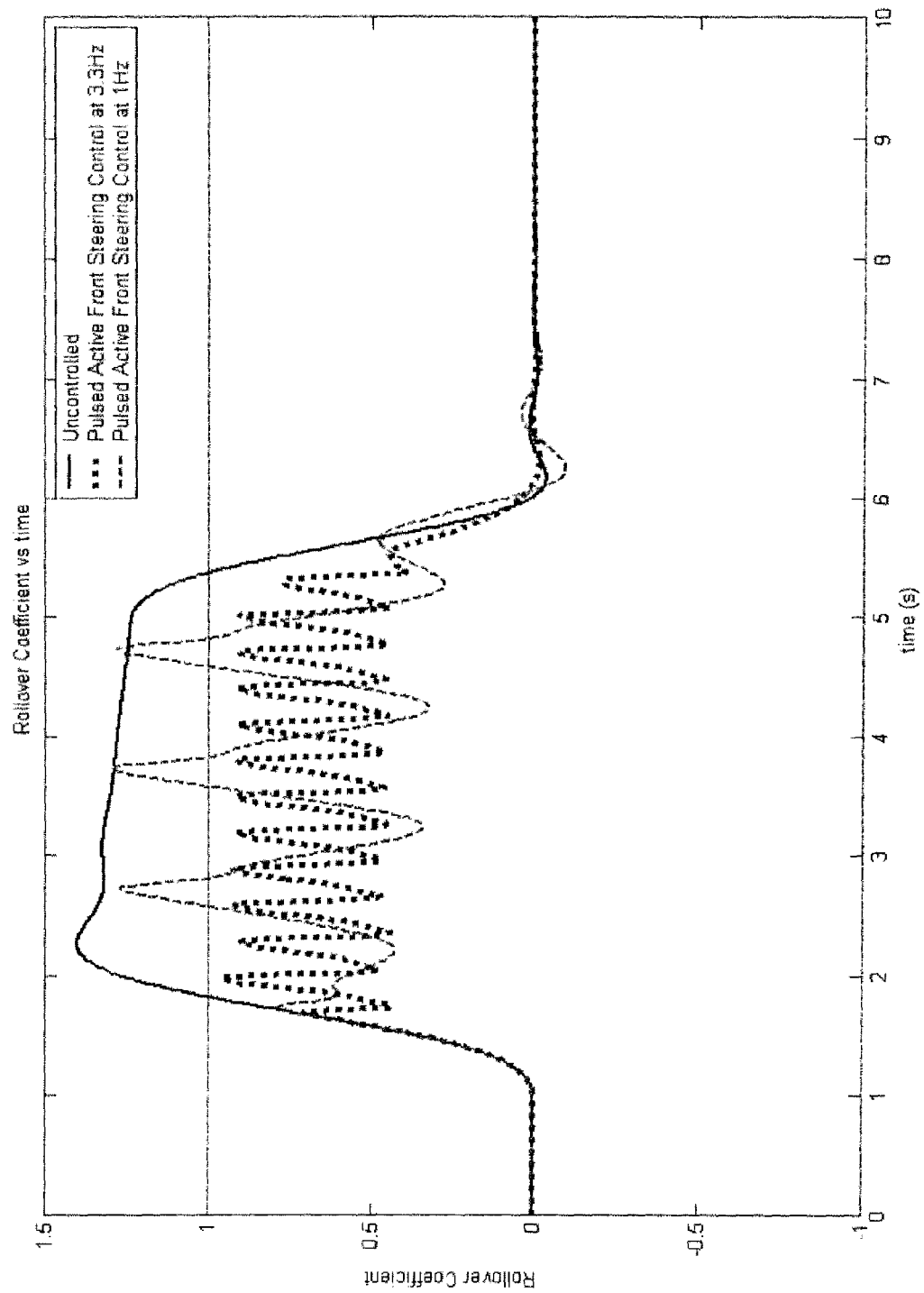
FIG. 49 Rollover Coefficient $R_c$ for J-turn Maneuver for PAFS Control at 1 Hz.

With the improvement of the previous simulation when decreasing the controller frequency, an even smaller frequency of 1 Hz is selected to further investigate the duty cycle problem. FIGS. 48 and 49 illustrate the steering input and rollover coefficient of this simulation, respectively. As shown in FIG. 49, the rollover coefficient did not reduce the maximum rollover coefficient by much compared to the uncontrolled case, which demonstrates that it is not efficient in terms of reducing the rollover risk. This simulation result shows that the controller frequency cannot be too small. A faster steering response is required in order to maintain the efficiency of the controller.

At this point, one can conclude that the frequency of the generated pulse plays an important role to the controller efficiency. When the frequency is either too high or too low, the efficiency of the controller is reduced. A good frequency selection becomes an important control factor for different emergency manoeuvres. To further investigate the best result being found in J-turn manoeuvre, the 2 Hz pulsed active steering controller is further simulated with the rest of the three test scenarios.

Figure 50:
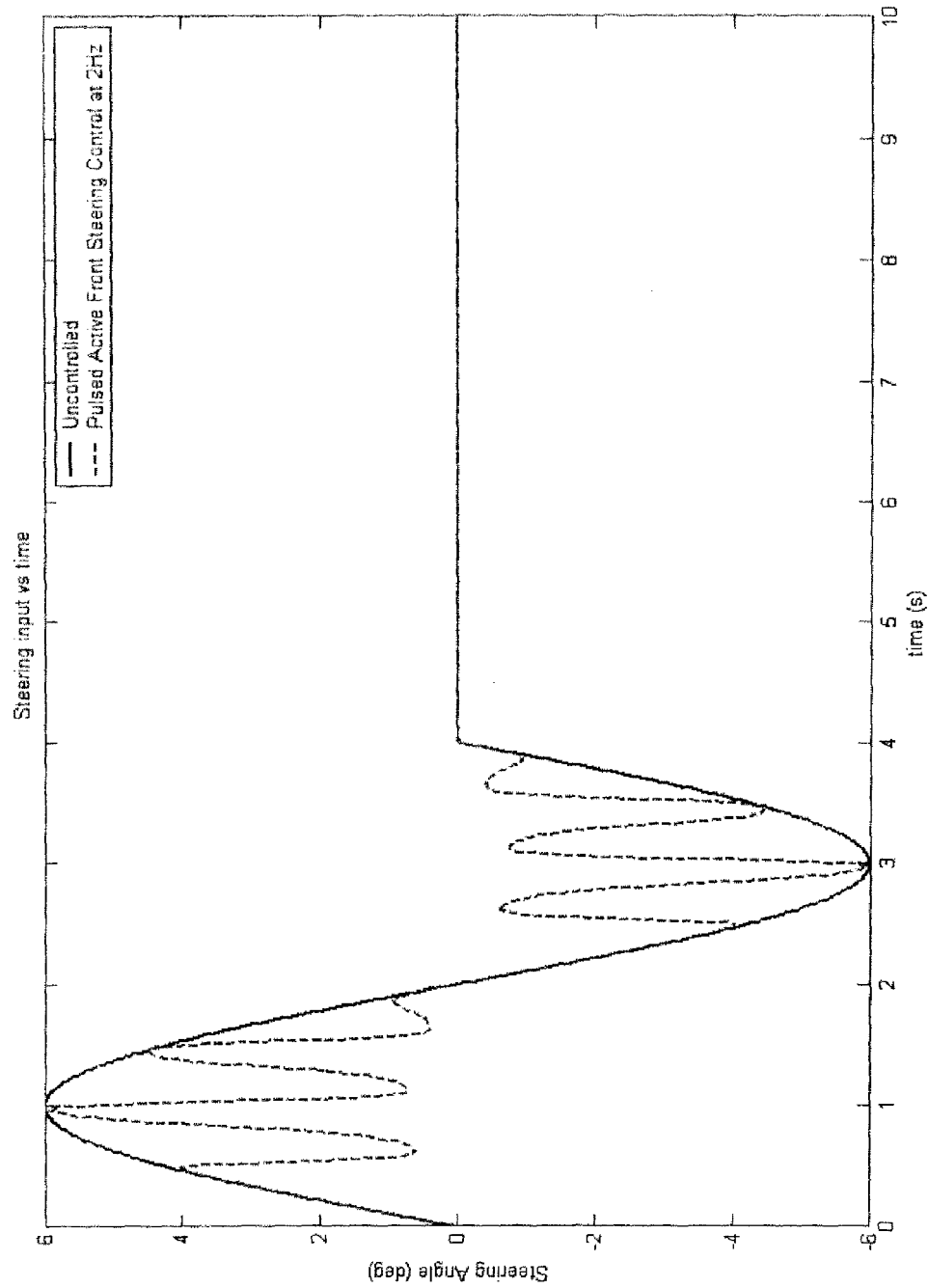
FIG. 50 Driver Steering Input δ for SLC Maneuver for PAFS Control at 2 Hz.
Figure 51:
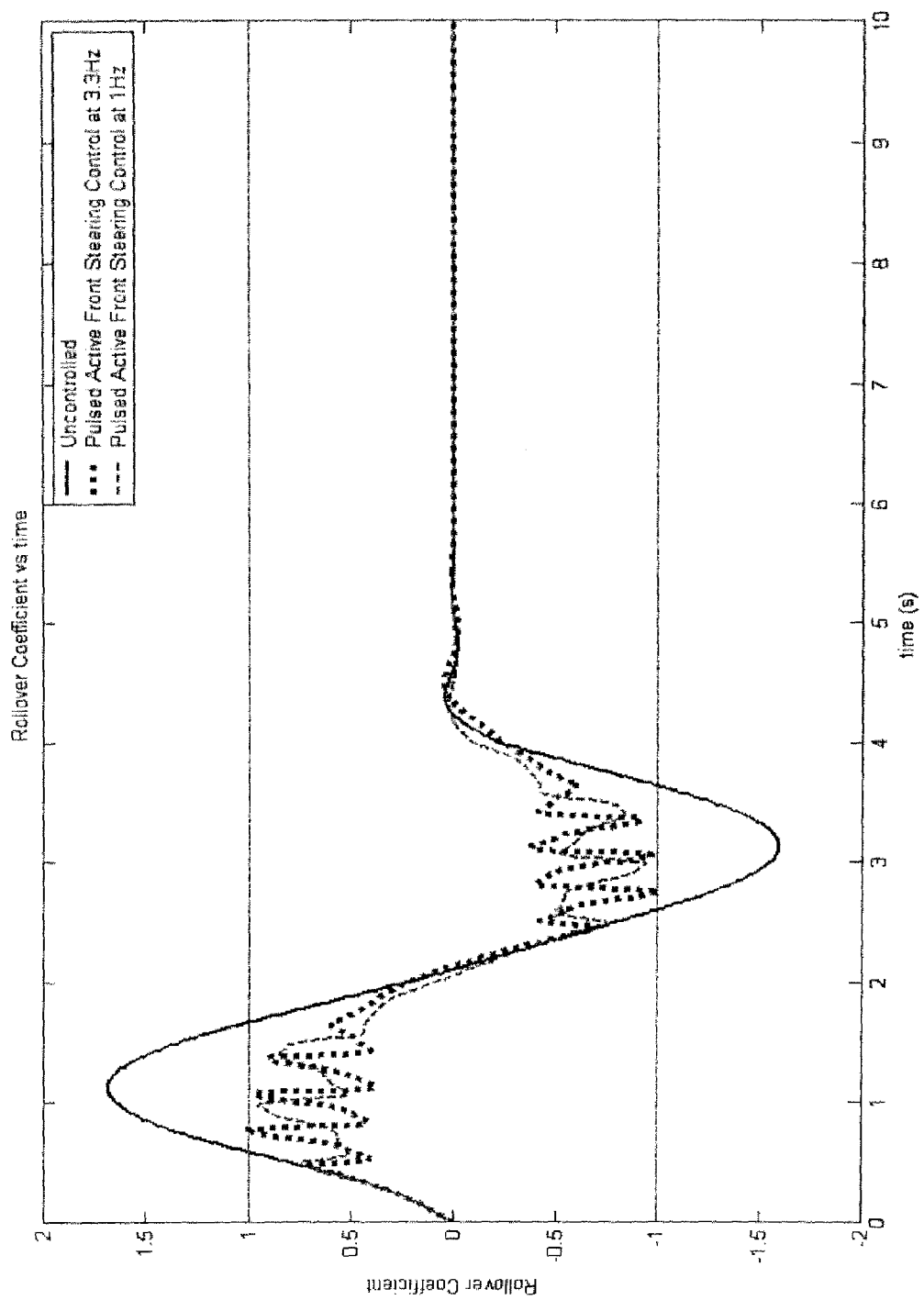
FIG. 51 Rollover Coefficient $R_c$ for SLC Maneuver for PAFS Control at 2 Hz.
Figure 52:
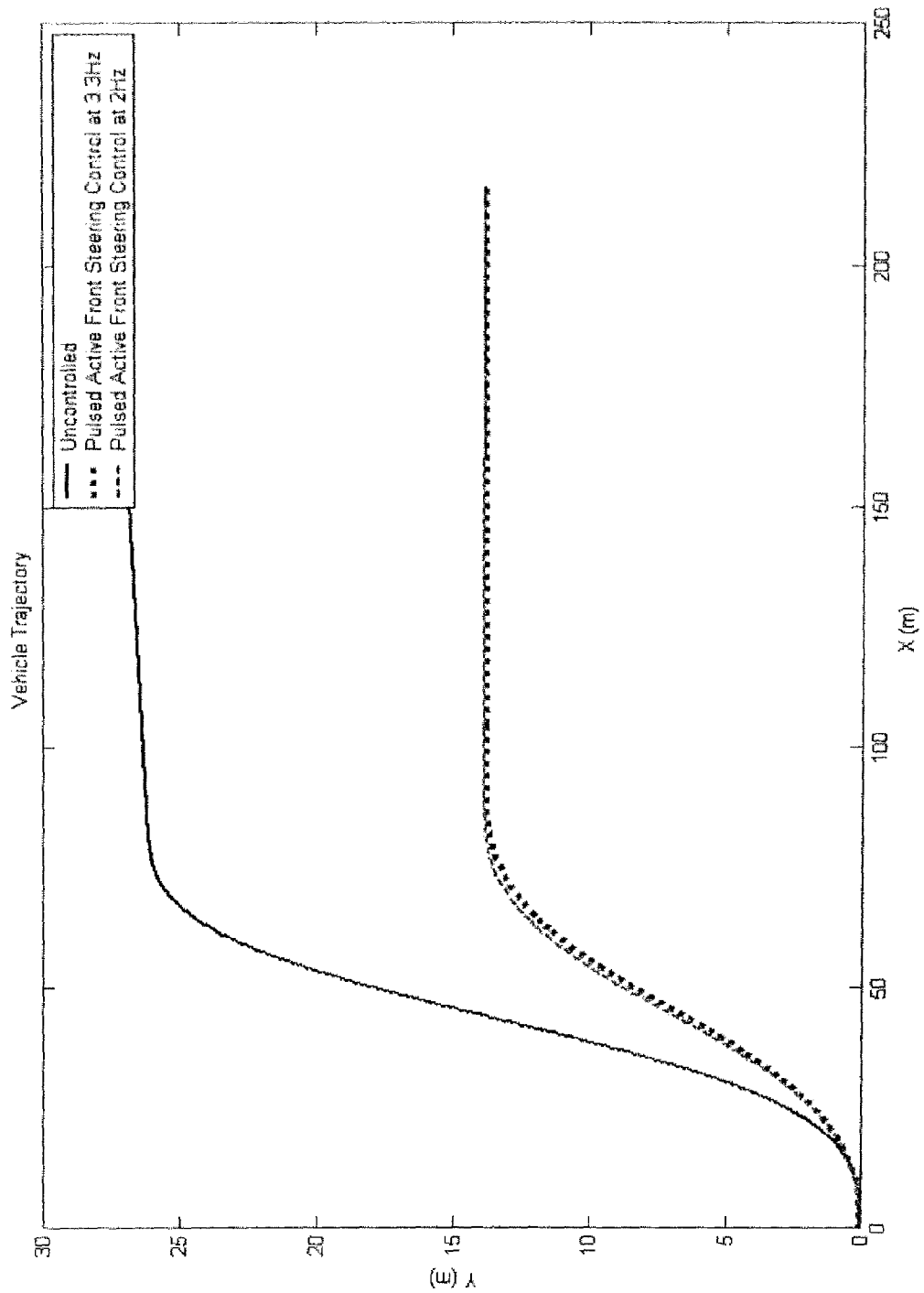
FIG. 52 Vehicle Trajectory for SLC Maneuver for PAFS Control at 2 Hz.

FIGS. 50, 51 and 52 illustrate the steering input, rollover coefficient and vehicle trajectory of the 2 Hz controller in sinusoidal manoeuvre respectively. As shown in FIG. 51, the rollover coefficient using the 2 Hz controller is successfully reduced within the safety range. With the identical controller gain, the 2 Hz controller also shows a smaller average value of rollover coefficient compared to the original 3.3 Hz controller. In terms of vehicle trajectory, both controllers produce a similar result.

Figure 53:
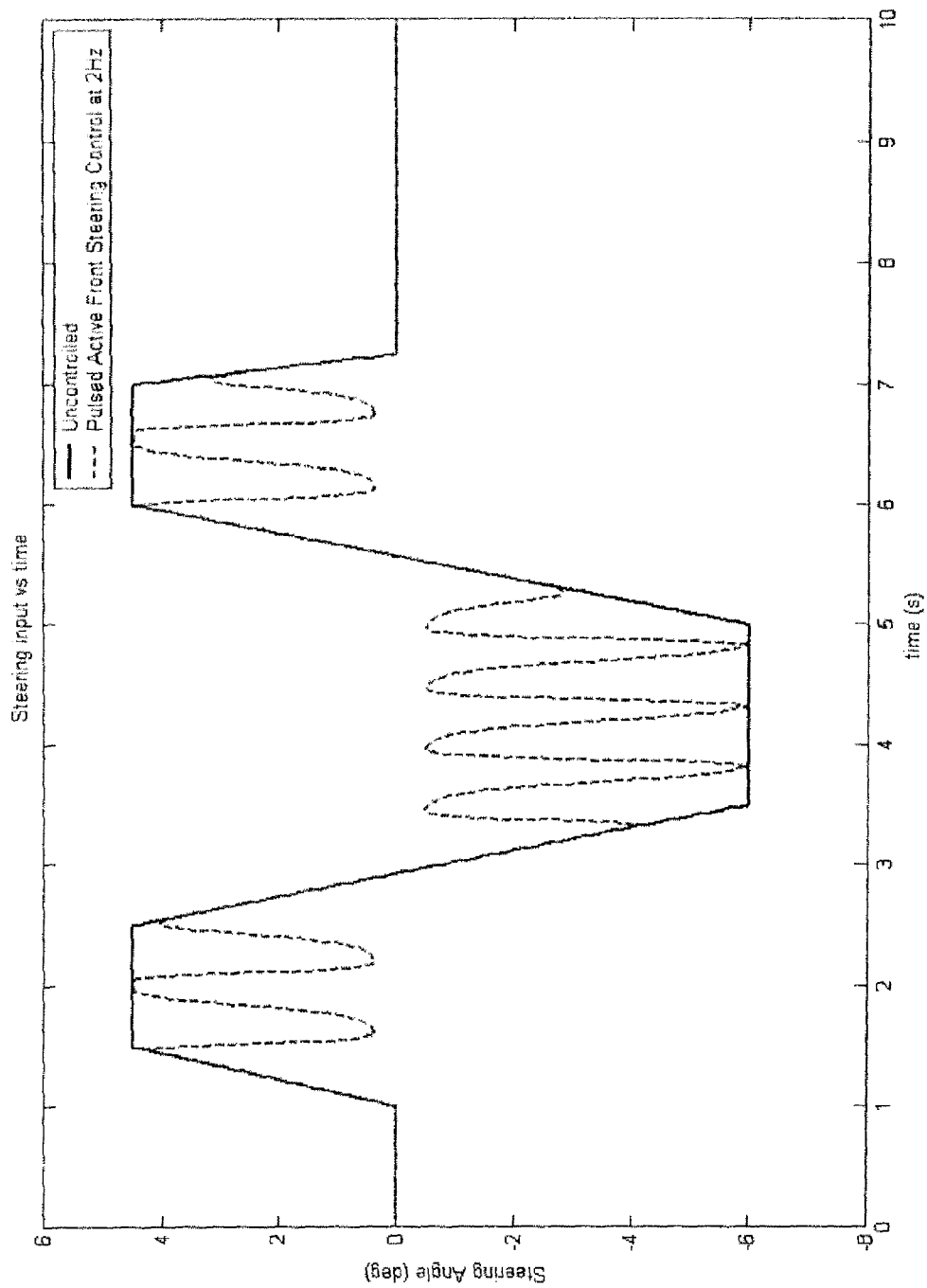
FIG. 53 Driver Steering Input δ for DLC Maneuver for PAFS Control at 2 Hz.
Figure 54:
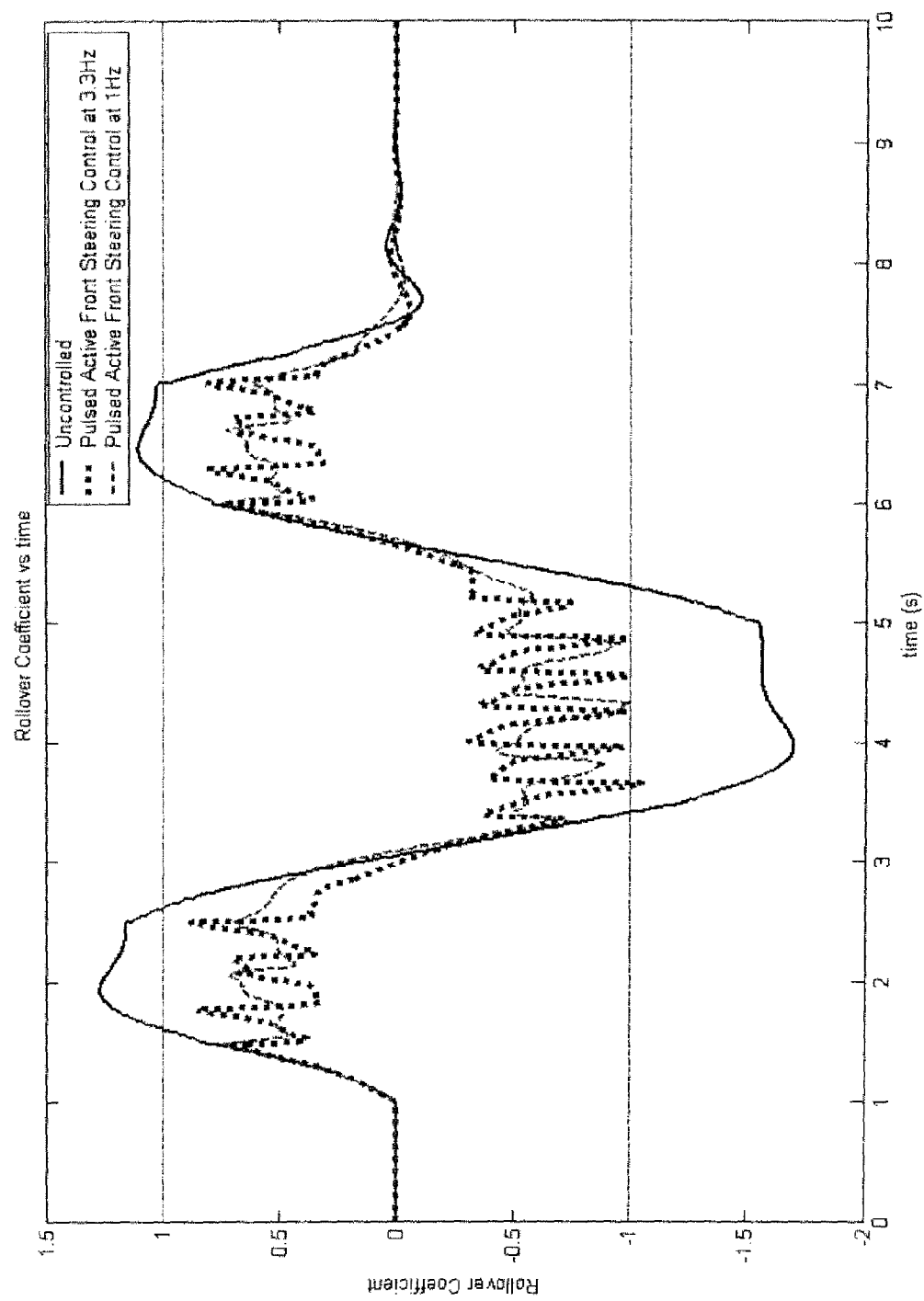
FIG. 54 Rollover Coefficient $R_c$ for DLC Maneuver for PAFS Control at 2 Hz.
Figure 55:
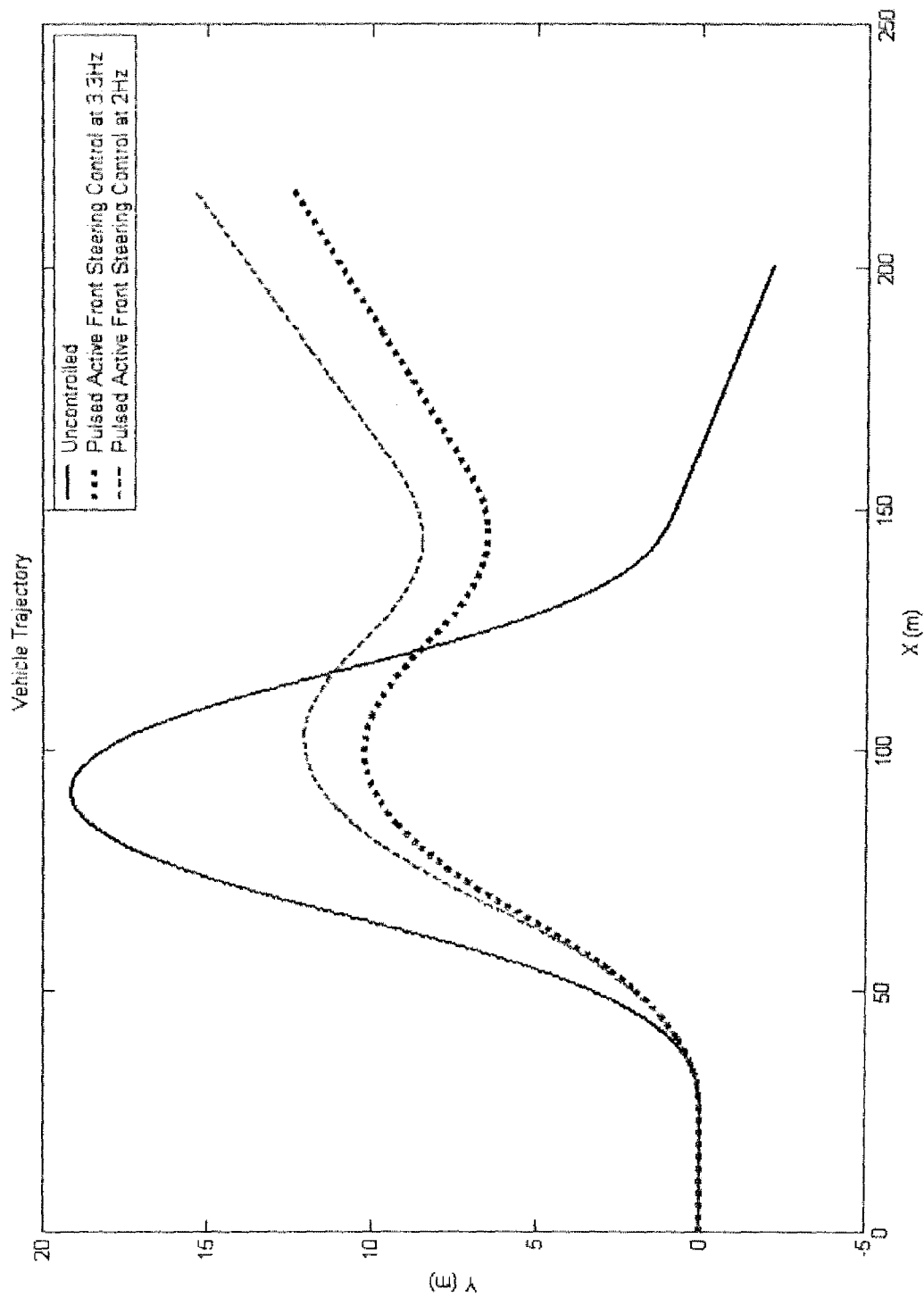
FIG. 55 Vehicle Trajectory for DLC Maneuver for PAFS Control at 2 Hz.

FIGS. 53, 54 and 55 illustrate the steering input, rollover coefficient and vehicle trajectory of the 2 Hz controller in double lane change manoeuvre, respectively. As shown in FIG. 54, the rollover coefficient using the 2 Hz controller is successfully reduced within the safety range. The original 3.3 Hz controller, however, has difficulty reducing the rollover coefficient within the safety range when it comes to a negative value region. The previous method to overcome this problem was to trigger the controller a bit earlier when comes to negative rollover coefficient values. The 2 Hz controller, however, does not require such additional tweaking. It successfully reduces the rollover risk with smaller gain and no additional tweaking.

Figure 56:
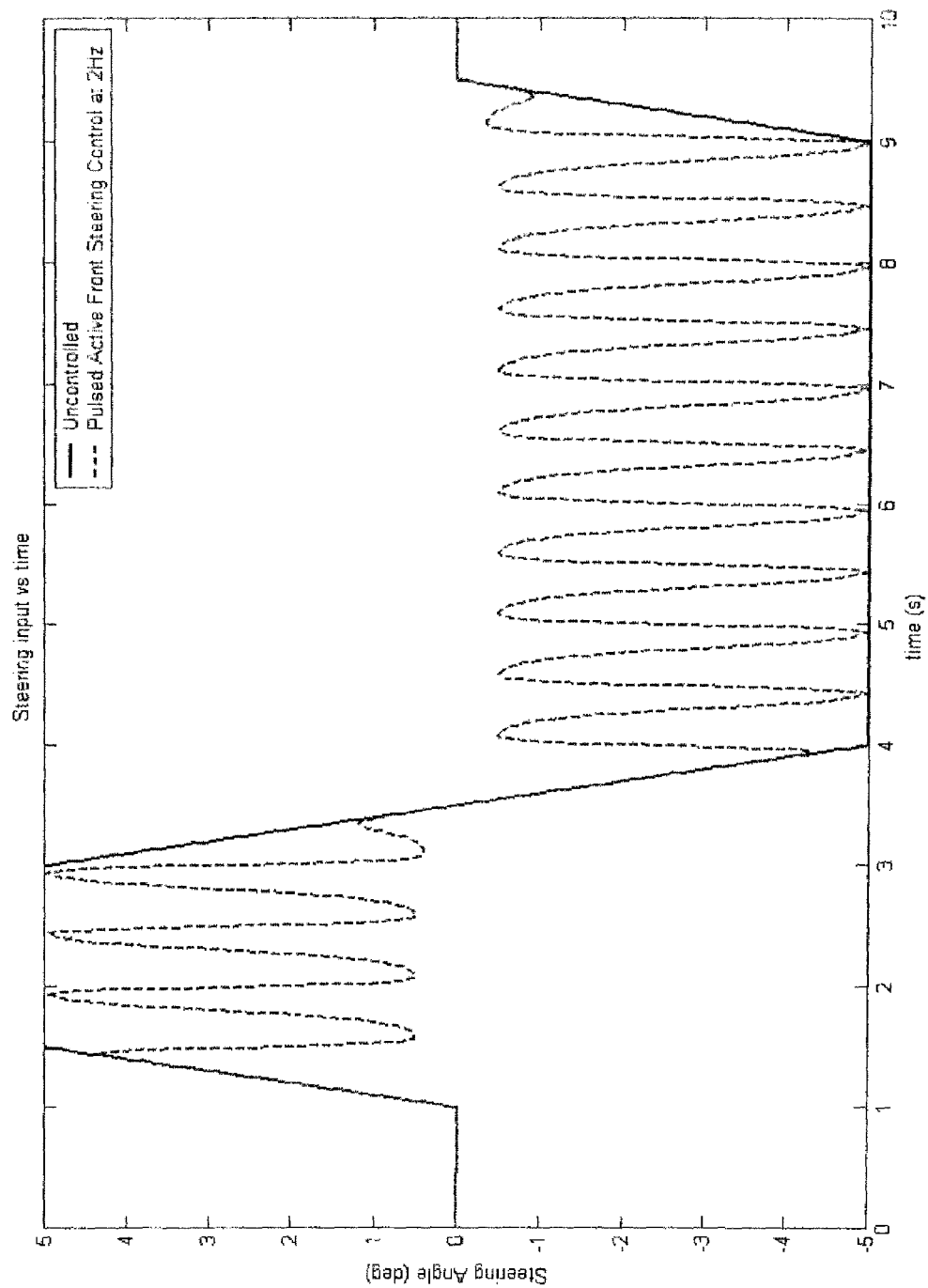
FIG. 56 Driver Steering Input δ for Fishhook Maneuver for PAFS Control at 2 Hz.
Figure 57:
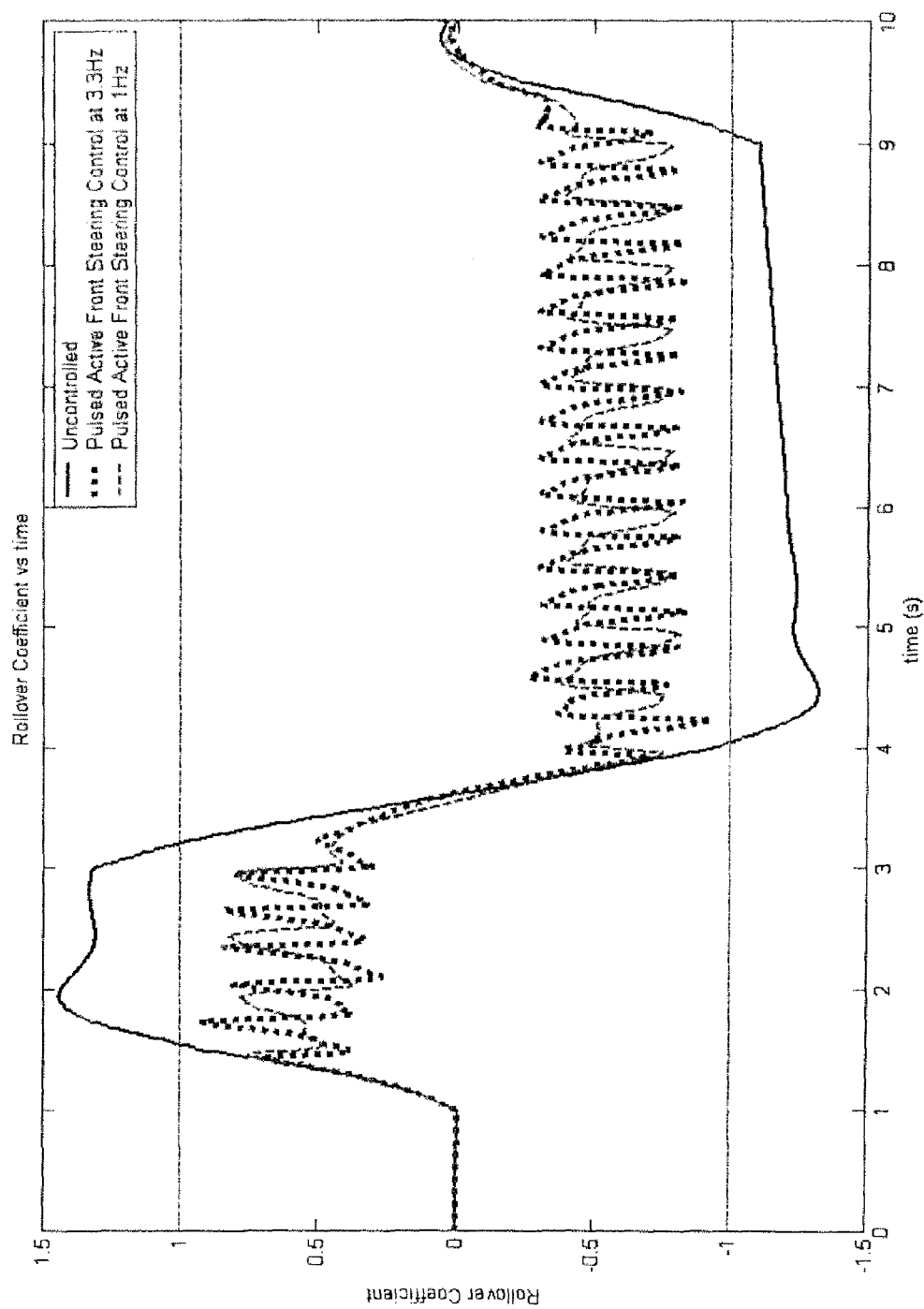
FIG. 57 Rollover Coefficient $R_c$ for Fishhook Maneuver for PAFS Control at 2 Hz.
Figure 58:
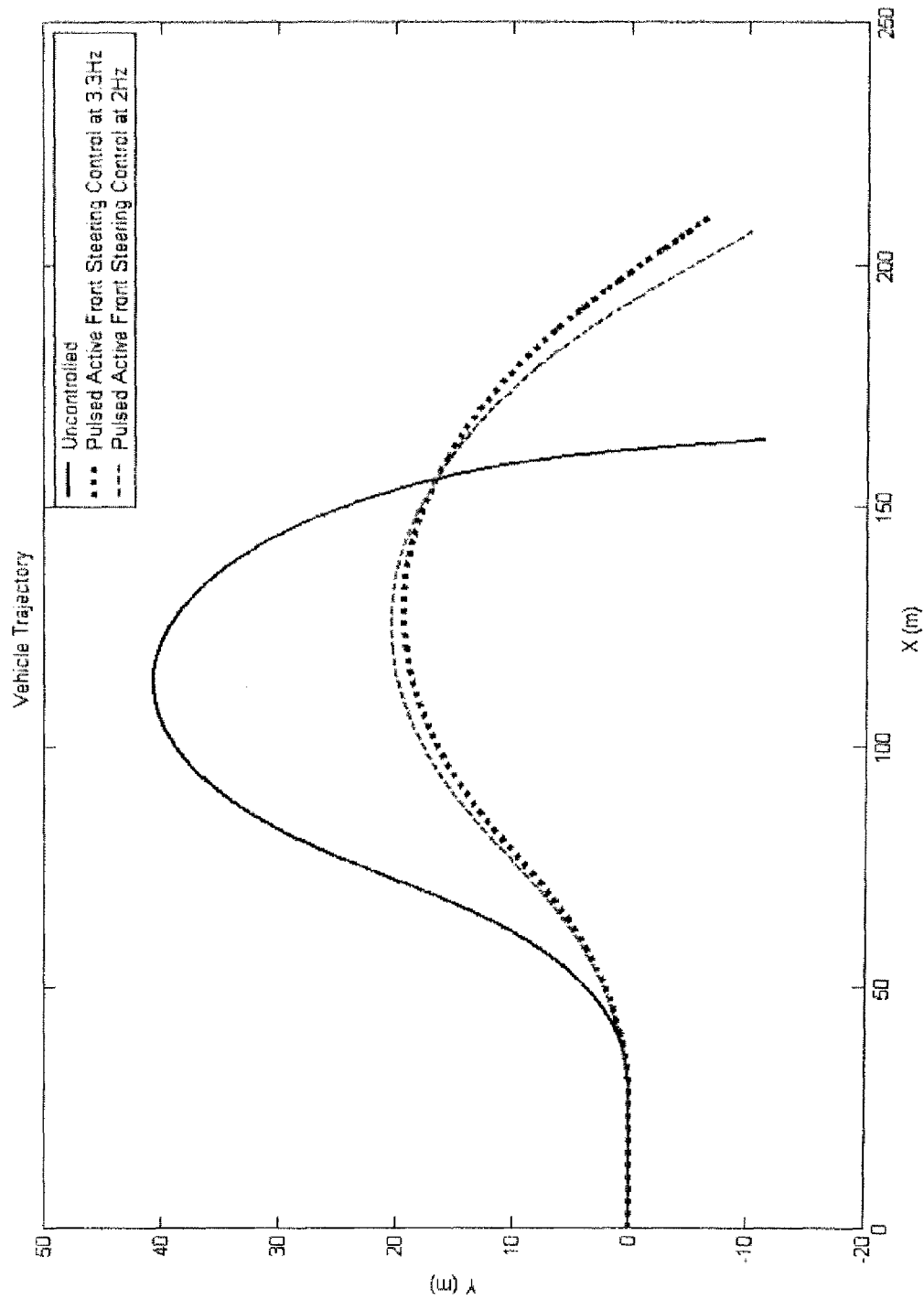
FIG. 58 Vehicle Trajectory for Fishhook Maneuver for PAFS Control at 2 Hz.

FIGS. 56, 57 and 58 illustrate the steering input, rollover coefficient and vehicle trajectory of the 2 Hz controller in fishhook manoeuvre, respectively. As shown in FIG. 57, the rollover coefficient of the 2 Hz controller is successfully reduced within the safety range. With the identical controller gain, the 2 Hz controller also shows a smaller average value of rollover coefficient when compared to the original 3.3 Hz controller. In terms of vehicle trajectory, both controllers produce a similar result.

As shown in the simulations in this section, the frequency of the pulse duty cycle is an important control variable for the new pulsed active steering controller. When the frequency is too high, the steep rising and falling edge of the pulse reduces the efficiency of the controller. When the frequency is too low, there are not enough forces generated by the tires to overcome the rollover problem. A suitable frequency of 2 Hz is found in this section for all designated test scenarios in this thesis. In general, a good combination of pulse amplitude, pulse frequency as well as the threshold of the rollover coefficient to trigger the controller is essential for a well-designed, pulsed, active steering controller. As the robustness of the control strategy is not the main focus of this thesis, the best suitable combination of these three important variables for different emergency manoeuvres remains to be further researched in the future.

The tire model used in the simulations does not take into account the tire relaxation length. Since the pulsed active steering controller relies on the instantaneous steering correction generating the necessary tire forces to reduce the rollover coefficient, the tire relaxation length becomes a possible element that could affect the performance of the pulsed active steering controller. A typical tire relaxation length at 100 km/hr on a vehicle is 0.035 seconds. Since the typical time period for each duty cycle for the pulsed active steering controller is between 0.3 and 0.5 seconds, the tire relaxation length is only about 10% of each duty cycle. For such a small percentage, the effect of the tire relaxation length is very limited, and therefore, can be ignored.

The PD controller used in the pulsed active steering controller can be replaced by a cheaper, simple proportional gain, K controller, since the differential part of the PD controller does not improve the efficiency of the controller throughout all simulations.

When a vehicle is being driven, the pulse active steering control system continuously monitors the actual yaw rate and/or the actual rollover coefficient for the vehicle on a continuous basis. An estimator estimates what an acceptable yaw rate for the vehicle should be based upon the speed of the vehicle and an angle of each of the steerable wheels. The likelihood of rollover is also being monitored, the rollover estimator calculates a rollover coefficient for the vehicle on a continuous basis. A controller compares the actual yaw rate with the acceptable yaw rate and calculates the difference. The difference is an error and can be positive or negative. The controller then causes pulses to be sent to the steerable wheels in order to reduce and, preferably, to correct the error. If the error is negative, the pulses are positive, and if the error is positive, the pulses are negative. Similarly, when a rollover coefficient is calculated, a rollover estimator calculates a rollover coefficient for the vehicle on a continuous basis. A controller compares the rollover coefficient to a predetermined range for a rollover threshold. If the rollover coefficient is beyond the range for the rollover threshold, the controller provides pulses to the steerable wheels to vary the rollover coefficient to a value closer to or within the range for the rollover threshold. The controller also determines an error and provides positive pulses to the steerable wheels if the error is negative, and negative pulses to the steerable wheels if the error is positive.

The control system of the present invention is a simple, inexpensive and lightweight component that can be added to the vehicle when the vehicle already has ABS brakes. If the vehicle does not have ABS brakes, then additional components must be added to the vehicle to carry out the invention. Sensors are used to obtain the various measurements required by the system.

The pulse active steering control system of the present invention and the method of improving vehicle stability can be used in conjunction with other stability or yaw control or rollover control systems such as differential braking systems.

We claim:

1. A pulse active steering control system for use in a motor vehicle to improve vehicle stability by reducing a likelihood of rollover and/or skidding, said motor vehicle having at least four wheels, at least two of which are steerable wheels and a driver, said system comprising a rollover estimator that calculates a rollover coefficient of said vehicle, a steering input from said driver feeding feeding into a tire model which calculates tire forces and then feeds the resulting tire forces to a yaw/roll model, said yaw/roll model then calculating a longitudinal and lateral velocity as well as a yaw rate, roll angle and roll rate of said vehicle and feeding the data to said roll over estimator to calculate the rollover coefficient, a controller being programmed to determine whether said rollover coefficient is beyond a predetermined range for said rollover threshold for said vehicle, if said rollover coefficient is within said range for said rollover threshold said controller being programmed not to interfere with operation of said vehicle, if said rollover coefficient is beyond said range of said rollover threshold said controller immediately activating steering pulses, modifying an amplitude of said pulses with respect to a current steering input from said driver and an error signal of said rollover coefficient, said controller sending pulses to provide extra steering to steering provided by said steering input from said driver in order to reduce a likelihood of rollover by varying said rollover coefficient to a value closer to or within said range of said rollover threshold and ultimately to be within said range of said rollover threshold.

2. The pulse active steering control system as claimed in claim 1 wherein said pulses have a shape selected from the group of rectangular, sinusoidal and asymmetrical in the form of a smooth curve with a gradually increasing rapid rising edge and a slower falling edge.

3. A pulse active steering control system for use in combination with a motor vehicle to improve vehicle stability by reducing a likelihood for rollover and/or skidding, said motor vehicle having at least four wheels, at least two of which are steerable wheels and a driver, said system comprising a rollover estimator and a controller in said, vehicle, said rollover estimator calculating a rollover coefficient, a steering input from said driver feeding into a tire model which calculates tire forces and then feeds the resulting tire forces to a yaw/roll model, said yaw/roll model then a calculating a longitudinal and lateral velocity as well as a yaw rate roll angle and roll rate of said vehicle and feeding the data to said roll over estimator to calculate the rollover coefficient, said controller comparing said rollover coefficient to a predetermined range for a rollover threshold, if said rollover coefficient is beyond said range for said rollover threshold said controller providing pulses to said steerable wheels to vary said rollover coefficient to a value closer to or within said range for said rollover threshold.

4. The pulse active steering control system as claimed in claim 3 wherein said pulses have a shape selected from the group of rectangular, sinusoidal and asymmetrical in the form of a smooth curve with a gradually increasing rapid rising edge and a slower falling edge.

5. The steering control system as claimed in claim 3 wherein each of said pulses is a smooth curve with a gradually increasing rapid rising edge and a slower failing edge.

6. The control system as claimed in claim 5 wherein said controller is configured to control a frequency of said pulses as well as an amplitude of said pulses compared to steering input from said driver.

7. The control system as claimed in claim 5 wherein said system has a steering pulse generator, a pulse control algorithm and said controller is selected from the group of a PD controller and a proportional gain K controller.

8. The control system as claimed in claim 5 wherein said rollover estimator continuously monitors said rollover coefficient to maintain said rollover coefficient between −1 and +1.

9. The control system as claimed in claim 8 wherein said predetermined range of said rollover threshold extends from substantially +0.7 and −0.7 so that said controller activates said pulse generator whenever said rollover coefficient is outside of said range for said rollover threshold.

10. The control system as claimed in claim 3 wherein a frequency of said pulses is substantially 1 Hz to 3 Hz.

11. The control system as claimed in claim 3 wherein an amplitude of said pulses varies with driver input into steering said steerable wheels.

12. The control system as claimed in claim 3 wherein a time period for each duty cycle of one of said pulses is between 0.3 seconds and 0.5 seconds.

13. The control system as claimed in claim 11 wherein said pulses have an amplitude of substantially 2° when said vehicle is under a constant 4° steering input from said driver.

14. The control system as claimed in any one of claims 1, 3, or 4 wherein said pulses are sent as a negative pulse that is subtracted from the steering input from said driver.

15. The control system as claimed in claim 1 wherein each of said pulses is a smooth curve with a gradually increasing rapid rising edge and a slower falling edge.

* * * * *